(12) United States Patent
Taylor et al.

(10) Patent No.: US 6,684,030 B1
(45) Date of Patent: Jan. 27, 2004

(54) SUPER-RING ARCHITECTURE AND METHOD TO SUPPORT HIGH BANDWIDTH DIGITAL "LAST MILE" TELECOMMUNICATIONS SYSTEMS FOR UNLIMITED VIDEO ADDRESSABILITY IN HUB/STAR LOCAL LOOP ARCHITECTURES

(75) Inventors: John A. Taylor, Vista, CA (US); Mark D. Wieczorek, San Diego, CA (US)

(73) Assignee: Khamsin Technologies, LLC, Vista, CA (US)

( * ) Notice: Subject to any disclaimer, the term of this patent is extended or adjusted under 35 U.S.C. 154(b) by 0 days.

(21) Appl. No.: 09/383,500

(22) Filed: Aug. 25, 1999

Related U.S. Application Data

(63) Continuation-in-part of application No. 09/256,326, filed on Feb. 23, 1999, and a continuation-in-part of application No. 09/201,445, filed on Nov. 30, 1998, and a continuation-in-part of application No. 09/124,958, filed on Jul. 29, 1998.

(60) Provisional application No. 60/085,195, filed on May 12, 1998, provisional application No. 60/084,200, filed on Apr. 30, 1998, and provisional application No. 60/054,076, filed on Jul. 29, 1997.

(51) Int. Cl.[7] .......................... H04B 10/20; H04J 14/00
(52) U.S. Cl. .............................. 398/59; 398/70; 398/71
(58) Field of Search ................... 359/119, 123, 359/125, 135, 136, 137, 139; 370/254, 259, 352, 395; 398/59, 75, 71, 78, 98, 99, 100

(56) References Cited

U.S. PATENT DOCUMENTS

| | | | |
|---|---|---|---|
| 1,586,887 A | 6/1926 | Elman | |
| 1,672,979 A | 6/1928 | Fondiller | |
| 1,841,473 A | 1/1932 | Green | |
| 1,883,269 A | 10/1932 | Yonkers | |
| 2,000,355 A | 5/1935 | Sichtermann | |
| 2,034,033 A | 3/1936 | Green et al. | 178/44 |
| 2,034,035 A | 3/1936 | Green | 178/44 |
| 2,048,450 A | 7/1936 | Horn | 173/13 |
| 2,228,797 A | 1/1941 | Wassermann | 178/45 |
| 2,669,603 A | 2/1954 | Prache | |
| 2,787,656 A | 4/1957 | Raisbeck | 178/45 |
| 2,812,502 A | 11/1957 | Doherty | |
| 2,825,760 A | 3/1958 | Clogston | 178/45 |
| 3,160,702 A | 12/1964 | Lapsley | 174/32 |
| 3,215,768 A | 11/1965 | Murphy | 174/36 |
| 3,479,619 A | 11/1969 | Oestreich | 350/96.23 |
| 3,541,473 A | 11/1970 | Schlicke et al. | 333/12 |
| 3,573,676 A | 4/1971 | Mayer | 333/79 |
| 3,594,492 A | 7/1971 | Bahder et al. | 174/36 |
| 3,668,574 A | 6/1972 | Barlow | 333/95 S |
| 3,769,618 A | 10/1973 | Freeman et al. | |
| 3,865,466 A | 2/1975 | Freedman et al. | |
| 3,886,506 A | 5/1975 | Lorber | 333/96 |
| 4,010,315 A | 3/1977 | Mildner | 174/107 |
| 4,017,344 A | 4/1977 | Lorber et al. | 156/52 |
| 4,038,489 A | 7/1977 | Stenson et al. | 174/70 R |
| 4,054,365 A | 10/1977 | Marx et al. | 350/96 B |
| 4,079,192 A | 3/1978 | Josse | 174/126 CP |
| 4,097,119 A | 6/1978 | Kumamaru et al. | 350/96.23 |
| 4,114,121 A | 9/1978 | Barlow | 333/95 R |
| 4,125,741 A | 11/1978 | Wahl et al. | 174/120 SC |

(List continued on next page.)

Primary Examiner—Leslie Pascal
Assistant Examiner—Dalzid Singh

(57) ABSTRACT

A communications system is provided which includes a regional ring with a plurality of local nodes, each local node including at least one fiber interface device and at least one Local Node interface device for connection to a global electrical and fiber network. The Local Node interface device connects to a user interface device through a cable. The system may include a "super ring" or "super branch" to service an even larger number of subscribers than a regional ring alone. In these embodiments, a global backbone may extend past and be spliced into an switch transfer point, which is in turn connected to a super ring or branch. The super ring or branch is then connected in turn to a number of regional rings or branches.

13 Claims, 32 Drawing Sheets

U.S. PATENT DOCUMENTS

| | | | |
|---|---|---|---|
| 4,153,332 A | 5/1979 | Longoni | 350/96.23 |
| 4,156,104 A | 5/1979 | Mondello | 174/70 R |
| 4,157,518 A | 6/1979 | McCarthy | 333/237 |
| 4,158,478 A | 6/1979 | D'Auria et al. | 350/96.23 |
| 4,180,699 A | 12/1979 | Hochella | 174/126 CP |
| 4,278,955 A | 7/1981 | Lunden | 333/33 |
| 4,301,428 A | 11/1981 | Mayer | 333/12 |
| 4,308,421 A | 12/1981 | Bogese, II | 174/32 |
| 4,327,246 A | 4/1982 | Kincaid | 174/36 |
| 4,371,742 A | 2/1983 | Manly | 174/36 |
| 4,376,920 A | 3/1983 | Smith | 333/12 |
| 4,383,725 A | 5/1983 | Bogese et al. | 339/99 R |
| 4,461,923 A | 7/1984 | Bogese, II | 174/36 |
| 4,528,516 A | 7/1985 | Hill, III | 330/254 |
| 4,533,790 A | 8/1985 | Johnston et al. | 174/115 |
| 4,538,023 A | 8/1985 | Brisson | 174/115 |
| 4,546,210 A | 10/1985 | Akiba et al. | 174/114 R |
| 4,549,042 A | 10/1985 | Akiba et al. | 174/114 R |
| 4,642,417 A | 2/1987 | Ruthrof et al. | 174/36 |
| 4,684,766 A | 8/1987 | Tanaka et al. | 174/115 |
| 4,695,127 A | 9/1987 | Ohlhaber et al. | 350/96.23 |
| 4,697,051 A | 9/1987 | Beggs et al. | 178/63 D |
| 4,755,629 A | 7/1988 | Beggs et al. | 174/34 |
| 4,761,519 A | 8/1988 | Olson et al. | 174/107 |
| 4,793,686 A | 12/1988 | Saito | 350/96.23 |
| 4,807,962 A | 2/1989 | Arroyo et al. | |
| 4,852,965 A | 8/1989 | Mullin et al. | 350/96.23 |
| 4,896,939 A | 1/1990 | O'Brien | 350/96.23 |
| 4,899,333 A * | 2/1990 | Roediger | 370/427 |
| 4,907,855 A | 3/1990 | Oestreich | 350/96.23 |
| 5,042,904 A | 8/1991 | Story et al. | 385/105 |
| 5,069,840 A | 12/1991 | Arnott | 264/69 |
| 5,122,924 A | 6/1992 | Okumura | 361/330 |
| 5,131,064 A | 7/1992 | Arroyo et al. | 385/102 |
| 5,132,488 A | 7/1992 | Tessier et al. | 174/34 |
| 5,149,915 A | 9/1992 | Brunker et al. | 174/36 |
| 5,177,809 A | 1/1993 | Zeidler | |
| 5,187,329 A | 2/1993 | Bleich et al. | 174/113 R |
| 5,208,426 A | 5/1993 | Kennedy et al. | 174/36 |
| 5,220,297 A | 6/1993 | Crowhurst | 333/32 |
| 5,251,238 A | 10/1993 | Menk et al. | 375/106 |
| 5,262,234 A | 11/1993 | Minor et al. | |
| 5,262,592 A | 11/1993 | Aldissi | 174/36 |
| 5,271,876 A | 12/1993 | Ibar | 264/22 |
| 5,323,420 A | 6/1994 | Asprey | 375/4 |
| 5,334,271 A | 8/1994 | Bullock et al. | 156/51 |
| 5,349,133 A | 9/1994 | Rogers | 174/36 |
| 5,360,998 A | 11/1994 | Walling | 307/91 |
| 5,374,782 A | 12/1994 | Taylor et al. | 174/130 |
| 5,379,006 A | 1/1995 | McCorkle | 333/26 |
| 5,414,211 A | 5/1995 | Chan | 174/36 |
| 5,418,878 A | 5/1995 | Sass et al. | 385/101 |
| 5,430,256 A | 7/1995 | Taylor et al. | 174/128.1 |
| 5,448,669 A | 9/1995 | Dunn et al. | 385/101 |
| 5,457,560 A * | 10/1995 | Sharpe et al. | 359/137 |
| 5,467,420 A | 11/1995 | Rohrmann et al. | 385/101 |
| 5,481,635 A | 1/1996 | Arroyo et al. | 385/103 |
| 5,495,547 A | 2/1996 | Rafie et al. | 385/101 |
| 5,519,173 A | 5/1996 | Newmoyer et al. | 174/113 R |
| 5,539,851 A | 7/1996 | Taylor et al. | 385/101 |
| 5,543,092 A | 8/1996 | Ibar | 264/40.1 |
| 5,565,653 A | 10/1996 | Rofidal et al. | 174/113 R |
| 5,568,486 A | 10/1996 | Huscroft et al. | 370/94.2 |
| 5,574,250 A | 11/1996 | Hardie et al. | 174/36 |
| 5,574,260 A | 11/1996 | Broomall et al. | 174/102 R |
| 5,587,692 A | 12/1996 | Graham et al. | 333/12 |
| 5,597,981 A | 1/1997 | Hinoshita et al. | 174/110 R |
| 5,605,707 A | 2/1997 | Ibar | 425/144 |
| 5,606,151 A | 2/1997 | Siekierka et al. | 174/113 R |
| 5,608,832 A | 3/1997 | Pfandl et al. | 385/112 |
| 5,619,607 A | 4/1997 | Djupsjobacka | 385/129 |
| 5,656,872 A | 8/1997 | Lee | 307/91 |
| 5,658,406 A | 8/1997 | Walling et al. | 156/51 |
| 5,664,006 A | 9/1997 | Monte et al. | 455/405 |
| 5,665,936 A | 9/1997 | Sawamura et al. | 174/32 |
| 5,699,356 A | 12/1997 | Beever et al. | 370/329 |
| 5,705,201 A | 1/1998 | Ibar | 425/130 |
| 5,719,933 A | 2/1998 | Welch | 379/397 |
| 5,734,126 A | 3/1998 | Siekierka et al. | 174/113 R |
| 5,742,402 A | 4/1998 | Kobayashi et al. | 174/29 |
| 5,750,931 A | 5/1998 | McGregor et al. | 174/110 PM |
| 5,777,273 A | 7/1998 | Woody et al. | 174/113 R |
| 5,778,128 A | 7/1998 | Wildenman | 385/123 |
| 5,805,690 A | 9/1998 | Koepper et al. | 379/220 |
| 5,867,484 A | 2/1999 | Shaunfield | |
| 5,867,485 A | 2/1999 | Chambers et al. | 370/281 |
| 5,872,588 A | 2/1999 | Aras et al. | |
| 5,880,864 A * | 3/1999 | Williams et al. | 359/118 |
| 5,905,726 A | 5/1999 | Gupta | |
| 6,041,056 A * | 3/2000 | Bigham et al. | 370/395.64 |

\* cited by examiner

SUPER-RING ARCHITECTURE AND METHOD TO SUPPORT HIGH BANDWIDTH DIGITAL "LAST MILE" TELECOMMUNICATIONS SYSTEMS FOR UNLIMITED VIDEO ADDRESSABILITY IN HUB/STAR LOCAL LOOP ARCHITECTURES

CROSS-REFERENCE TO RELATED APPLICATIONS

This application is related to the following U.S. applications: U.S. Provisional Patent Application Ser. No. 60/054,076, filed Jul. 29, 1997; U.S. Provisional Patent Application Ser. No. 60/084,200, filed Apr. 30, 1998; U.S. Provisional Patent Application Ser. No. 60/085,195, filed May 12, 1998; and is a continuation-in-part of U.S. patent application Ser. No. 09/124,958, filed Jul. 29, 1998; and is a continuation-in-part of U.S. patent application Ser. No. 09/201,445, filed Nov. 30, 1998, entitled "Method and Software for an Electrically Optimized Hybrid "Last Mile" Telecommunications Cable System Including a Wireless Port"; and is a continuation-in-part of U.S. patent application Ser. No. 09/256,326, filed Feb. 23, 1999, entitled "User Interface Device Including HDTV for a "Last Mile" Telecommunications System", all of which are incorporated by reference herein.

TECHNICAL FIELD

The invention relates to telecommunications cabling, and more particularly to the cabling employed for the so-called "last mile" connection of users to external networks. The invention especially relates to improvements high level routing of information within such networks.

BACKGROUND AND SUMMARY OF THE INVENTION

An examination of existing legacy land line communications networks in light of communications technology evolution leads to some interesting insights. On the one hand, the newest long haul communications and information infrastructures being built today are based on fiber optic and coding technologies that are capable of immense capacity. On the other hand, the "last mile" local drop to the end user is typically still the legacy copper line installed decades ago for telephone service. Because the legacy copper lines were designed for performance that did not contemplate today's fiber optic capabilities, the copper line end users cannot use the high bit rates that modern long haul infrastructure can provide. The user is limited by his local drop connection to the service provider.

Looking at the communications system architectures currently being pursued by service providers, nearly all suffer from implicit assumptions that preserve the notion of connection based service. These background aspects are discussed below.

The "Last Mile"

The use of telecommunication resources has moved well beyond mere telephone calls. Voice communications messages are no longer the dominant kind of information flowing through the world's communication networks. Telecommunication users today use these resources for many other forms of information. Computer data and video are just examples of the future. Users are requiring that their communication link to the global networks have high bandwidth, i.e., digital data rate capability. The legacy links as well as the architecture of the central office (i.e., telephone exchange) and its cable to the user cannot deliver the information capability desired for all this data, video and other information.

There is a need for new network architecture that provides a broad bandwidth path to the user which can fulfill both present and future requirements. For any such new cable system, suitable bandwidth should be provided for today's end user with an electrical signal interface—not optical—while at little additional cost allowing the capability for optical signal transfer for that time when both the equipment and the end user's bandwidth utilization needs evolve. For the present, and the near future, the largest user bandwidth generally required (even for two-way communications) may still be contained within an interface providing a total channel capacity of under one-Gigabit per second. Relatively short spans are required to connect from any local distribution nodes of a new network. Certainly most such cable runs are well under the mile distance of the "Last Mile" appellation that has been applied to this class of cable system, and most of those runs (or "local drops.") will be well under a half mile. Such new networks' distribution "backbone" linking nodes may be well served by two-way fiber optic channels connecting many nodes envisioned for such a regional network. With the advent of digital signal transmission technology, the performance requirements for these local drops, or "last mile" legs of the cable system, present new and quite different objectives than have been addressed by the prior art. It is also possible that with an insightful electrical design, such a last mile cable may even be suitable for some short-haul inter-node links.

The cost of installing any cable system to individual users—not the cable itself—is substantial and is by far the largest portion of the network investment required of service providers. It is highly desirable if not essential that any new installation of such drop cables provide for future growth in capacity.

A Paradigm Shift in Network Architecture

Past communication networks have been almost entirely based on a "call" or "message" type of traffic where users were connected only transiently to the network while "calling" or being "called." Such connection-based architecture established a temporary-connecting path between caller and receiver. In the future, communications will be based on the "packet" switching principle. A packet message carries address information so that the sender gets the message to the receiver and vice-versa. All users may be continuously connected to such a network. Users will elect to actively participate and produce information "messages" only when they wish. The majority of activity in such a network will exist with data flowing, if only intermittently yet with great frequency to and from the user in a fashion not requiring the presence or active participation of the user. This kind of function more resembles the supply of electric power to users than the present call's connection based communication function except that such messages also originate from the user's installation as well as coming to the user from diverse sources foreign to the user's location. This represents new uses of communication processes to accommodate such functions as exemplified by network "agents" or "avatars" which operate independently, delivering information whenever their function requires. Similarly the user's system may originate information as a result of similar programming. "Passive" (i.e., non-user attention demanding) functions may in the very near future become the dominant volume of information traffic to be carried by the network.

Such a future requires significant increases in data rates. For example, in 1997, the entire volume of information flow in all long lines occurred with a rate of something just under $1\times10^{14}$ bits per second. It is likely that in just a few years one billion users may be connected by networks at which time the global information rate may approach $1\times10^{19}$ to $1\times10^{20}$ bits per second!

Although much of the fiber now in place in the world is dark, data rate growth will eventually present challenges. The use of wavelength division multiplexing ("WDM") in the optical carriers employed for fiber, as well as optical amplifiers and dispersion correction, can increase their capacity by several hundred times. Even so, large amounts of new fiber will be required to support ever larger and more ambitious applications. This will simply further aggravate the need for substantial bandwidth at the user's end of network systems. Improvements to meet this need must deliver hundreds of megabits per second ["Mb/s"], in send and receive modes, and preferably in duplex, i.e., simultaneously sending and receiving.

Many needs, unique to the last mile cable system, significantly affect the feasibility of last mile designs and influence its cost, durability and reliability. Present communication systems are capable of providing only limited bandwidth to the user even though their backbones in long distance and most local inter-exchange paths are fiber-based systems. Existing fiber paths have generally utilized only a very small portion of the information bandwidth potential of such fiber paths. The technology of 1997, for example, as mentioned above, provides the opportunity of sending many signals over a single fiber and of having each of those signals carry 10 to 20 Gigabits per second.

The optical fiber is presently in place; only the terminal connection is required to achieve such a result. Presently, some "Common Carriers" have been installing such bandwidth enhancing means on their networks' long haul portions just to handle their current and projected loads. There still exists considerable bandwidth capacity latent in those paths; however, little or no feasible technology presently exists to deliver substantial two-way bandwidth at the user terminal end of existing communication networks. Further significant is the current status of fiber use: most of the fibers now installed are dark. That is, they are in place but carry no signals. Present bandwidth limitations lie simply in the means to deliver the existing and the latent long haul bandwidth locally to the entire public at the same time.

Related U.S. patent application Ser. No. 09/124,958, entitled "ELECTRICALLY OPTIMIZED HYBRID LAST MILE TELECOMMUNICATIONS CABLE SYSTEM", to Taylor and Cotter, incorporated by reference above, discloses a cable system which may advantageously be used to provide for many of the needs discussed above.

In addition, recent attention has focused on the combination of wireless technologies and computer systems. For example, wireless data communications are being proposed to untether workers from their desktop computers. These combinations may be expected to be facilitated with an appropriate architecture at least because, e.g., PCS networks were originally built with a fully digital infrastructure. For these reasons, PCS architectures may evolve to create wireless local loops by building on the existing copper or fiber-to-the-curb infrastructures.

These proposed systems do not, e.g., provide wireless communications from a user to the local loop, however. They are proposed rather to provide a wireless local loop. There remains a need for a wireless communications link from a user to the local loop or to some other type of communications infrastructure.

The present invention addresses the manufacture and design of novel cable systems and related systems equipment for providing the last leg of a cable system linking users to a wired communication network capable of providing any user with greatly increased capacity and versatility over that presently available from common carriers. The subjects addressed herein relate to the actual physical link that must be employed to connect a user to a network system.

The present invention allows for future growth. As noted above, the cost of installing any last mile cable system to individual users is so substantial that any such new installation should provide for future growth. The incorporation of optical fibers into such local drop cables is essential to provide a true future growth option. Again, the cost of the optical fiber itself is relatively low, adding little to the overall initial cost.

A well-engineered cable system design capable of combining both wide bandwidth electrical and optical signal paths in a hybrid configuration thus becomes of exceptional value in the rapidly evolving communications field. If all local drops could be so constructed, present needs would be fulfilled and easy future expansion to optical use would be available when needed. With the advances provided by the invention, it is feasible to view this kind of new network construction as an infrastructure investment of long term worth.

The invention addresses physical and functional telecommunications delivery requirements by achieving a hybrid electrical/optical signal transmission cable system having broad electrical bandwidth appropriate for current and near-term foreseeable communications needs, along with a capability to accommodate optical fibers for the future. In this invention's cable system design, there may be a number of optical fibers present in each user's connection to the system. Anywhere from a few to possibly sixteen or more fibers may be readily accommodated without disturbing the cable system's electrical signal performance. The electrical signals contemplated range in frequency from DC to about one Gigahertz (GHz) or even more.

This novel cable system possesses two independent electrical paths, one for sending, and the other for receiving. Both the sending and receiving signal paths have equal performance and accomplish their equivalent signal performance without interference of one with the other. The conceptual architecture of this new system emphasizes the maintenance of a "four wire" connection, i.e., separation of the sending and receiving paths. Such architectures eliminate many problems of echo, return loss and "singing" that complicate present distribution systems. This new cable system is intended to service the full range of current and future needs. For example, the invention may accommodate Internet users, digital TV, high definition television ("HDTV"), multi-channel video-on-demand, high-capacity digital information exchange, work-at-home and telecommuting communications, myriad home and office services via "agents" and "avatars," automated manufacturing control, video "telephony," commercial and private video conferencing, high volume library file transfer and search, and multiple voice frequency "phone" service channels. Number portability (as in a transportable individual "phone number" which goes with a user wherever they go), now so highly sought, becomes a simple derivative of the nature of the Synchronous Digital Hierarchy/Synchronous Optical Network ("SDH/SONET") signaling basis employed by the disclosed system.

Many such applications require very broad bandwidth in both directions. The hybrid cable system design may serve all classes of users from the few who demand optical broad bandwidths here and now to the vast majority of currently much less demanding users. For the latter, a high quality electrical signal path with a Gigahertz or less bandwidth, far exceeding the capability of existing telephone wire pairs, will be adequate until they embrace, in the future, the more demanding applications.

An example configuration that may advantageously employ the present invention is shown in FIG. 1, which shows in a schematic form a local node-to-user interface. A local node 51 is shown with inputs from two-way optical fiber paths 53. The nature of this local node is described in more detail below. These may conveniently be links of optical paths using SDH/SONET format, ATM format, or other such formats. Additionally, through the use of WDM, a single fiber path may serve hundreds to thousands of drops. Another input 55 is shown for a possible Plain Old Telephone Service ("POTS") path. Further, a power source 57 is connected to the local node. This may be a battery backup source within the node or may be sourced from another location in the system. Within the local node 51, a Local Node interface device ("NID") 59 couples the sending and the receiving channels to the fibers. The basic channel of an NID includes an optical receiver connected to the receiver fiber path and an optical transmitter connected to the transmitter fiber path. Each of these opto-electric elements provides a number of user channels (typically 16 to 32). The NID can accommodate both an electrical mode 61 and an optical mode 63. A similar user interface device 65 ("UID") is connected at the user end. A hybrid cable according to an embodiment of the present invention is connected between the NID 63 and the UID 65 and is denoted here with the numeral 67. The UID may have outputs to a computer, a television, telephones, data inputs, etc. Numerous other drops may also be provided, these represented schematically by the numeral 69.

FIG. 2 shows a regional ring architecture which may employ the present invention. Starting from a global network or backbone 411, the initial connection is made to a switching and transfer point ("STP") 401. The backbone 411 is typically optical but may also employ electrical cabling. The backbone may be provided by a company such as QWEST or WINSTAR. The STP 401 is connected to a plurality of local nodes 51. One exemplary local node is 51'.

In FIG. 2, local node 51' is connected to a plurality of networks. One network serves a business district 403. Another network serves a shopping mall 405. Another network serves an industrial park 409. Still another network serves a plurality of neighborhoods 407. Each of these networks may connect to the local node 51' via cables 413. Cables 413 may include the cable of the present invention. At the local node 51' a NID 415 is shown. At a network such as the industrial park, a UID 417 is shown. These interface devices are described above and in more detail below.

It should be noted, however, that the regional ring architecture according to FIG. 2 may take many forms. For example, if a cable 413 services a single house, there may be a switching and transfer point at the house entry that distributes the signals from the cable to a plurality of rooms or devices. In this case, each room may be equipped with a local mini-node that services the appliances or devices within. Moving a device from one room to another may only require resetting of dip switches or moving jumper cables. As noted in more detail below, nodes or mini-nodes may be located by addresses inserted in signal headers by the UID. Each mini-node is advantageously capable of reading header information. For use in houses, cables of the type described below may be employed, but with less shielding and strengthening materials, such as stainless steel braid. In this fashion, the cables may be made more compact, which is desirable for in-house applications. Firewire may also advantageously be employed for this purpose.

In another embodiment, a so-called "super ring" may be employed to service an even larger number of subscribers. In these embodiments, a global backbone may extend past and be spliced into a STP, which is in turn connected to a super ring. The super ring is then connected in turn to a number of rings such as those shown in FIG. 2.

Implementations and advantages of a super ring may be manyfold. For example, a super ring may be implemented in an office building to service several or many rings to accommodate a large number of users. Super rings thus provide a structure and method to reach a large number of outlying users who may require service a great distance from a global backbone point. Correspondingly, devices employed in the super ring, such as the SRGTP, SBTP, and SN (described below) may conveniently and economically incorporate repeaters, eliminating the need for such devices in the cable itself. Of course, re-processing of the SONET frame within the devices themselves provides a regenerating process per se. Embodiments such as is described below allow easy incorporation of the invention into existing hub/star physical architectures (see FIG. 42). In particular, existing infrastructures for hub/star systems, including underground cablework, may be easily employed and retrofitted to use a system of the present invention. The existing holes need only be re-dug in order to lay the cables of the embodiment in the hub/star system.

In an alternative embodiment to the super ring, a super branch, similar in form to a super ring but in a linear form, may be employed to extend the communicative reach of the system.

Referring back to the ring of FIG. 2, a typical distance from a node to a user will be generally less than 2000 feet and in dense urban areas commonly less than 1000 feet. The hybrid cable system design of the subject invention may even be operated so as to allow its two pairs of electrical conductors to be used for two POTS lines, which may be used concurrently with wideband electrical operation. Of course, the fiber channels remain independent of the manner used for any electrical mode. These electrical lines may also serve to carry the very modest amounts of power needed to operate various last mile in-line signal regenerators and possible network devices for user terminal equipment, yet may still function without interfering with the ringing and "battery" voltage functions in a POTS operation. POTS functions may be better served by using the digital paths to provide one or even a multiple number of "phone" lines via a digital to voice interface "line card" in the UID.

The node system above would likely best employ the signal format of SONET or SDH standards now widely employed by the existing interoffice and long haul optical networks. This new cable system is thus highly forward and backward compatible. This again addresses an important cost/investment issue. The existing telephone copper-wire network ("outside plant") comprises more than three-quarters of the total present investment in existing local telephone network systems. The node, sometimes referred to here as a Local Node, accesses a multiplicity of SDH broadband frames and enables the same to be directed to a plurality of users distant from the node.

Reviewing the foregoing technical analysis of objectives and principles concerning the last mile cable system has led the inventors to a new form of shielded quad electrical conductor configuration and system elements, as well as the architecture to utilize it. This new cable also readily accommodates a number and variety of optical fibers in novel ways. The quad principle, fully realized, provides the dual (two) independent non-interfering sending and receiving electrical signal paths so essential for the last mile local drop. A quad cable concept is not new in itself, but this disclosure addresses many other factors which, by improving the realization of its potentials and extending the flexibility of the configuration, allows achievement of all the other characteristics required of last mile cable systems including optical fiber paths.

The present invention also discloses new structure, particularly suited to achieving the precision required in a quad geometry chosen for low cross-talk ("XTLK") across the objective wideband electrical performance spectrum. The invention's cable system structure provides novel methods for inclusion of diverse optical fibers.

The present invention also discloses new techniques for enhancing the effectiveness of protection from electromagnetic interference within the invention's cable systems.

Unique performance advantages emerge from the novel balanced electrical source and load termination devices disclosed and which may readily be incorporated into in-line digital signal regenerator modules.

A novel annular conductor construction is also disclosed which enhances electrical signal performance and improves EMIR performance. Novel and economic methods of manufacture for the new quad configuration are further disclosed which also achieve exceptional accuracy and stability of the mechanical structure.

A wireless port is also disclosed which may interface at one of several locations in the inventive last mile system. This port may, e.g., be part of the node, the NID, the STP, or the UID. The port may be embodied in a module which can translate the wireless protocol, e.g., CDMA or GSM, into a form usable by the UID or by the regional ring, e.g., LINUX or SONET/SDH, respectively. A software function within the port may also be employed to translate the wireless protocol into the form usable by optics/electronics attached to the port. In particular, if the wireless port is connected at a regional-ring-level location, such as at the STP or the node, the wireless port would be connected to a module employing software to translate the wireless protocol into, e.g., SONET/SDH. If the wireless port is attached to a UID-level location, the wireless port would be connected to a module employing software to translate the wireless protocol into, e.g., the UID routing software. Transmissions may be received directly through this wireless port; however, for several subscribers, the overall cost may be cheaper if the transmissions are routed through an NID or local node.

Software may also be provided within each UID, as described in more detail below, to process and route received signals. Software may further be provided within each UID to process and route signals transmitted from the UID and from devices downstream of the UID.

Provision may further be made for a port for HDTV. Such a port may be particularly advantageous due to the potential for very high bandwidth, especially in the downstream path. Regarding the upstream path, such a port may be highly advantageous if the UID is used for small-scale broadcasting. For example, a user may wish to produce a television program devoted to a particular hobby. The present invention, with a high-bandwidth upstream path, may conveniently allow such programming. More details of this embodiment are provided below under STP functions.

Provision may further be made for distribution of, e.g., movies via satellite, The high bandwidth would allow movies to be transmitted via satellite to a server in a movie theatre or to a server which services a number of movie theatres. The server may store the movie for subsequent theatrical distribution to the public or may alternatively show the same as it is received.

Advantages of the invention include one or more of the following. The invention, when combined with super rings, allows an even larger number of users and geographical areas to be serviced than the use of the inventive rings per se. Super rings provide a structure and method to reach a large number of outlying users who may require service a great distance from a global backbone point. Devices such as the SRGTP, SN, and STP eliminate or reduce the necessity for repeaters or regenerators in allowing the invention to reach such users.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

System and Interfaces

Referring back to FIG. 2, in which a system of Local Nodes is shown schematically, the fiber optic ring contains the many fibers of the regional system. Each such fiber path may follow a ring topology so that it physically goes in two directions from each node, ultimately connecting with the regional STP (Switch Transfer Point) 401 shown schematically in FIG. 2. The STP links the regional ring with the fiber or electrical backbone, such as a long-haul data network, and is a non-blocking, multicasting device which connects multiple users to the global networks and which may also connect incoming wireless transmissions and incoming wireline signals from the wired global network to and from the multiple users. The system is non-blocking at least in part because of the high bandwidth and capacity: blocked paths are not issues. The signal simply gets routed around the blockage if necessary. The STP may further provide operating power for the regional ring and for each of its Local Nodes, as well as for the UIDs connected thereto. Standby power may further be provided for in case the system were to be subject to a power outage. The system may employ a duplex path design so that there are separate transmitting and receiving paths throughout. At least two of the fibers in the bundle of fibers shown schematically would interface with any particular node 51.

Figure 3:
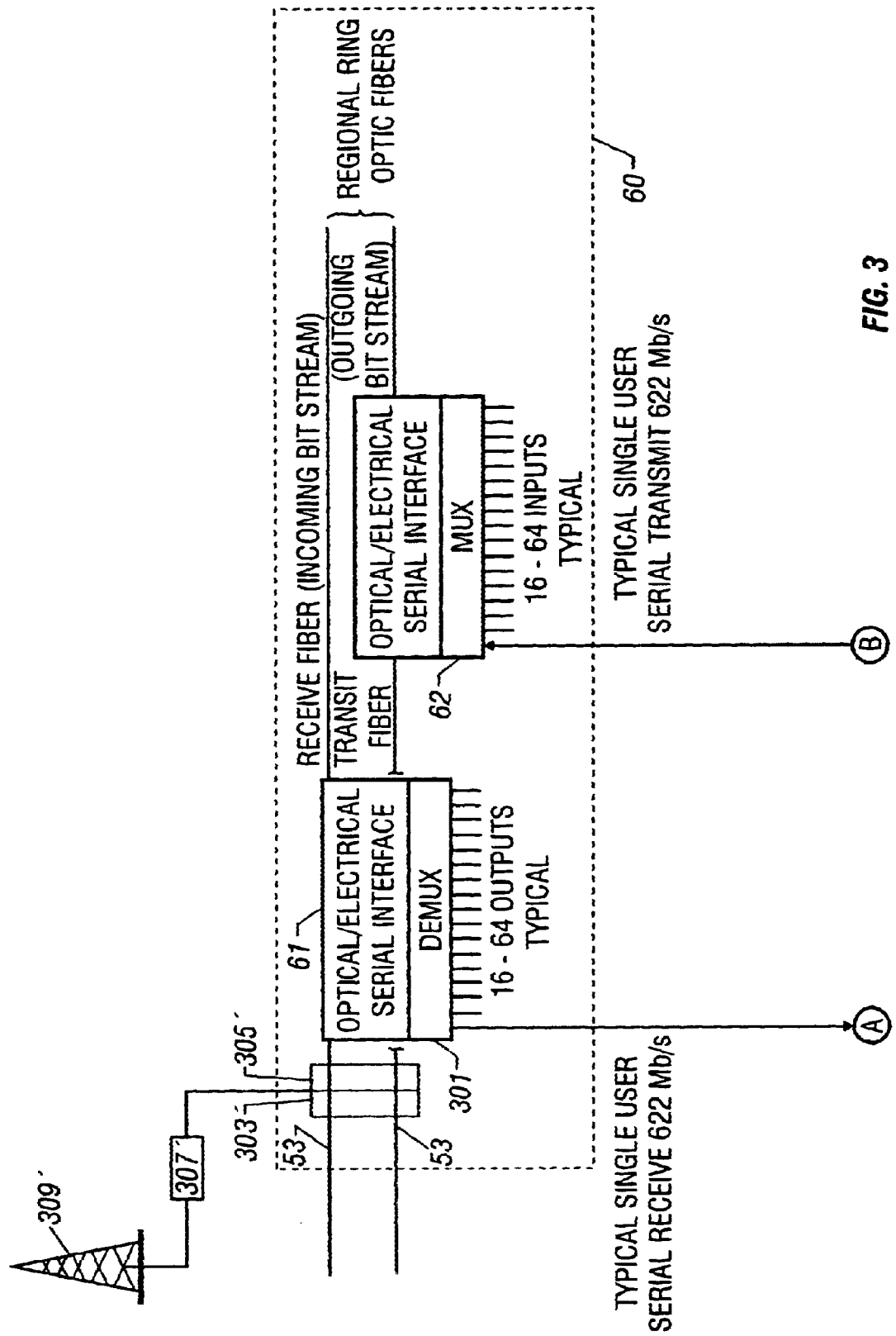
FIGS. 3 and 4 are schematic block diagrams of a fiber interface device (FIG. 3) and of a Local Node interface device (FIG. 4).
Figure 4:
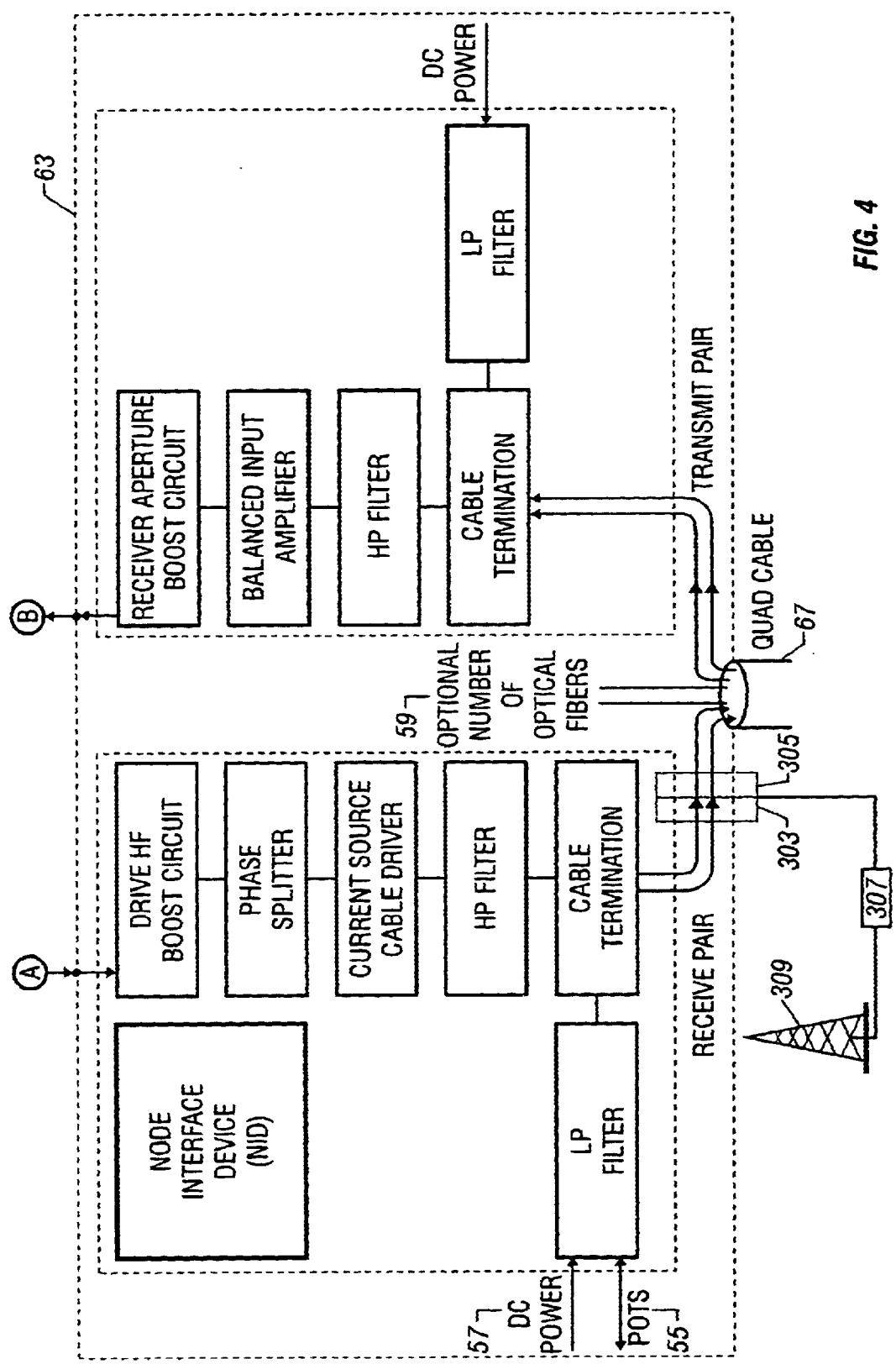

As shown in greater detail in FIGS. 3 and 4, a Fiber Interface Device ("FID") 60 couples its optical receiver 61 and its optical transmitter 62 to their respective receiving and transmitting optical fibers 53.

As termed here, a local node includes at least one "FID" and at least one NID per FID. Usually, several NIDs are provided per FID, such as about 16–64 NIDs. Demultiplexer ("DEMUX") 301 converts the multichannel signal on the fiber into the plurality of outputs. The manner in which the DEMUXing occurs depends on the encoding of the data, e.g., whether the data is encoded via TDM, WDM, etc. The elements of a FID are a shared resource for the channels fed by one such FID within a node. Any one of the FIDs in a node may serve from 16 to 32 or even up to and greater than 64 dual data paths and thus 16 to 64 or more NIDs. The FIDs are independently addressable. The node may contain as many FIDs as needed for the number of users to be served. The number of users per FID depends upon the level of multiplexing of the SDH transport carrier used. For example, STS-384 (10 Gbs) provides 32 channels of STS-12 (622 Mbs). A single Local Node might serve 3200 users within its economic range, if its last mile runs were economically short. If desired, the 622 Mbs lines may be split into a number of T1 or T3 lines to service, e.g., multi-tenant buildings.

The FID 60 and NID 63 elements can be modular in physical character and a node housing can be designed to accommodate substantial capacity additions where that seems desirable. The regional fiber bundle ring runs can also be specified to contain additional uncommitted fiber for further expansion of the users served by the system. A single node site may, in this way, be accommodating of expansion of users by connecting more of the fiber bundles of the ring to added FID and NID elements. FIGS. 3 and 4, of course, are non-limiting cases showing just one possible FID with just one NID connected. The receive optical/electrical serial interface 61 may be a fiber optic SDH wideband optical receiver of only limited sensitivity since the fiber cable runs will, in general, be fairly short—just around the regional ring. The DEMUX and multiplexer ("MUX") circuits may use one of the varieties of chips or chip sets now generally available for SDH. For example, the Vitesse Semiconductor Corp. chip set VS8021/8022 is an example of the kind of chip set that may be used for fiber data rates up to OC-48, and Triquint Semiconductor can supply a chip set package that operates at a 10 Gbs rate.

The FID may provide any number of additional functions. For example, the FID may provide decoding functions, or other functions which would otherwise be left to, e.g., the NID.

The NID contains those elements of the system that are responsible for coupling the physical cable to the FID and hence to the overall network system. The two separate paths are shown in FIGS. 3 and 4. NID 63 includes those portions that couple the serial receive path from a DEMUX output to the receive pair of cable 67 and also couples the transmit pair of the cable 67 to one of the serial transmit inputs of a MUX circuit.

The drive boost circuit of the receiver portion of the NID and the receiver aperture boost circuit of the transmit path are adjusted by the installer to give the clearest pattern and optimum BER (bit error rate) when the system is installed. The termination resistors on both transmit and receive pair terminals are impedance matching devices to minimize the reflections at those points. The current source driver appears to the system as an infinite impedance in all states of driving (i.e., bit high, bit low and transitions). The HPF and LPF elements help isolate the DC power from the active signals. Perfection of the cable balance is complemented by having the current source driver phase-balanced to the drivers and by having the balanced input amplifier highly rejecting of any common mode signals at the respective pairs, as is explained in detail below. The optical fibers contained in the Last Mile cable are not utilized in either of these schematic FIGS. 3–8. They are shown in certain of the figures as available fiber ends for future applications.

In some applications, the user may wish to affect the data prior to or after the data passes through the quad cable 67. For example, the user may desire to use a wireless link to affect the data passed to the quad cable. An "affect" of the type referred to here may be an application to switch on or off an appliance at the user's house using a cellular phone. To accomplish this, the invention also provides a method and apparatus to affect the data at one of several locations, this apparatus connected to a cellular communications module. One way in which to implement such an application is to use Sun Microsystems, Inc.'s Jini software code which is useful in allowing devices to communicate with each other regardless of their operating systems.

To accomplish this, and referring to FIGS. 3 and 4, a DEMUX 303/MUX 305 chip set is provided following the cable termination. This location is thus just prior to the signal entering the quad cable 67. An input from a wireless module 307, 10 described below, is provided to the DEMUX/MUX. This input serves to alter the DEMUXed data. Wireless module 307 is in turn connected to a wireless antenna 309.

The DEMUX/MUX need not occur at the prescribed location. For example, an optical, not electrical, DEMUX/MUX may be provided on the regional ring itself, e.g., at the location of the node, FID, or NID. Such a system is shown in FIGS. 3 and 4 by corresponding elements 303' to 309'. While such elements are different from elements 303 to 309 in that they act in the optical domain, their functions are otherwise analogous. Of course, in the eventual case where fiber is extended into the user domain, an all-optical system would be necessary. In this case, the DEMUX/MUX operates optically at the UID level. Also in this case, the SONET/SDH frame may be sent all the way downstream to the UID. An optical DEMUX may then operate on the frame therein. This may be particularly advantageous for hub/star or star/bus-type architectures. All-optical systems may employ, e.g., the optical routers at the LN of a kind similar to those being produced by Monterey Networks, Inc.

In yet another embodiment, a wireless input acts on the signal at the UID level. This may be in the electrical or in the optical domain. In particular, in an all-optical system, the DEMUX/MUX would act in the optical domain. In several ways, acting on the signal at the UID level may be the most convenient to implement.

In this embodiment, the basic structure may be as follows. As is known, a user's mobile unit may wirelessly connect to a cell site which is in turn connected to a mobile telephone switching office. The mobile telephone switching office is connected via a land telephone network to another mobile telephone switching office which is in turn connected to a cell site servicing a node, NID, or UID. Thus, a user on a cellular telephone may send information via land-based phone lines to their UID. A user may wish to have a land-based phone line dedicated to their UID for this purpose. The user's call may be routed through the POTS input 55. In an alternative embodiment, the user's call may be routed from the mobile telephone switching office directly to a fiber backbone. However, this last embodiment may entail significant capital investment. For some special situations, the user may employ a radio device to affect data in the UID or NID.

Figure 39:
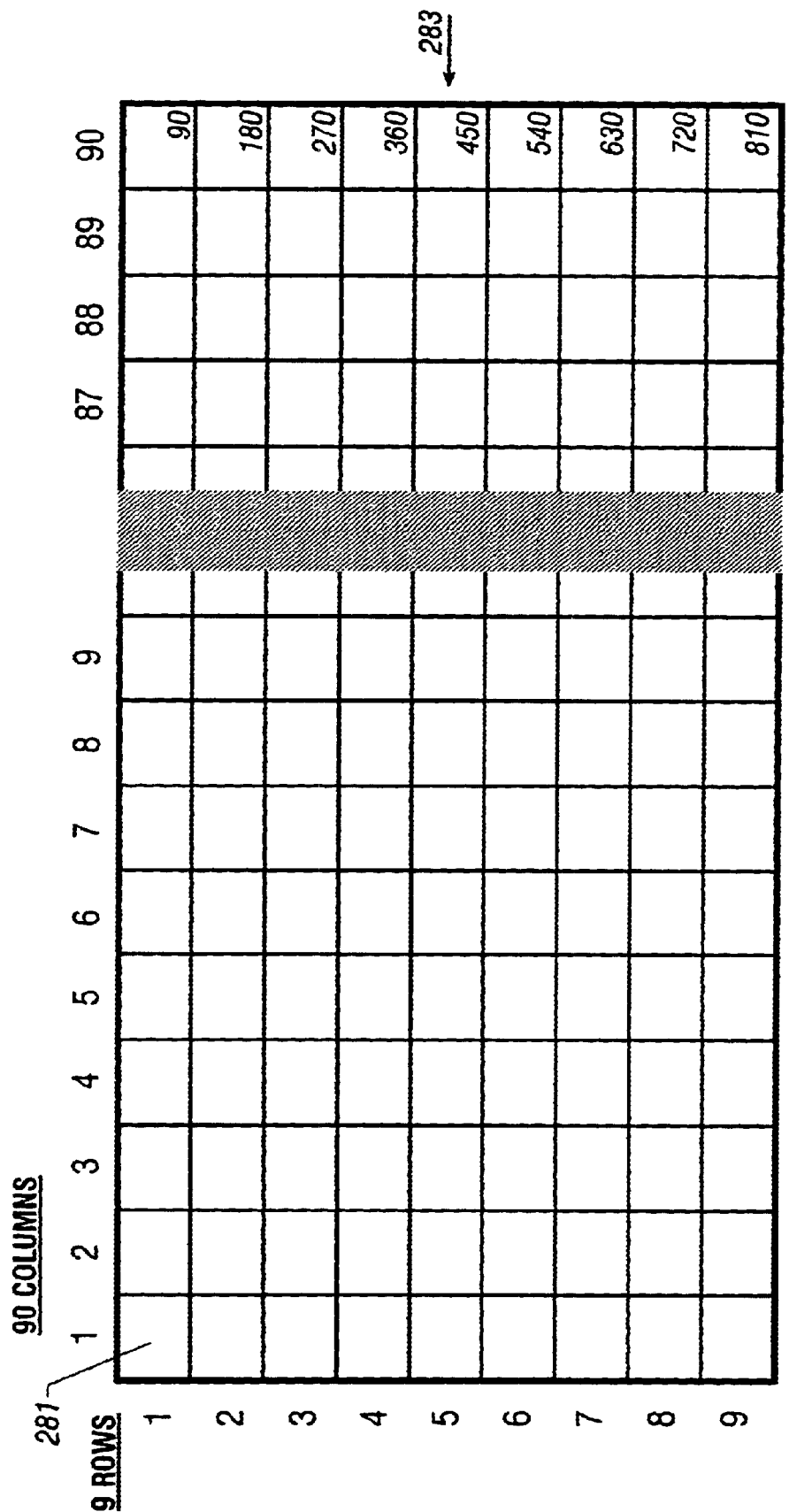
FIG. 39 shows a schematic form of the basic time frame of SONET or SDH transport time division multiplex.

However the signal is received, the user's call may initiate a change in the data in a DEMUXed data frame, e.g., the SONET/SDH frame. For example, a basic SONET/SDH frame is shown in FIG. 39. The basic frame has 8 bits per cell. By changing the data in this frame, the user may send a message to their UID causing a desired action to occur. The data in the frame may be changed in various manners. For the placement of elements 303–309 in FIGS. 3 and 4, the frame is already unique to a specific UID and thus header information relating to which NID/UID is intended may be omitted. This would also be true for the below embodiment in which the signal is affected following DEMUX by the UID.

However, for the DEMUX/MUX placement of elements 303'–309', the frame is not yet specific to an NID/UID and thus header information relating to which NID/UID is intended is required. In this latter embodiment, the header information would be used to route the optical signal to the appropriate FID from which it would be sent to the specific intended UID. The remainder of the operation would be the same as in the foregoing embodiments.

This alteration operation would entail decoding the data in the SONET frame and determining if the new data is redundant with or contrary to data in the present SONET frame. A protocol may be determined; e.g., the data originated last in time prevails. In this protocol, the user's data would take precedence over contrary data already present in the SONET frame.

In most situations, the new data may simply be in addition to data already present in the SONET frame. Thus, the new data is simply appended to the last data entry in the SONET frame. If required, a new frame could be created to handle the additional data.

It should be noted that the embodiment shown in FIGS. 3 and 4 shows the wireless link as connected to the FID 60. Of course, other embodiments may also be employed as are described herein or as would be known to one skilled in the art. For example, the wireless link may be embodied on its own at a point within the regional ring not connected to any particular node. Such a link may service the entirety of the regional ring. If a wireless signal arrives at the regional ring, part of the DEMUXing process would then entail adding additional header information in order to send the altered SONET frame to the appropriate node. An advantage of this embodiment is that the wireless link may be placed at some distance, including at some height, from the nearest node. In another embodiment, the wireless link could service additional regional rings via sending an appropriate signal to another regional ring via the STP.

In a variation of the above embodiment, a number of wireless links may be employed which may communicate with each other via a separate implementation of the standard wireless-mobile telephone switching office-wireless architecture. For example, a wireless transmitter/receiver may be located on each of several buildings. Each building may service a local node, which may include a number of adjacent buildings. Wireless signals may be used to transfer information between buildings having wireless links. Alternatively, the buildings may be tied together with, e.g., a fiber-optic connecting cable or via a separate regional ring. The buildings may also be placed in mutual communication via, e.g., microwave or RF radio links. When information is received by a building, that information may be inherently specific to a UID or NID within the regional ring serviced by that same building. The information, which may be in, e.g., CDMA, TDMA, or GSM form, is converted to a protocol language understandable by the ring architecture (e.g., SONET) and routed along the regional ring. Other systems which may be employed include ATM, IPv6, W-CDMA, etc. A return path is available via the STP. The approach has the advantage of being inexpensive and providing a very high bandwidth return path. It will be appreciated that a similar architecture may be employed in embodiments in which the buildings are linked not by wireless links but by broadband microwave communications, fiber cables, or a regional ring. Symmetrical broadband may further be employed.

In yet another embodiment, a central antenna may be provided with a satellite downlink. This central antenna may service several communities. Each communication has a sub-antenna which receives a signal from the central antenna. The communications link between the central antenna and the sub-antennas may be, e.g., via a microwave link, an RF radio link, LMDS, MMDS, or other similar link. Each sub-antenna may then be connected to an STP or other part of a regional ring, which it then services. This may be especially economically feasible as present wireless companies are not restricted in the number of towers they may construct. The regional ring then may connect a number of Local Nodes which connect to users via the cables which are one aspect of the present invention. This configuration is termed herein "converged wireless cable".

This system is analogous to a star/bus architecture which is common in cable companies. In a star/bus architecture or topology, end points on a network are connected to a common central switch by point-to-point links. From the end points, a bus is provided to extend the cable service to, e.g., several houses on a block. In the present invention, one difference is that the bus is a regional ring. Of course, many other advantages and differences are also present in the invention.

A particularly powerful implementation of converged wireless cable is the delivery of HDTV. Present cable companies cannot deliver HDTV. The central antenna and sub-antennas disclosed above, however, can advantageously be provided with sufficient bandwidth, in combination with the inventive cable, to easily provide HDTV from satellites or other wireless sources. One way of distributing the HDTV or other cable system is by the use of microwave multi-point distribution system ("MMDS") which is also known as multipoint multichannel distribution service. This system uses microwave transmissions to distribute cable from a single transmission point to multiple receiving points. Such systems may operate at, e.g., 2.3 GHz. Using this and the cable disclosed, HDTV may be deliverable without compression. For example, the nominal bandwidth allocation for each of the high-definition formats may be 19.3 megabits total in a broadcast multiplex (of which about 18 megabits is assigned to the video). For each of the different digital formats, an optional add-on multipurpose tuner may be provided that enables preselection of a given format—the decoded signal may then be routed to a mating TV set.

In a separate embodiment, once a HDTV signal is captured, it may be sent using an embodiment of the inventive cable at a high data rate, such as 622 Mb/s, to a separate server where distribution is independently controlled. Appropriate addressing may then be added to SONET/SDH frames of video data to send the same to paid subscribers.

Other techniques, such as LMDS (with rates up to 28 GHz), may also be employed as will be recognized, although MMDS has been recognized as being sturdier with respect to weather, etc. For the case of LMDS, the frequency is advantageously shifted downward to the FM regime in order to avoid the line of sight requirements implicit in a 28 GHz signal. Such shifting is even more important with respect to the higher frequencies presently being considered, e.g., 38 GHz. In these systems, all the channels supported would circulate around the regional ring, but only one may be sent down a cable to the user at a time. Periodically, the appropriate billing information would be sent upstream via the cable so that the user may be charged for their HDTV viewing if desired by the billing structure. Of course, the cable system of the invention allows complete two-way communications upstream and downstream. Recent FCC rulings have opened the way for such two-way communications, and the cable system of the present invention may advantageously use such allowances to provide a high bandwidth return path. High-bandwidth return paths are vital for the user to control content from their location. Far from just choosing which channel of HDTV to view, the high-bandwidth return path allows the user to provide content themselves and to upload content, perhaps continuously, to the regional ring and thus to the global backbone. In other words, the system is symmetrical and can provide very high bandwidth return paths as well as high bandwidth downstream paths.

Appropriate provision may be made for various compression techniques. For example, the user may employ VSB compression for their data. VSB compression is an analog format, and thus conversion to digital is necessary prior to launch into, e.g., a SONET/SDH frame. Once conversion and decompression are performed, all subsequent processing at higher bit rates may be achieved via MPEG-2 compression as is described below.

HDTV may be accommodated by receipt of the same from a satellite or antenna to the above-described central antenna. The signal may then be converted, e.g., to SONET/ SDH for subsequent distribution to the regional ring. The conversion process is dependent on the coding used for the HDTV signal. For example, the Grand Alliance HDTV system has two formats: 1920 pixels×1080 lines and 1280 pixels×720 lines. The Grand Alliance format may also incorporate MPEG-2 compression. A raw HDTV signal has a bit rate of approximately 1 Gb/s. MPEG-2 allows this to be compressed. Additional compression may result in a final video signal of approximately 19.2 Mb/s. A high level of MPEG-2 may allow a reprocessed HDTV bit rate of 60 Mbits/s. Compression however is not required given the high bit rate of the present invention, as disclosed above. If employed, it is noted that this compression format uses a transport layer with fixed length packets and 4-byte headers to multiplex video, audio, and auxiliary data streams. Software, hardware, or firmware located at the STP, within the ring, or within a local node may be used as a reprocessing center. If transmitted via satellite, limited bandwidth of satellite transponders may require even further compression such as is afforded by QPSK (about 2 bits/Hz).

MPEG-2 incorporates HDTV and code interlaced CCIR 601 video at bit rates that serve a large number of consumer applications. The bit-rate chosen for MPEG-2 optimization is 4 Mb/s, but rates as high as 429 Mb/s may be accommodated. Regarding the congestion noted above, MPEG-2 has features that may allow, e.g., prioritization so that networks can drop low priority packets in case of congestion. These capabilities may be useful for use in the regional ring system.

Software, hardware, or firmware located at or downstream of the reception point may be employed to translate the 4-byte MPEG-2 header into the SONET address structure (see FIG. 4f) and the packet into the SONET payload.

The conversion process described above would further include placement and installation of address headers onto the decoded HDTV/SONET signals. These headers would include address information corresponding to which user requested which program and thus which SONET frame should include the information. This information is also used in the upstream direction in which the user requests the information. This information may be sent in, e.g., a TCP/IP form or other such addressing protocol. Information corresponding to the address of the requesting user and the chosen channel may be maintained at, e.g., the STP until the information is received from the satellite and broadcast to the requesting user. The address headers may be of the TCP/IP type or may be of any other type capable of successfully routing information.

The conversion, such as by the STP, may advantageously remove any signal modulation or multiplexing artifacts. These may include QAM codes, etc. In this way, a higher quality video signal may be delivered to the user. The conversion need not decompress the MPEG-2 from the signal: the MPEG-2 may be decompressed subsequently at, e.g., the user's UID or set-top box. Of course, MPEG-2 decompression is not completely transparent; losses may occur in bit error and poor continuous motion (usually termed "motion portrayal"). For these reasons, it may be advantageous to decompress the MPEG-2 portion of the signal at the STP or at the antenna or satellite receiving point so that it can be made economically feasible to perform the decompression by equipment of very high quality. The MPEG-2 portion may then if desired be recompressed at an even higher bit rate. The MPEG-2 decompression process, at the subscriber end, would then be an easier operation to perform and may be done so with less loss, resulting in a higher quality picture. In doing its processing, the STP may strip off all other signal modulation/multiplexing artifacts as well, such as QAM, etc. In this way, the goal of providing the user with a high quality picture may be achieved. The system may even eliminate the present day set-top boxes because the billing software can control which UID receives a signal and which is temporarily "cut-off" for, e.g., late payment or cancellation of service.

While the point of conversion has been described above as particular to an STP, it will be noted that various other conversion points may also be employed: a head end (for, e.g., cable TV), a central office, a local node, points connected to an STP or local node or other part of a ring, a UID, or an alternative reception point along a transmission path to an STP, a regional ring, or a local node. Furthermore, the above discussion should not be interpreted as specific to a regional ring employed SONET and a fiber link. Rather, the entire ring may operate in an electrical mode with electrical cabling. Moreover, conversion between a continuous stream of frames of data and a non-continuous stream of cells of data, such as may be employed in HDTV or other standard broadcast formats, may use the technique of U.S. Pat. No. 5,568,486 issued Oct. 22, 1996 to Huscroft et al., incorporated herein by reference.

Of course, antenna- or cable-receipt of regular VHF or UHF programming may proceed in the same way. Either or both may be effectively distributed by the regional ring according to the principles of the present invention.

Headroom considerations are also important in delivery of HDTV. Streaming video is seriously inhibited by blockage or congestion. If video recompression allowed delivery of HDTV at 80 Mb/s per channel and three channels were delivered simultaneously, a total of 240 Mb/s would have to be accommodated. Adding to this two internet feeds at 155 Mb/s and, e.g., a video telephone and other devices would begin to seriously degrade the capacity even if delivered at 622 Mb/s. To remedy this, the NID or local node may be designed with a variable bit rate internet delivery capability. The total bit rate delivered to the UID may be monitored so that sufficient headroom is maintained. If the headroom decreases significantly, causing a subsequent degradation in HDTV signal, the bit rate of a different component may be adjusted to compensate, thus maintaining the constancy of the HDTV rate and the quality of the signal. In particular, the compensation may include decreasing the bit rate delivered of an internet connection, as the same is likely to be the type of signal least adversely affected by a reduced bit rate.

In a related embodiment, provision may further be made for distribution of, e.g., movies via satellite. The high bandwidth provided by the present invention allows movies to be transmitted via satellite to a server in a movie theatre or to a central server which services a number of movie theatres. The server may store the movie for subsequent theatrical distribution to the public or may alternatively show the same as it is received. The high bandwidth, e.g., 622 Mb/s, may even allow such distribution to occur without substantial compression. Such distribution may be especially advantageous in, e.g., high density urban areas.

Regarding billing, it is noted that the invention may provide an excellent billing function which is presently significantly lacking in the industry. The two-way communications allow for convenient routing of information relating to, e.g., electricity usage, wireless fees, pay-TV usage, downloading of files such as music or games, etc. In particular, the user interface device may be used to keep track of the usage of each device connected to the same via the various interfaces and interface cards. The billing or accounting database may be located at the STP, the Local Node, etc. For example, the billing database may be located at the UID in the same way an electric meter is located on a house. Alternatively, the billing database may be located upstream of the STP, at a regional or central location. Besides billing, other important information could be passed upstream including outage or service requirements, subscriber's viewing and marketing data, advertisements viewed, etc. Marketing data may be encoded as it relates to more personal information.

Such billing functions may be very advantageously employed with respect to the HDTV methodology discussed above. The billing software may be connected to the STP routing point for, e.g., satellite-delivered video and as such may control its distribution. Thus, control may be exercised over which subscribers receive which signals. The billing software may further allow that some subscribers be temporarily shut-off from programming for non-payment or for abuse of their upstream path (e.g., abusive upstream programming, etc.) or for termination of service.

It is further noted that such sub-antennas may be well-suited to be mounted on and connected to STPs for each regional ring. Of course, the cell sites may be physically located on a separate tower and connected to the regional ring or straight to the STP. Wherever the sub-antennas are mounted, the received signal may then be converted to a SONET/SDH frame (or other protocol) at the STP via hardware, software, or firmware. That is, an IP protocol may be provided to convert the wireless signal to optical or electrical. For some content, the manufacturer or distributor may provide a code necessary to enable the decoding. This type of distribution may be particularly powerful for, e.g., motion pictures, to enable uniform distribution nationwide.

Figure 5:
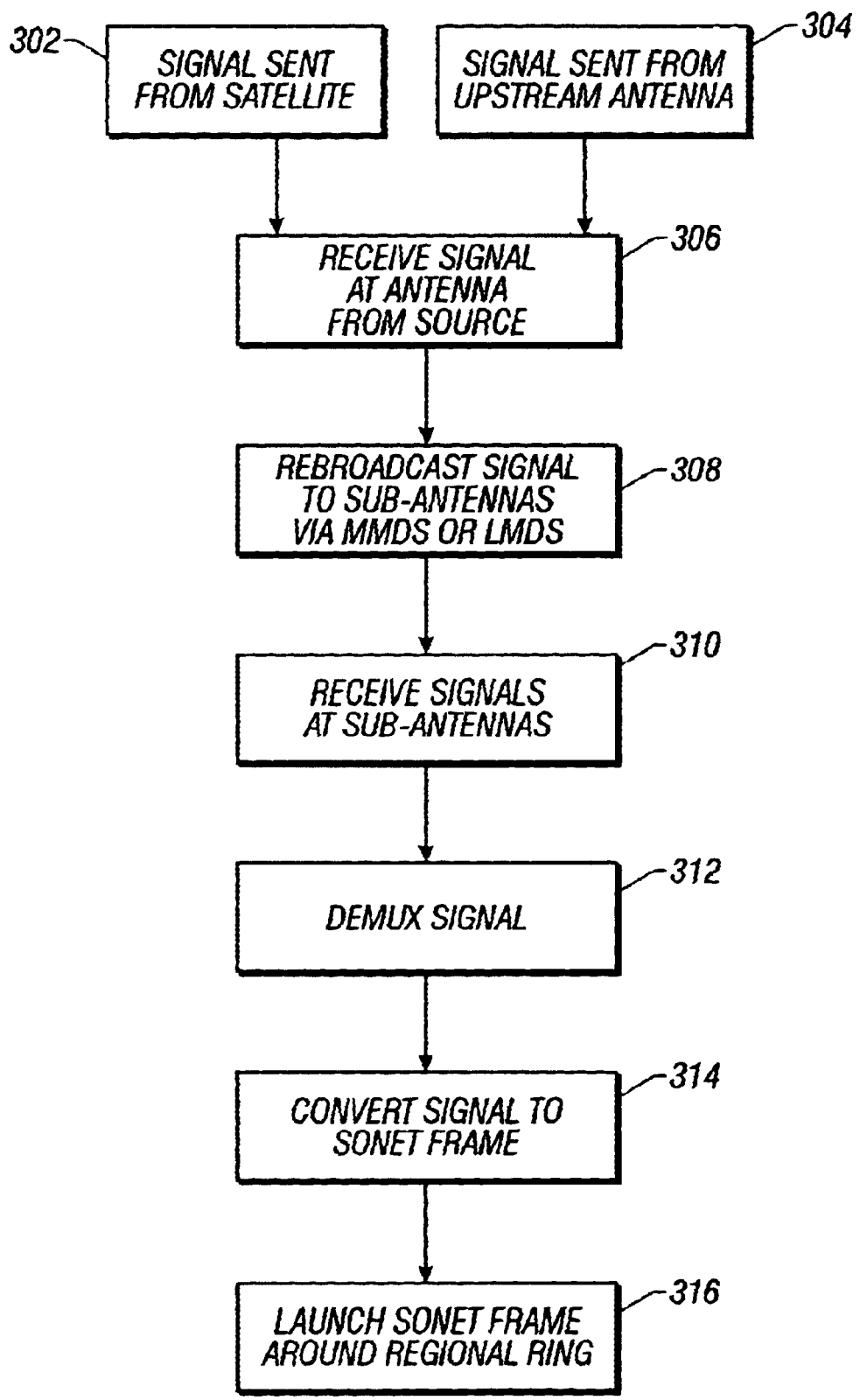
FIG. 5 is a flowchart of a process according to an embodiment of the invention.

An example flowchart of the conversion process is seen in FIG. 5. Step 302 shows a signal being received from a satellite. This signal may be a HDTV signal, e.g. Alternatively, a signal may be received from some other upstream antenna (step 304). The signal is received at the central antenna (step 306). The signal is then rebroadcasted to the sub-antennas via a system such as MMDS or LMDS (step 308). The sub-antennas receive the rebroadcasted signal (step 310), and the signal is DEMUXed (step 312). The signal is then converted to a frame suitable for transmission around the regional ring (step 314). In FIG. 5, a SONET/SDH format is shown, although it will be recognized that other formats may also be employed. This data format may be, e.g., optical or electrical. The frame is then launched around the regional ring (step 316).

This embodiment may be advantageously employed for residential applications as well as commercial ones. For example, a residential application may employ the same format with a centralized transmission point to a plurality of local regional rings. Each regional ring may have its own dish to receive the signals.

Returning to the architecture of FIGS. 3 and 4, the altered SONET frame may be MUXed prior to its launch onto the data stream. In the following embodiment, the data is altered subsequent to its DEMUXing by the UID and no further MUXing is required.

Figure 6:
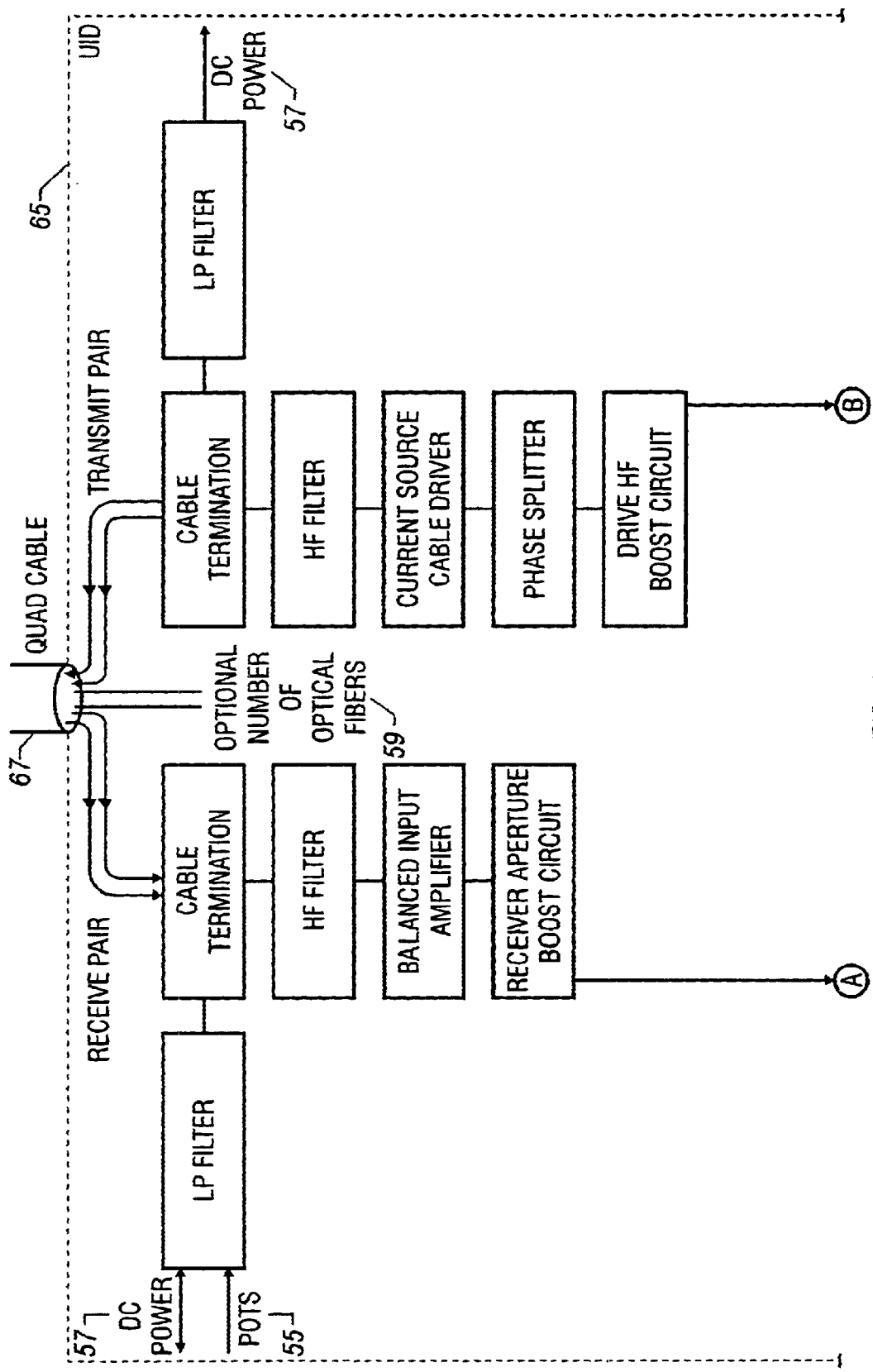
FIGS. 6 and 7 are schematic block diagrams of a user interface device.
Figure 7:
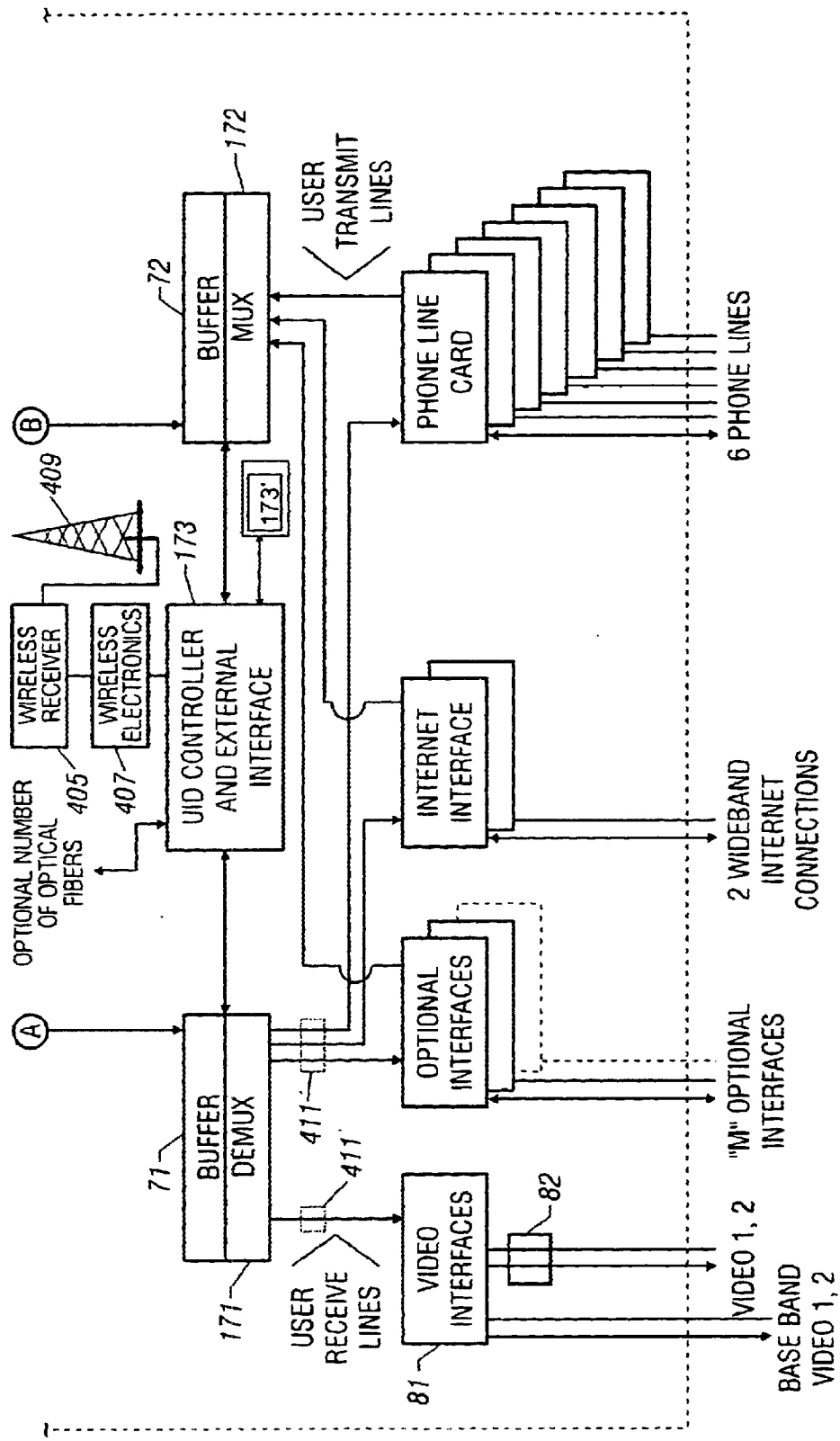

In this embodiment, the data is altered at or near the UID. The UID is shown schematically in FIGS. 6 and 7. The cable 67, 10 in this figure, represents the same cable 67 (the opposite end) shown in FIGS. 3 and 4. The example signal envisioned for each of the dual paths is a 622 SDH-like bit stream. Of course, other types of signals may be used as are known in the art. The receiving and transmitting paths, processed as cable wire pairs, operate in a manner similar to the circuit function of FIGS. 3 and 4. Those elements operate similarly up to the buffers 71, 72 of DEMUX AND MUX elements 171 and 172, respectively. These DEMUX/MUX elements operate in a manner similar to the higher speed circuit shown in FIGS. 3 and 4 but at the lower speed of the individual user bit stream—622 Mbs. They function to distribute the appropriate cells of the SDH frame to the functions assigned by the system design. Of the many possible such assignments, a typical selection is shown in FIGS. 6 and 7, involving a video interface, an Internet interface, and numerous optional interfaces including interfaces for wireless or wired communications. The UID controller 173 may be a microprocessor or a computer. The UID controller 173 also may put software headers on signals routed to various devices attached to the node or mini-node. Similarly, headers may be placed by the UID on signals sent upstream to the NID and FID to indicate where the signals should be sent as well as the nature of the signals.

Figure 1:
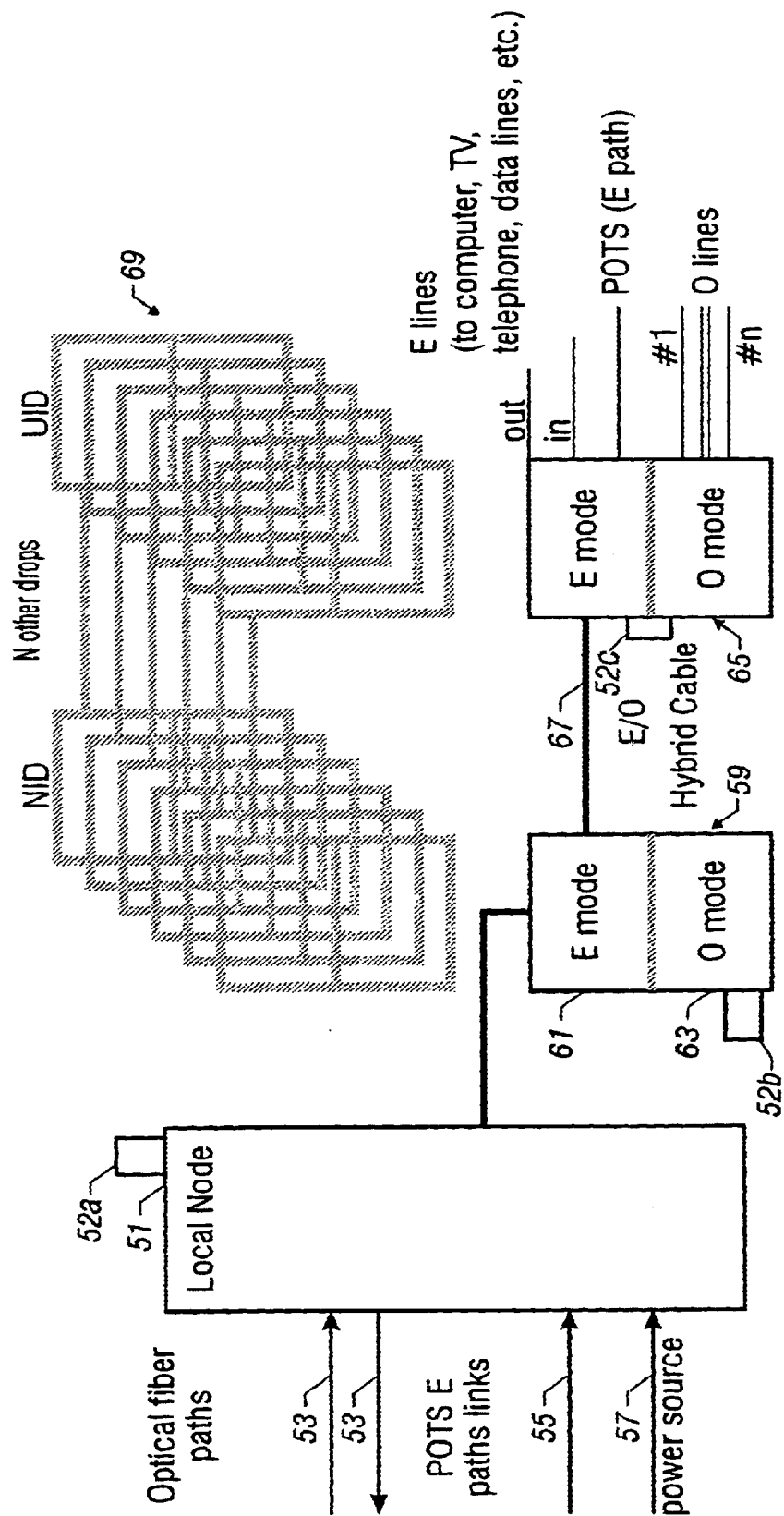
FIG. 1 is a block diagram of an organization of a local node serving multiple users via the novel cable design with two-way full bandwidth electrical or optical paths. Shown also is the possible use with POTS service.
Figure 2:
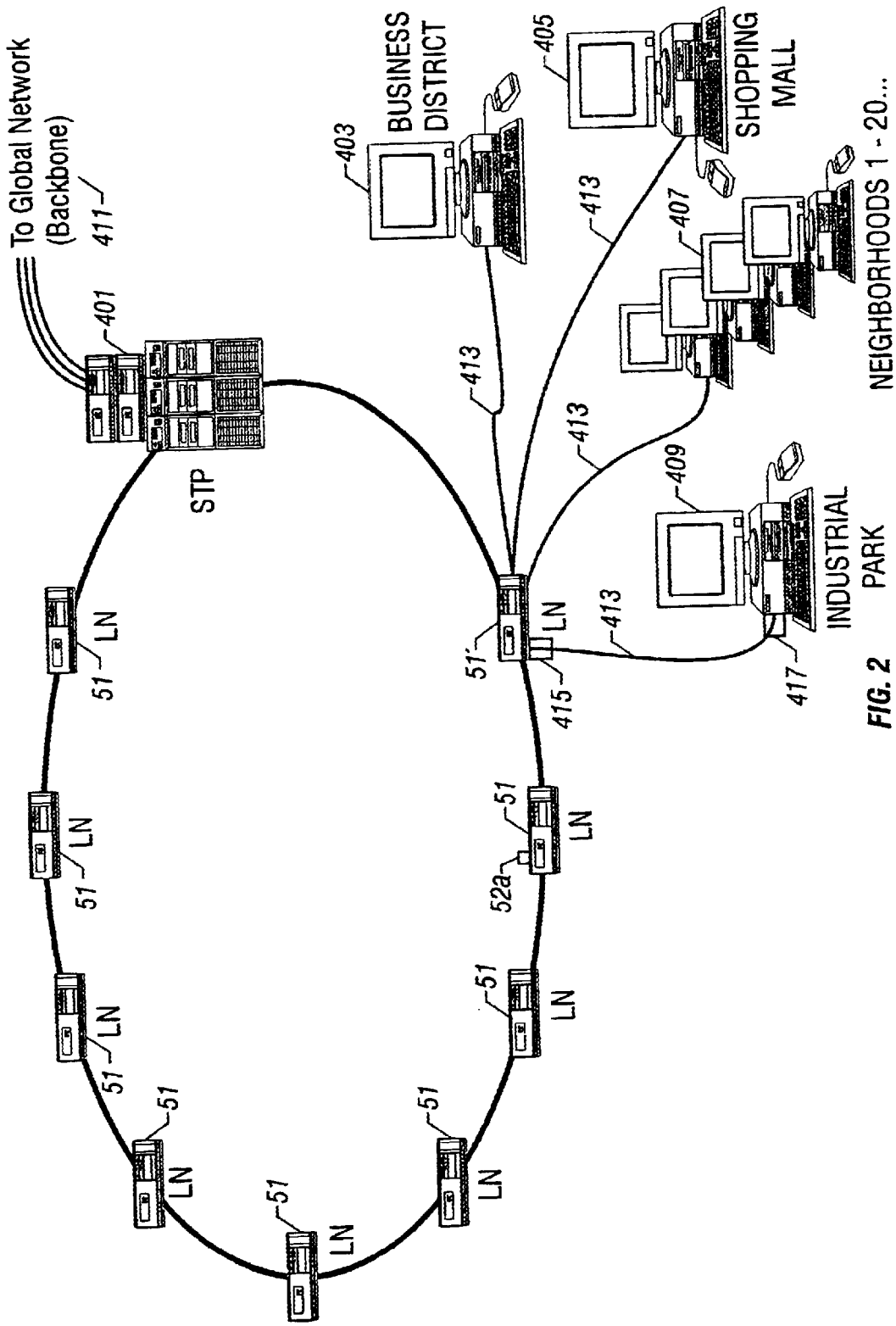
FIG. 2 is a diagram of the organization of a regional communications ring employing the novel cable design for the last mile connection to the end users.

There are two video paths for the user. Each of the two is available as baseband video or as an RF signal suitable for existing TV receivers. These outputs may be connected via jacks or the TV RG-59 cable connectors commonly used on TV sets. Of course, to connect a digital UID to an analog television requires a video interface 81 which may employ a digital-to-analog converter 82. Converter 82 may convert digital television signals to a form appropriate for analog televisions. This allows users with analog televisions to use the UID. Converter 82 may be, e.g., a separate line card. The assignment of the digital data rate for this function may be any desired level of use of the channel capacity; however, about 100 Mbs for each may be optimal for the system, permitting quite high resolution video to be transferred. A multi-purpose tuner may also be employed as an add-on module as the same allows tuning to a variety of different digital television formats. The program choice in such a system is made by transmitting to the network instructions for the source and the program desired. Additionally, sources may also permit the user to specify the duration wanted. Such instructions would be sent on one of the sending interfaces by means of a simple keypad entry system. Were it desired to only receive a broadcast type of video transmission, the user would simply enter the channel number of the program desired. This operates as what has been called video-on demand. The STP of FIG. 2 is one point in the system at which these functions of switching and selection may be executed. The system allows many service providers to deliver their offerings via the system. The number of possible selections is as large as the number of possible addresses.

At least two internet paths may be provided, each of wideband capacity, which may be 10 MBs, 45 Mbs, or even more depending on the requirements of the user and the ability of the ISP to provide the data rate, although this choice is arbitrary. This bandwidth would use only a few percent of the available capacity of a dual 622 Mbs system and is typically 400 times more capacious than the current best telephone modems. The interface mechanical connection may be one of the standard computer formats such as a 1394 serial buss. The digital paths may be addressed to any Internet Service Provider that connects with the system. The reach of such sources is considerably extended by the SDH-based format which enables communication with sources at any point in the global network irrespective of distance, since the digital format does not deteriorate with distance to any significant extent.

The system is shown with six phone lines that connect with the digital network via the SDH signal paths. The "line card" elements supply the common 48 volt DC current loop to the standard telephone and also provide the 20 Hz ringing function and the voice digitizing receive and transmit paths. The line card outputs may be RJ-11 type standard telephone hardware.

Other line cards may also be provided to support typical set-top box functions, such as those manufactured by Broadcom, Inc., or to support cable-TV.

A wireless path is also provided as shown in FIGS. 6 and 7. In this path, a wireless transmitter/receiver 405 is shown coupled to the UID controller 173 via an optional wireless electronics system 407. The wireless transmitter/receiver 405 is then coupled to an appropriate type of antenna 409. Wireless transmitter/receiver 405 may be placed, it is recognized, at other locations in the system as well. For example, wireless transmitter/receiver 405 be located at the location denoted as location 411 or 411'. That is, the positional requirement for wireless transmitter/receiver 405 is that it be placed where the same may affect a portion of data in the circuit.

Using wireless transmitter/receiver 405, the user may affect the UID via a wireless connection such as a cellular phone. For example, the user may switch on a home appliance via their cellular phone contacting their UID via the wireless link.

In the location shown in FIGS. 6 and 7 of the wireless transmitter/receiver 405, the user would affect or alter the data at a point in the circuit downstream of the DEMUX 171 but prior to the signals physically splitting into different signal paths. Depending on the type of signal employed, the alteration of data may be similar then to that described in connection with FIGS. 3 and 4. The alteration may occur at any point following the DEMUXing. In certain situations, a separate DEMUX/MUX step may occur prior to the signal reaching DEMUX 171.

In location 411, the wireless link would only affect the video interface, and thus such a location may have limited application. In location 411', the wireless link could affect the optional interfaces, the internet interface, and the phone lines. In addition, data from the alteration could advantageously be easily rerouted up to the transmit circuitry.

Wireless electronics 407 serves for additional processing of the signal from the wireless transmitter/receiver 405. For example, many current cellular systems employ a form of digital cellular phone service termed code division multiple access ("CDMA"). CDMA is a spread spectrum technology that assigns a code to all speech bits, sends a scrambled transmission of the encoded speech over the air, and reassembles the speech to its original format. This technique provides a very effective and efficient use of the spectrum.

Thus, wireless electronics 407 could be a dedicated wireless port which employs an algorithm, implemented in software, hardware, firmware, or a combination of the three, to accommodate signals sent in the CDMA protocol and may allow such signals to be translated into the software language of the UID. For example, one possible software language for the UID is LINUX, and the wireless electronics 407 could translate, e.g., CDMA into LINUX. Of course, the software could also then translate signals into the standard for transmission, e.g., back into CDMA, for various purposes such as verification that the signal was received by the UID. Furthermore, the plug-in module could be replaced to accommodate different types of wireless standards or upgrades.

It is noted in the wireless embodiments of FIGS. 3–8 that satellite wireless may also be accommodated. In other words, the same procedures and methods would apply except that the transmissions would arrive from and be sent to satellites.

It is further noted that in each of these embodiments an "open industry standard port" could be provided. For example, a standard interface of socket(s) or protocol(s) may be employed for connection with controller 173. The structure of such a standard port may vary depending on the consensus of requirements from users. Once a standard port is defined, however, any level of control may be employed. For example, the level of control may vary from a simple electrical control of an optional interface device up to complete automated control of every device connected to the UID. One possible open industry standard port may advantageously employ Firewire, e.g., 125 μsec standard Firewire, which advantageously has the same time base as SONET. This feature allows activation of addressable video at the UID, i.e., allows interactivity between the user and the UID. Firewire, also known as IEEE 1394, is a high-speed bus protocol that transfers data at up to 400 Mb/s, and may advantageously be employed as an interface for digital video peripherals, and may be further employed for high-speed modems.

It is still further noted in each of these embodiments that the cabling from a UID to, e.g., appliances within a home, may be accomplished in a wireless fashion. It is likely that wireless communications may not be efficient for these purposes, however, and that a direct radio link would be preferable, a computer analog of which is available (for computer networking) from Diamond Multimedia. Alternatively, the phone jacks within a house can also provide a convenient way to connect devices to each other and to the UID.

Software Considerations

Software may be resident in each of the components of the system to operate the various functions. Of course, the software may be implemented in hardware, firmware, microcode, or various other media as are known.

Software functions serve to translate the received SONET frame into a form usable by the UID. Such software may be implemented at any point between the FID and the UID, including the endpoints of this path.

The SONET frame, as will be discussed in more detail below, includes a header and a payload. Actually, the header is a multiple header, carrying both a SONET header and an IP header. The SONET header is necessary to route the signal but it is noted that SONET is simply the way in which the information is carried. Other methodologies besides SONET may also be implemented. Another header, following the SONET header, is the IP header. A final header (in this simplified scheme) is the UID header. Headers which identify information such as may be used downstream of the UID (e.g., an appliance) are located within the SONET payload.

Figure 15:
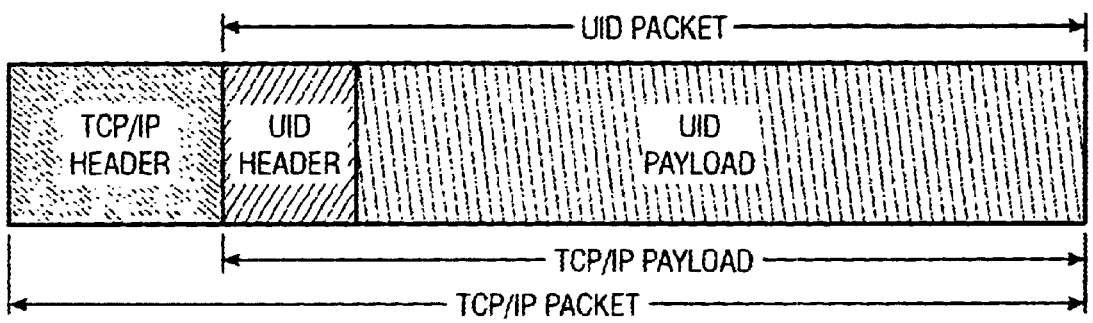
FIG. 15 is a schematic layout of the structure of a TCP/IP pocket.

A schematic layout of the structure of a TCP/IP packet is shown in FIG. 15. A TCP/IP packet is shown as a combination of a TCP/IP header and a TCP/IP payload. The TCP/IP payload is the same as the UID packet. The UID packet includes the UID header and the UID payload. The UID payload may include additional headers as mentioned above. For example, for FIREWIRE applications, a 128 bit addressing structure may be employed for these "submessages" sent to separate device locations. These device locations may be within a house, for example. Mini-nodes within the house may be employed for routing using DIP switches.

Mini-nodes may be less advantageous in situations in which use of a serial bus (and just one cable) is desired for simplicity.

These TCP/IP headers or so-called "subheaders" may employ, e.g., v.6 header structures for internet communications. The TCP/IP headers are of fixed size, such as about 256 bits of addressing and 188 bits for, e.g., timing, and are followed by the payload. The timing bits allow a timing protocol to be employed, eliminating more massive addressing schemes.

STS-12 systems may also be employed, where these are twelve times the basic frame: only the first frame then requires the four overhead columns.

Conversion of Wireless Signals to SONET/SDH

This aspect is discussed in more detail below under STP functions, as it is at the STP where such functionality may advantageously occur. However, it is further noted that the UID software may employ these features also. For example, if a dedicated wireless port is located at the UID, then the software may provide some or all of the conversion from the wireless mode to the language of the UID, e.g., C++ or other such language, depending on the processor controlling the UID.

Routing of Signals Within the Local Node

Routing of Signals Within the User Interface Device

The UID requires software to route the signals as received from the cable to the various input/output devices. The UID software also routes the signals as received from the various input/output devices upstream to the cable and further to the Local Node. A major advantage of the present invention is this two-way high-bandwidth communications path. Thus, the software must include a set of drivers for controlling the various interface cards which service the various input/output devices. These drivers should be replaceable and updateable. The interface cards may preferably be "plug-and-play" for ease of use.

Figure 8:
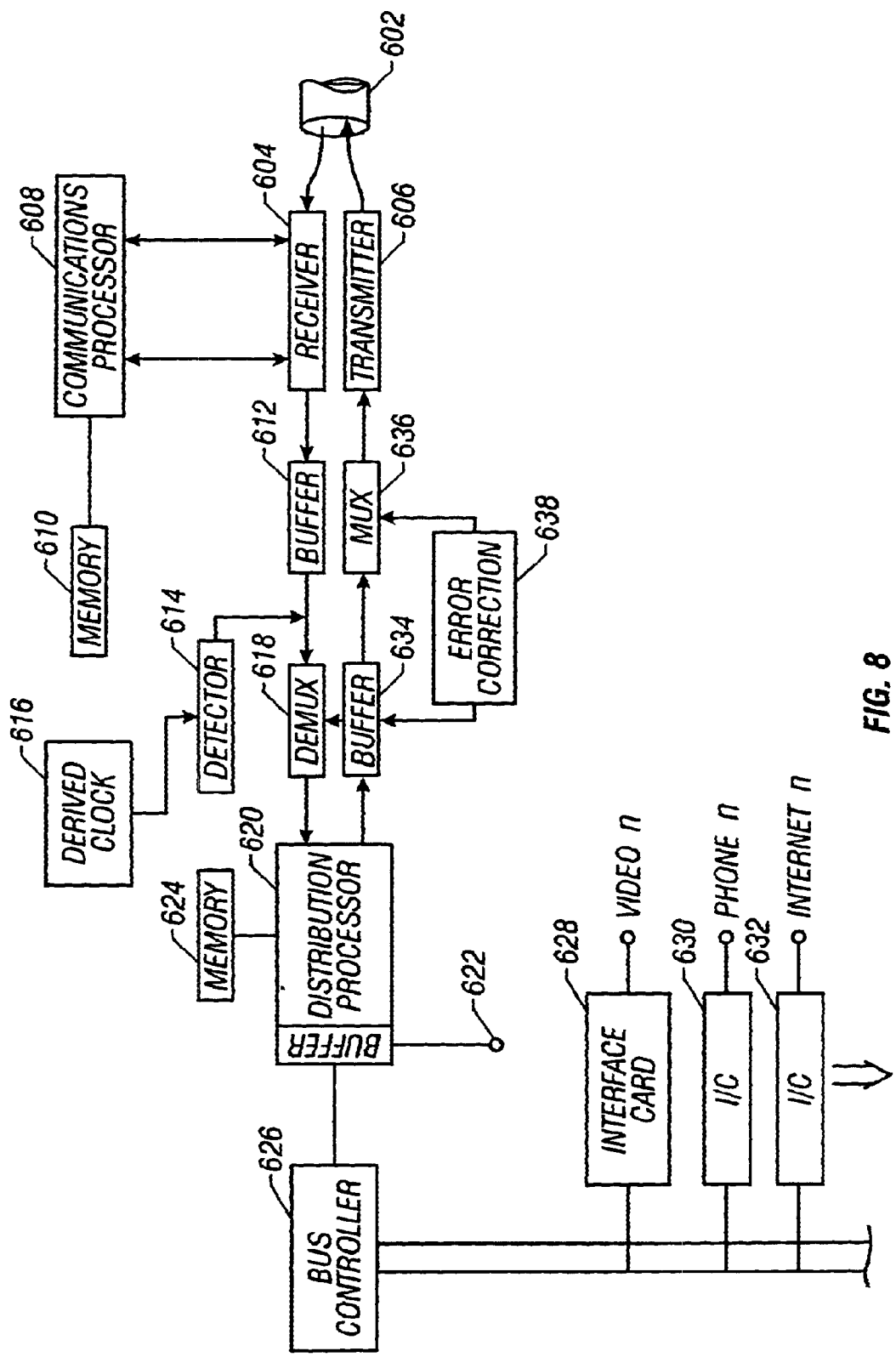
FIG. 8 is a schematic drawing showing the flow of signals within a user interface device.

A schematic of the flow of signals performed by the software of the UID is shown by FIG. 8. An analogous system is that performed by the STP. In FIG. 8, a cable 602 is shown with an output to a receiver 604 and a transmitter 606. A communications processor 608 controls the receiver 604 and the transmitter 606. The communications processor 608 keeps the line active, performs some frame error correction, and performs synchronization. A memory 610 services the communications processor 608 and allows modifications of its protocols. The data from the receiver 604 is fed to a buffer 612. To clean up the data following the interface, a detector 614 and a derived clock 616 are provided. The network line may drive the derived clock. The clean data is then demuxed by DEMUX 618 and distributed by distribution processor 620. The distribution processor controls the distribution of the signals subject to instructions from the general interface 622. This general interface 622 may be comparable to the open industry standard port mentioned above in connection with UID controller 173. Generalized user unique instructions may be stored in a memory 624 which services the distribution processor 620. A bus controller 626 may then route signals to interface cards 628, 630, 632, etc. On the transmitting side, a buffer 634 and a mux 636 are provided to prepare the data prior to its launch onto cable 602. An error correction circuit 638 may also be provided. A number of generic drivers may be provided for each of the different interface cards.

Quality Control via Communications With the STP

The STP may periodically interrogate the UIDs to ensure that they are working properly. If they are not, a service alert may be produced. Alternatively, communications between the STP and the UID may allow data transmission between the two such as for record-keeping or bookkeeping functions.

Passive quality control may also be employed. For example, the dormant optical fibers within the cable may be used to run light down the cable to test integrity via, e.g., LEDs. In the case of an experienced loss of signal but no loss of attenuation of the LED light, a defunct repeater may be indicated.

Attaching Addresses to Outgoing Packets

Software within the UID essentially eliminates the functions of present day ISPs. The software adds headers to outgoing packets, i.e., all the routing information necessary for a data packet to be sent over, e.g., the Internet to a recipient. In other words, the UID prepares the message such that the message is in condition for processing by a router to the intended addressee without requiring further processing. The address does not have to be added to or modified or subtracted from in order to deliver the message. The headers may also include, e.g., a time stamp and the sender's address. In this fashion, the concepts employed in SONET/SDH are taken all the way down to the user. In particular, the entire frame is always available to the user. Thus, the system is similar to present day utility service. No queuing is necessary. The user views the distribution network directly from the UID, as opposed to being separated by, e.g., an ISP, which may impose queuing and may be only available upon dial-up or on request.

A data packet is first described. A data packet is more than just a payload, although that may be the largest part of the packet. Before the payload are placed a number of headers. The first header may be the TCP/IP header, followed by the UID header, following by the UID payload. The TCP/IP payload is identically the combination of the UID header and the UID payload.

The UID may function to place these headers on the payload, e.g., the SONET header, the TCP/IP header, and the UID header so that no further modification of the packet is necessary to enable it to be transmitted to its intended recipient. For sub-UID functions, such as to switch on appliances within a home, the headers to cause these commands are located within the payload, and are termed "subheaders".

The UID may place headers on the payload starting at the interface cards. This aspect of the header describes from which device the data came from. At a point upstream of this, such as at the distribution processor or the mux, another header may be put on if necessary denoting the UID from which the data came from. An additional TCP/IP header may be placed as is disclosed in, e.g., *Cisco TCP/IP Routing Professional Reference*, by Chris Lewis (McGraw Hill 1998), pages 29–40, which is incorporated herein by reference.

Invoicing/Billing Functions

The invoicing and billing functions performed by the software have been mentioned above. These include monitoring any or all devices attached to the UID for a variety of parameters, including energy usage, time spent, etc. For example, in a pay-per-view TV situation, the software may permit a 5-minute user preview of a selected feature. If the viewer keeps that channel on for over 5 minutes, or returns to the channel after the conclusion of the preview period, the software may be directed to debit the viewer's account for the prescribed amount of money.

These invoicing and billing functions need not occur at the UID, however. They may occur at the STP, Local Node, or any combination of these.

The invoicing and billing functions may be employed to track data for marketing as described above. Information may be kept as to consumer demographics and purchasing trends. Directed marketing may then be employed to sell to pre-screened consumers.

STP Functions and Software

Many of the functions provided by the software at the Local Node or UID levels may also be embodied in software located at the STP. For example, software at the STP may be employed to place address headers on the outgoing data packets or frames to identify the regional ring from which they emerged. In this sense, the STP acts as a present-day ISP.

For data traveling in the opposite direction, routing software may be employed to launch the data frames around the regional ring. For redundancy, duplicate frames may be launched around the regional ring in opposite directions. One frame arrives at the desired Local Node. The other may arrive back at the STP. The STP software may then strip this duplicate message and prevent the same from being sent anywhere else. In the case where duplicate messages are received at a Local Node and the same are allowed to travel to the UID, the UID software may strip one of the two incoming messages. Duplicate messaging may be a function provided by the UID or by the NID or by the local node.

It is also noted that the redundant duplicate frames sent by the STP are monitored by the software to detect a break or cut in a fiber path. If such a break or cut is detected, a service alert may be automatically sent to a service provider.

In the case where the STP is coupled to a central antenna or sub-antenna as those terms are used above, the STP software may also be employed to convert incoming wireless or satellite signals to frames or other such formats, e.g., via IP protocols. For example, the frames may be SONET/SDH frames or may employ the ATM format. The STP software may also perform a reverse conversion when frames are to be sent from the regional ring back into the wireless or satellite domain. In the wireless case, the STP software may place a wireless header on the wireless data or other such header as required by the wireless communications protocol employed. In an alternative embodiment, a variety of wireless signal types may be broadcast by a STP, instead of only one. These may include CDPD, Wireless IP, or other such protocols as have been enumerated elsewhere in this disclosure or other similar protocols. The same is true of other satellite or antenna based systems, such as those delivering HDTV.

The method by which the SONET/SDH frame is formed from the wireless signal depends of course on the way the wireless signal is encoded. An analog wireless signal is limited to using frequency-division multiple-access (FDMA) schemes. A digital wireless signal may use FDMA, time-division multiple-access (TDMA), and code-division multiple access (CDMA). GSM is a combination of CDMA and TDMA, and is widely used in Europe.

The following discussion emphasizes GSM. However, the principles of the present invention include conversion of virtually any data type into a form usable by the regional ring. Wireless communications protocols that may be supported include GSM, TDMA, CDMA, etc. Other types of data transmission protocols that may be supported include ATM, LMDS, MMDS, etc. The present invention fully envisions the conversion of wireless signals into virtually any electrical, optical, or electro-optical format.

GSM speech uses regular pulse excitation and linear prediction coding and may occur in either of two modes: continuous (normal) and discontinuous. Linear prediction coding in GSM generates a speech waveform by using a filter with eight transmitted coefficients with a speech frame of 20 ms; 260 bits represent a 20-ms speech frame. The highest data rate is 9600 bps and also has two different modes: transparent and non-transparent.

Figure 9:
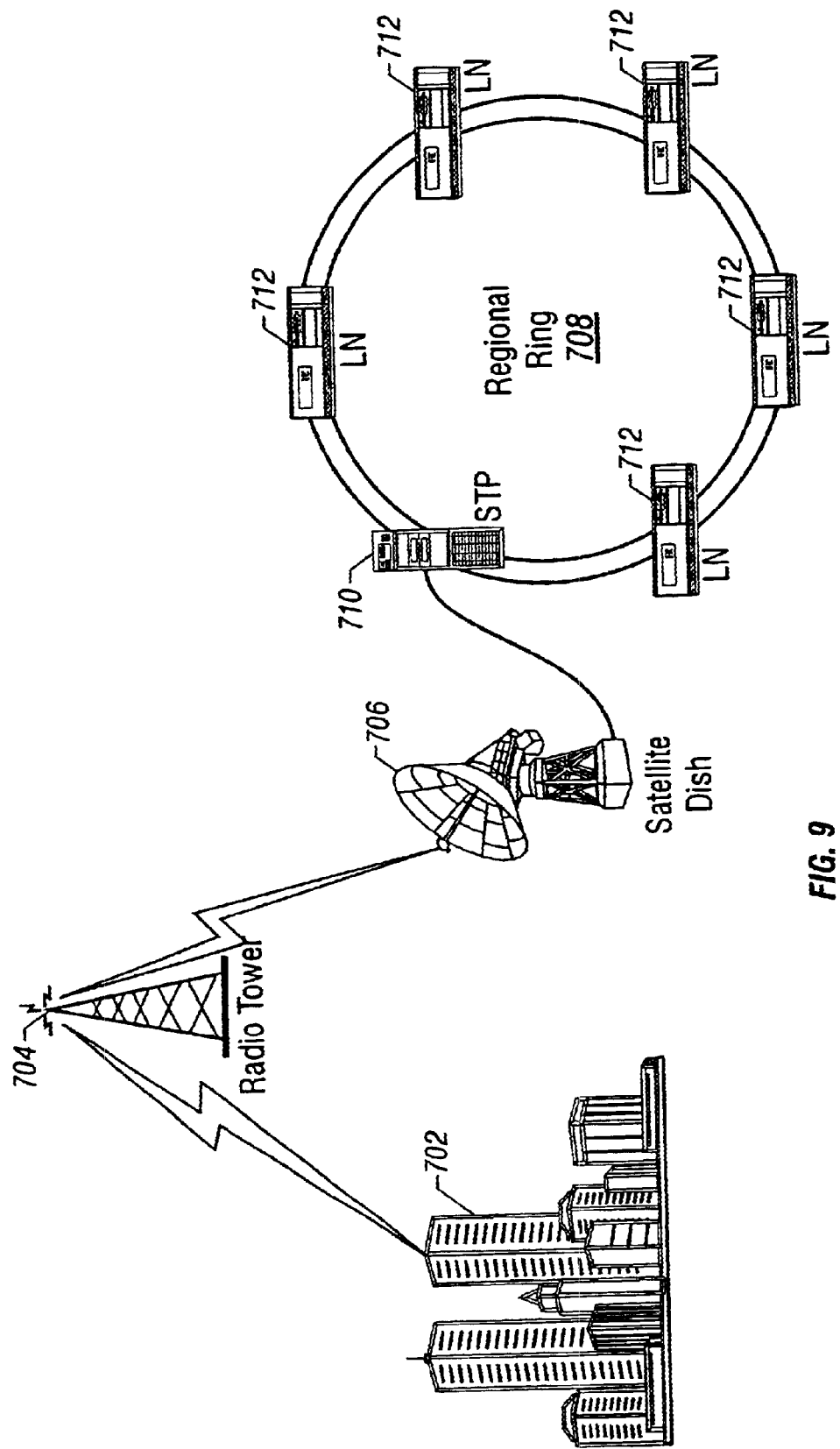
FIG. 9 is a schematic illustration of a portion of a GSM cellular link.

FIG. 9 shows the situation in the GSM regime. A source of wireless signals 702 is routed to an antenna or a satellite 704 (only an antenna 704 is shown) and then is sent to a central antenna, such as satellite dish 706. Satellite dish 706 may then route the signal to a number of sub-antennas (not shown). Alternatively, satellite dish 706 may route the signal directly to a regional ring 708 (shown). The signal may be converted directly into a SONET/SDH frame in a manner to be described or may be sent to an STP 710 which may either perform the conversion or may send the signal to a location where the conversion may then be performed, such as one of local nodes 712.

Figure 10:
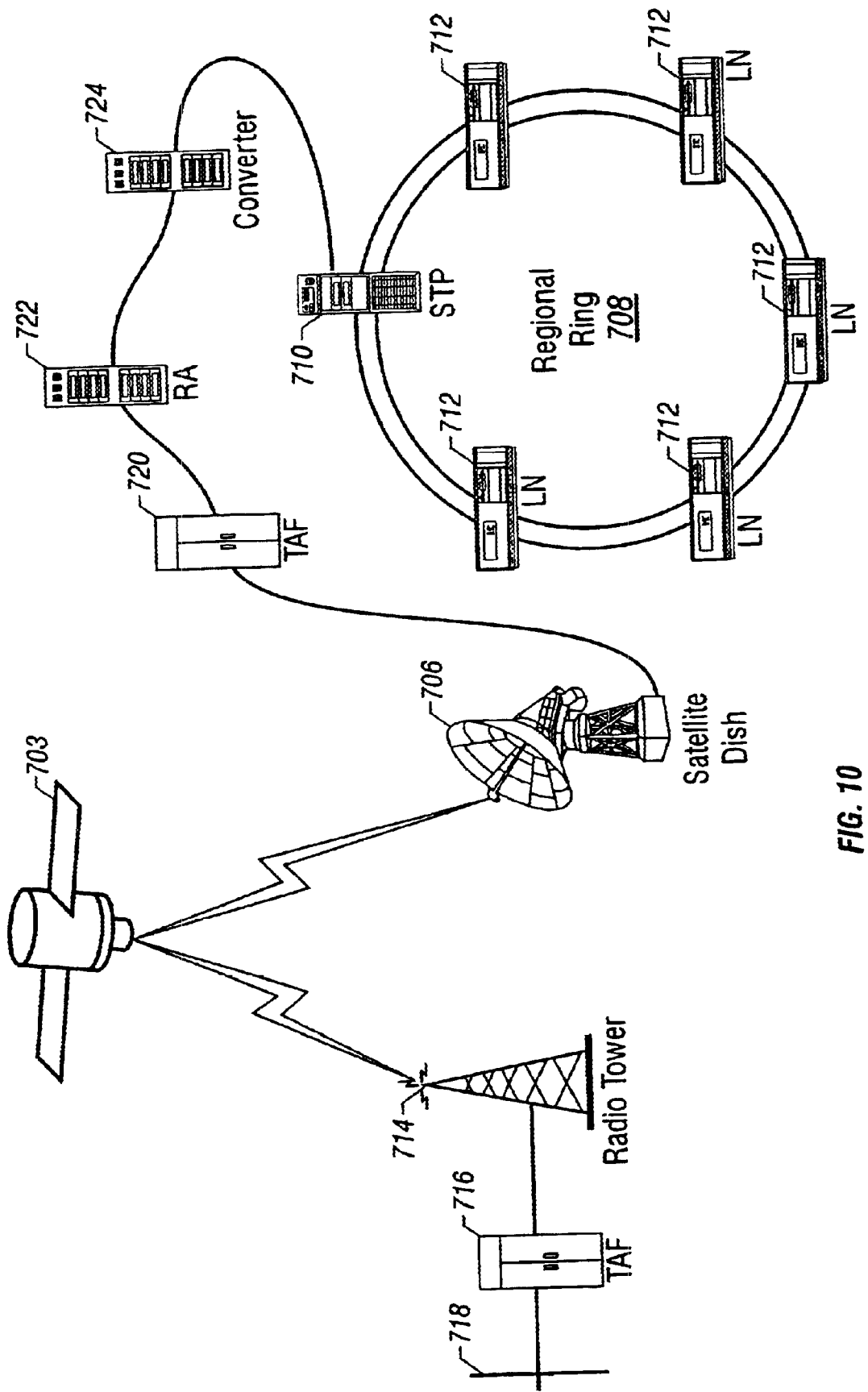
FIG. 10 is a more detailed schematic illustration of a portion of a GSM cellular link showing a prior network and modules for internetworking functions and terminal adaptors.

FIG. 10 shows the GSM situation in more detail. TDMA and CDMA networks are analogous. A network capable of communicating voice or other data 718 is coupled to an internetworking function (IWF) module 716 which is in turn coupled to an antenna 714. Antenna 714 may then communicate the signal to another antenna. However, FIG. 10 shows an additional embodiment in which the signal is bounced off a satellite 705. Such satellite wireless telecommunications links may well become standard. A signal from the antenna 714 is routed via satellite 705 to a satellite dish 706. The GSM signal is then routed to a terminal adapting function module (TAF) 720. The GSM signal actually uses the radio link protocol (RLP) for transporting signaling messages between the TAF and the IWF.

GSM channels have four radio transmission modes, three data modes, and a speech mode. Interconnection of GSM and data services such as are provided by the regional ring 708 may employ a rate-adapted box (RA) 722. Three kinds of physical channels are employed by GSM systems: TCH/F (full rate traffic channel), TCH/h (half rate traffic channel), and TCH/8 (one-eighth rate traffic channel). Each may be used for data modes. The first two may be used for speech. There are five downlink unidirectional channels: a frequency correction channel FCCH which identifies the beacon frequency; a synchronization channel SCH; a broadcast control channel BCCH; a paging and access grant channel PAGCH; and a call broadcast channel. The mobile station locates the FCCH burst, then looks for an SCH burst on the same frequency to achieve synchronization. The mobile station then receives BCCH on several time slots and selects a proper cell, remaining for a period in the idle mode.

There is one uplink common channel. The random access channel RACH is the only common uplink channel for GSM. RACH is the channel that the mobile station chooses to access the calls.

Data may be transmitted from the satellite 705 to the regional ring 708. This data may be a wireless call which is intended to operate an appliance at a user's home of course, numerous other types of data are envisioned.

The mode employed for the signal, either dedicated or idle, depends on the uplink and the downlink. The dedicated mode uses a traffic channel TCH during the setup of the link and further uses a slow rate TCH to perform location updating. The idle mode is used during noncall activities.

As noted before, GSM combines TDMA and CDMA. The total number of channels in FDMA is 124, and each channel is 200 kHz. Both the 935–960 MHz uplink and the 890–915 MHz downlink have been allocated 25 MHz, for a total of 50 MHz. Duplex separation is 45 MHz. If TDMA is used within a 200 kHz channel, 8 times slots are required to form a frame, frame duration is 4.615 ms, and the time slot duration is burst period is 0.577 ms.

Each time slot of a data channel in GSM contains 120 or 240 bits per block. Each time slot further is given a number TN which is known by the base station and the mobile station. For example, TN0 is a single set broadcast in any given call and is repeated every 8 burst periods BP. The organization of TNo is as follows:

FCCH(1)/SCH(1)/BCCH(4)/PAGCH(4)/ FCCH(1)/SCH(1)/PAGCH(8)/FCCH(1)/SCH(1)/ PAGCH(8)/FCCH(1)/SCH(1)/PAGCH(8)/FCCH(1)/SCH(1)/PAGCH(8)

Where the notation x(y) means that the x channel information appears in consecutive ones of every 8 BP cycles y times.

Figure 11:
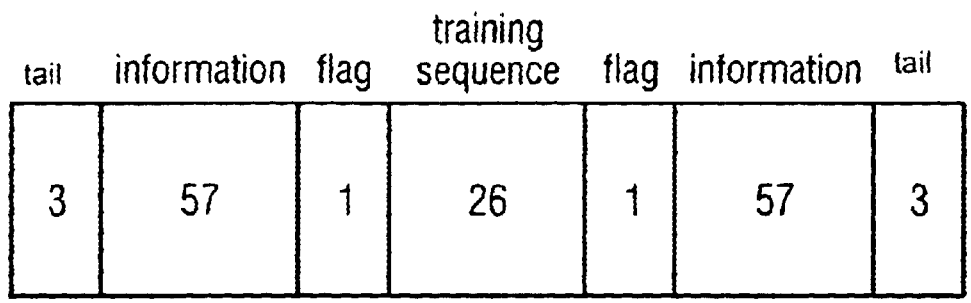
FIG. 11 is a schematic of bits corresponding to a GSM burst.
Figure 14:
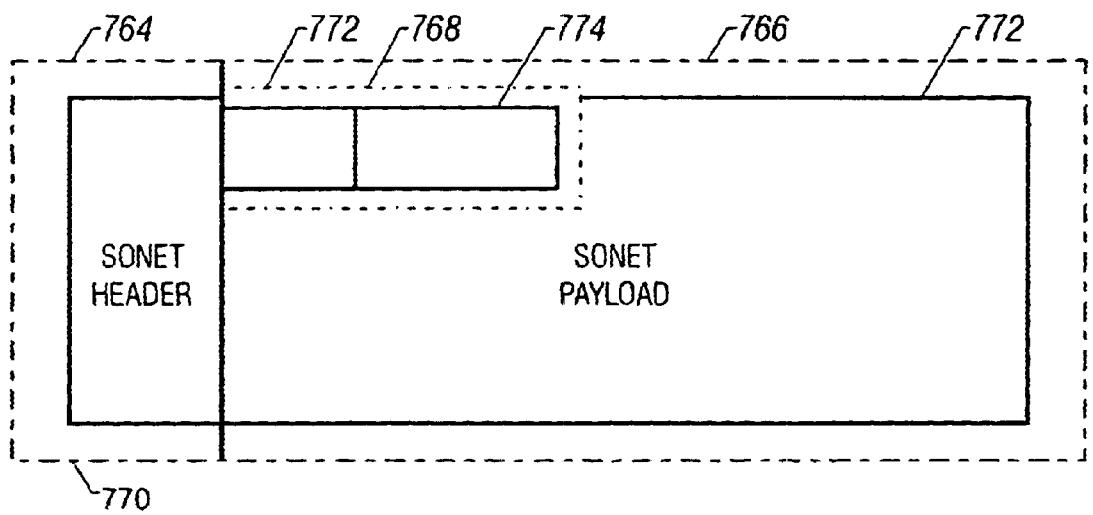
FIG. 14 is a diagram of a SONET frame structure.

A normal burst used in GSM is shown in FIG. 11. Three tail bits are three 0 bits added at the beginning and the end of each burst to provide guard time. The training sequence is a sequence known by the receiver that is used to train an equalizer, a device to reduce intersymbol interference. Channel coding may further be used to improve transmission quality when interference, multipath fading, and Doppler shift are encountered. Interleaving may also be used.

Figure 12:
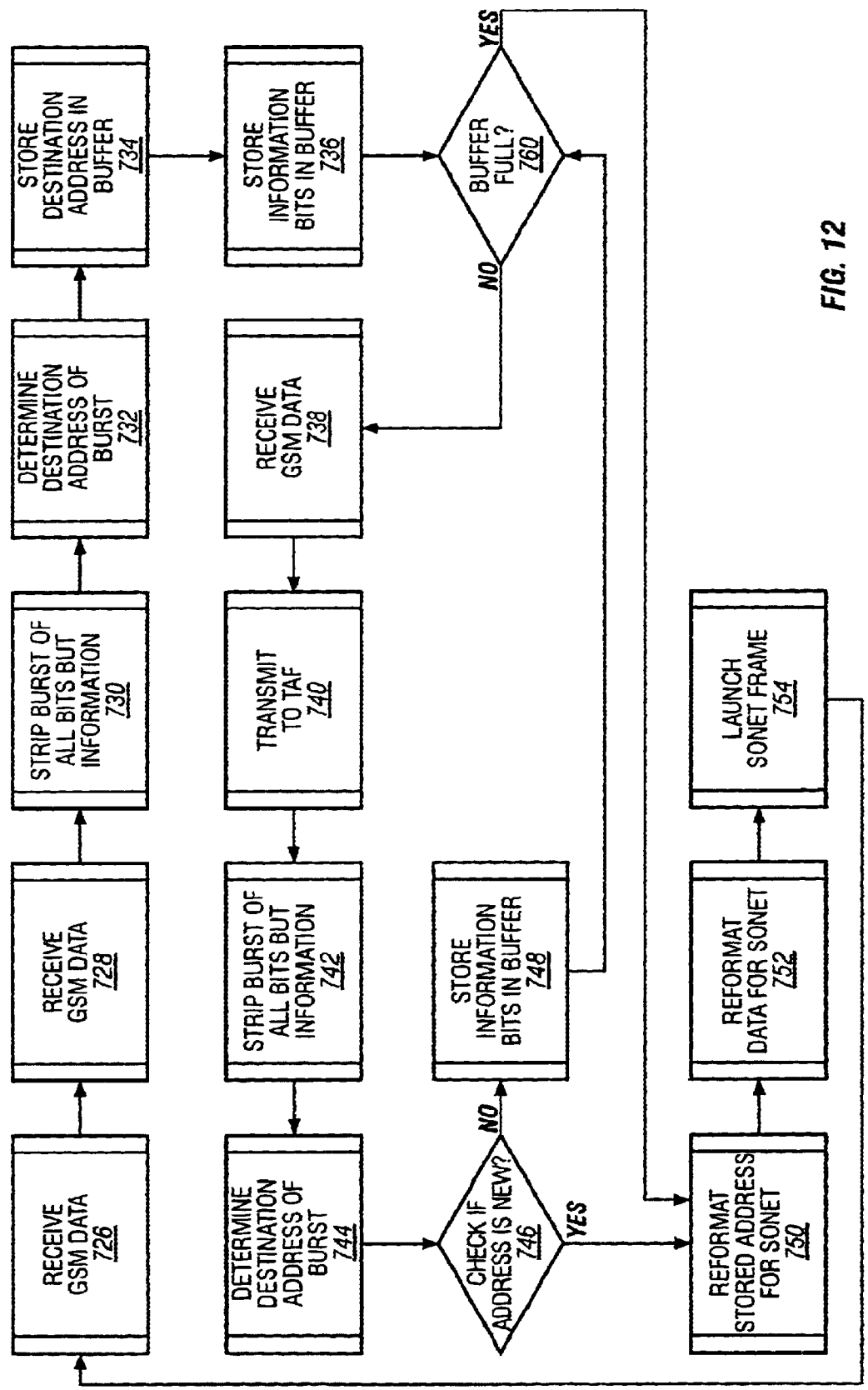
FIG. 12 is a flowchart of a conversion from a GSM protocol to a SONET protocol.

A typical procedure for converting the RLP GSM signals to SONET is shown in FIG. 12. GSM data is received (step 726) and is transmitted to the TAF (step 728). Non-informational data is removed (step 730), such as the tails and flags as well as the training sequence. In the case of a typical GSM burst, this would entail removal of the first three bits as well as bits 61–88. Analysis of the information sequence (the next 57 bits) then occurs. The destination address of the burst is determined (step 732) from this information sequence according to the coding scheme. For example, if data is intended for a specific UID, the UID address would be determined during this step, as well as information corresponding to which regional ring and node the UID belonged. This address is then stored (step 734), and the data is also stored in an appropriate buffer (step 736). The data is of course keyed to the appropriate address. The buffer is then checked for fullness (step 760). If the buffer is full, the SONET frame may then be launched onto the regional ring. Launching entails reformatting the address for SONET (step 750), reformatting the data for SONET (step 752), and sending the frame onto the ring (step 754). Steps 750, 752, and 754 are discussed in more detail below. If the buffer is not full, more RLP GSM data may be received (step 738), transmitted to the TAF module (step 740), and stripped (step 742). The destination address is again determined (step 744). The address is then compared to the addressed determined in step 732 (step 746). If the address is different, then the information is by definition destined for a different address than the prior information. The SONET frame may then be launched onto the regional ring to be later retrieved by the destination address device. If the SONET frame is not full, some of the cells may contain, e.g., zeroes. If the result of step 746 is that the address is the same, then the information may be stored in memory adjacent the previously stored data (the data stored in step 736) (step 748). The buffer may then be checked again for fullness, with full buffers causing the launching of another SONET frame. The buffer system generally allows for the difference in data rate between RLP GSM and SONET. Typically, a GSM burst contains significantly less information than a SONET frame, so multiple bursts are required to fill up a SONET frame. Of course, the data rate may be such that it is desired to launch a SONET frame with each burst. The system may well allow for that as well.

Figure 13:
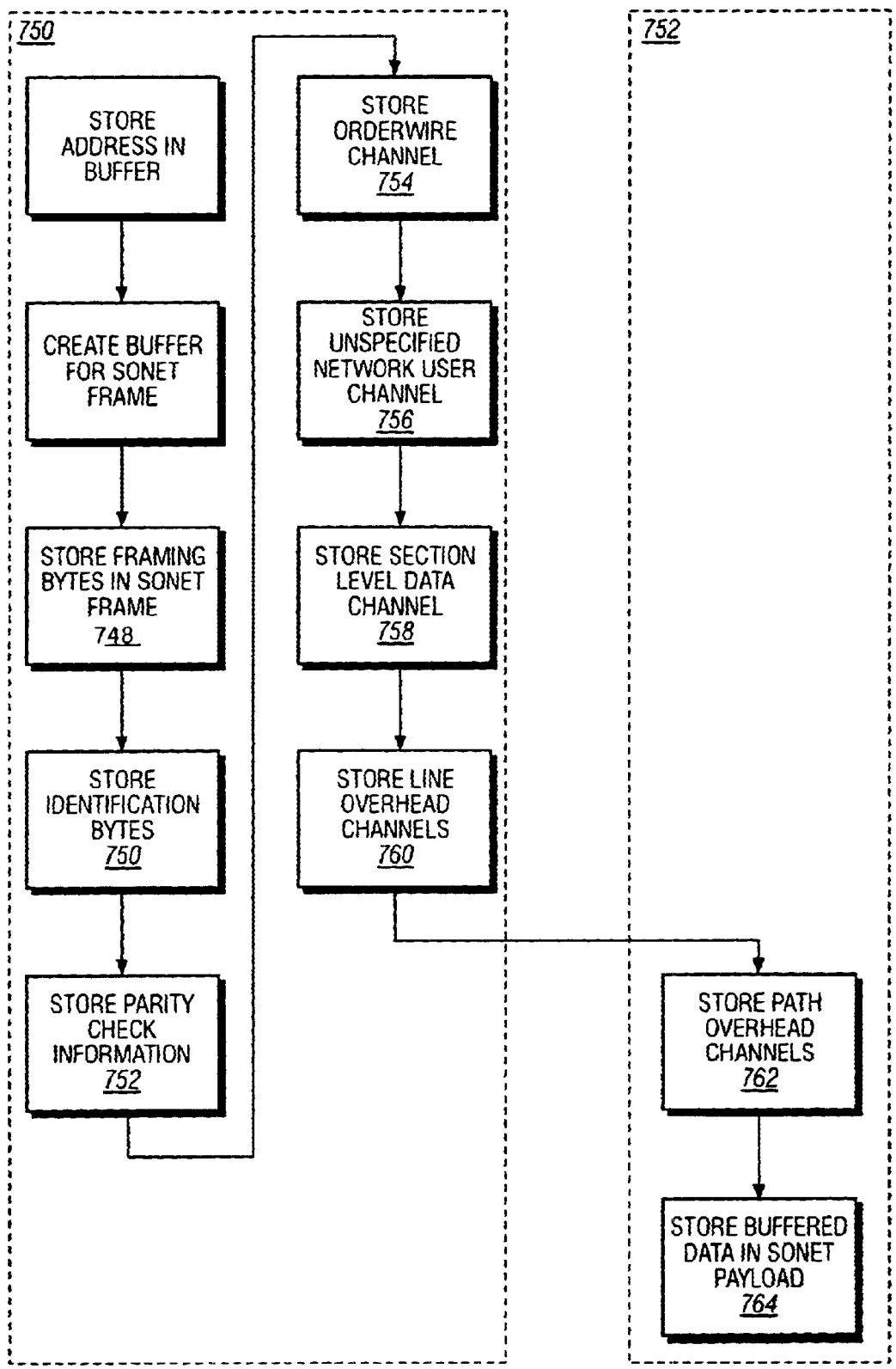
FIG. 13 is a flowchart of signal reformatting to a SONET fame.

Steps 750, 752, and 754 are now described in more detail. Referring to FIG. 13, step 750 is shown as entailing storing the address in a buffer. This address is then converted to part of the SONET overhead channels. The SONET overhead channels are divided into section, line, and path layers. The section layer contains the overhead channels that are processed by all SONET equipment including regenerators. For an STS-1 signal, the section overhead channels include two framing bytes that must be stored which indicate the start of each frame (step 748). These are followed by an STS-1 identification byte (step 750) and a parity check section for error monitoring (step 752). An orderwire channel is then allowed for craft (network maintenance personnel) communications (step 754). A channel for unspecified network user applications is next (step 756). Three bytes are then stored for section level data communications (step 758) to carry maintenance and provisioning information. SONET signals are scrambled, but left unscrambled are the section layer framing bytes and the STS-1 identification bytes. It is these last bytes where the addressing information is substantially stored.

The line overhead bytes include the STS-1 pointer bytes, an Automatic Protection Switching message channel, a communications channel, and a line orderwire channel. These are stored in step 760.

The data formatting portion (step 752) includes provision of the path overhead bytes (step 762). The path overhead bytes are processed at SONET STS-1 payload terminating equipment: they are part of the payload and they travel with it. The path overhead bytes include a path BIP-8 for end-to-end payload error monitoring, a signal label byte to identify the type of payload being carried, a path status byte to carry maintenance signals, a multiframe alignment byte to show DSO signaling bit phase, and others. Like the GSM signals, the SONET signals may be interleaved to achieve higher rates.

The information portion of the data may then follow in the scheme SONET shown in FIG. 39 (step 764). The information payload may be multiplexed to achieve higher rates, either by positive bit-stuffing or by fixed location mapping of tributaries into higher-rate signals. In more advanced embodiments, the SONET frame may be made data-aware to allow provision of bandwidth in a much more granular fashion.

It was noted above that the STP provides multicasting. This multicasting possibility allows for the connection of any two users within a regional ring without the need for a message or data packet from the users to be sent outside of the regional ring.

Super Ring Deployment With STP

Figure 42:
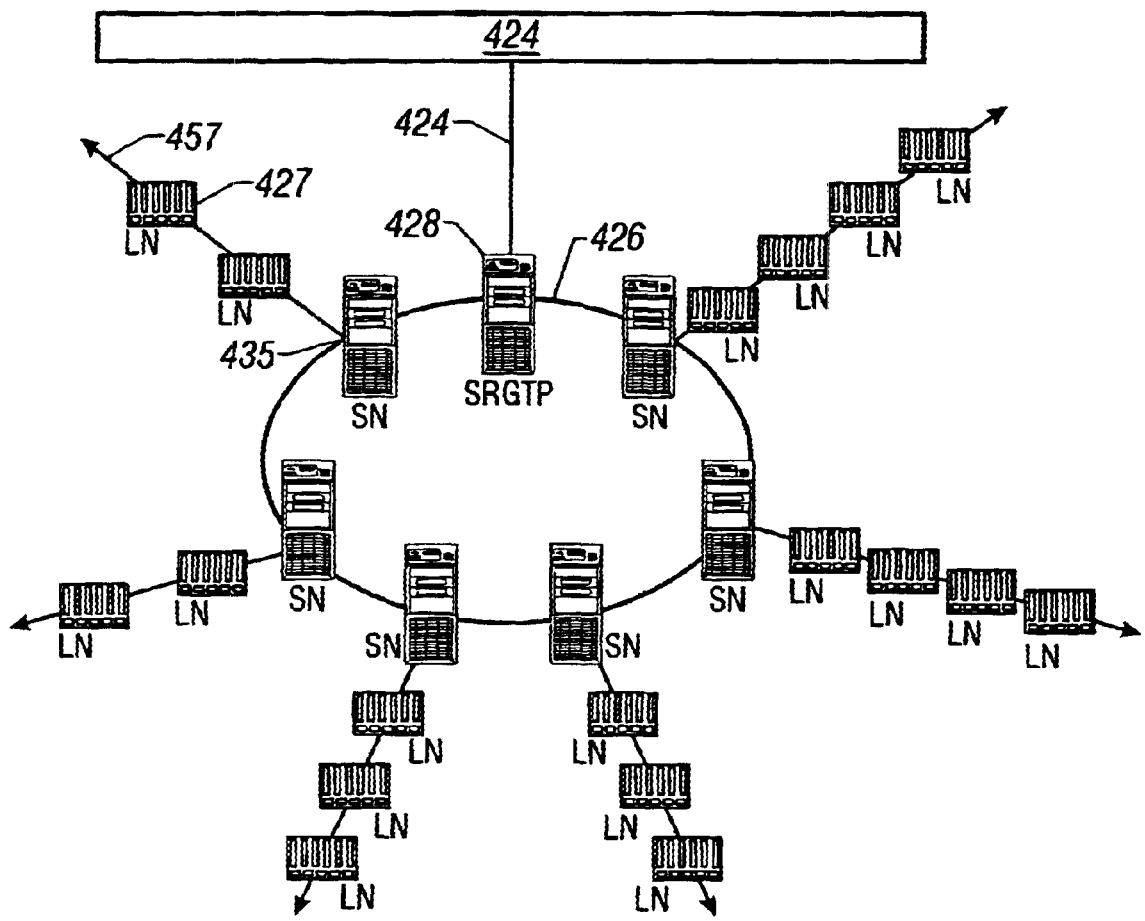
FIG. 42 shows an embodiment of the invention in which a super ring is employed in a telecommunications system tied to a global network.

FIG. 42 shows a so-called "super ring" embodiment which may employ a cable according to the present invention. In this embodiment, the super ring serves a purpose similar to that of a telco central office. The super ring is in a hub/star configuration tied to a global network. In such a configuration, the star "points" or "branches" are arranged around a single hub that may act as a central controller for the network. Each branch, and each LN on a branch, may be independently addressable. Transmissions from one node, LN, or terminal must first pass through the hub. In this embodiment, the super ring plays the role of the hub.

Referring to FIG. 42, a global network such as a global fiber network is shown as a global backbone 422. Global backbone 422 is connected to a super ring 426 via a connecting fiber 424. Connecting fiber 424 may alternatively be a cable according to the present invention as described above. The super ring 426 has placed thereon a super ring global transfer point 428 which attaches to the connecting fiber 424. Alternatively, the super ring global transfer point may feed directly off the global backbone 422.

The super ring global transfer point routes signals into the hub (super ring 426) and out into the star points (branches 457). The signals may be in SONET form as described elsewhere in this specification or in another form. In this configuration, the super ring 426 is well-situated to, e.g., supplant present telephony by employing the same holes dug for present systems.

The super ring architecture enables not only high digital data processing speeds but may do so in a more economical manner by using so-called "ganged" terabit routers. Ganged terabit routers may be situated at locations around the super ring, such as at super nodes, and may be analogized to performing parallel computer processing with smaller computers rather than with one larger super-computer. In this type of system, the cost and complication of routing telephone calls, both within (e.g., voice multicasting) and outside the local loop, can be effectively reduced.

Figure 43:
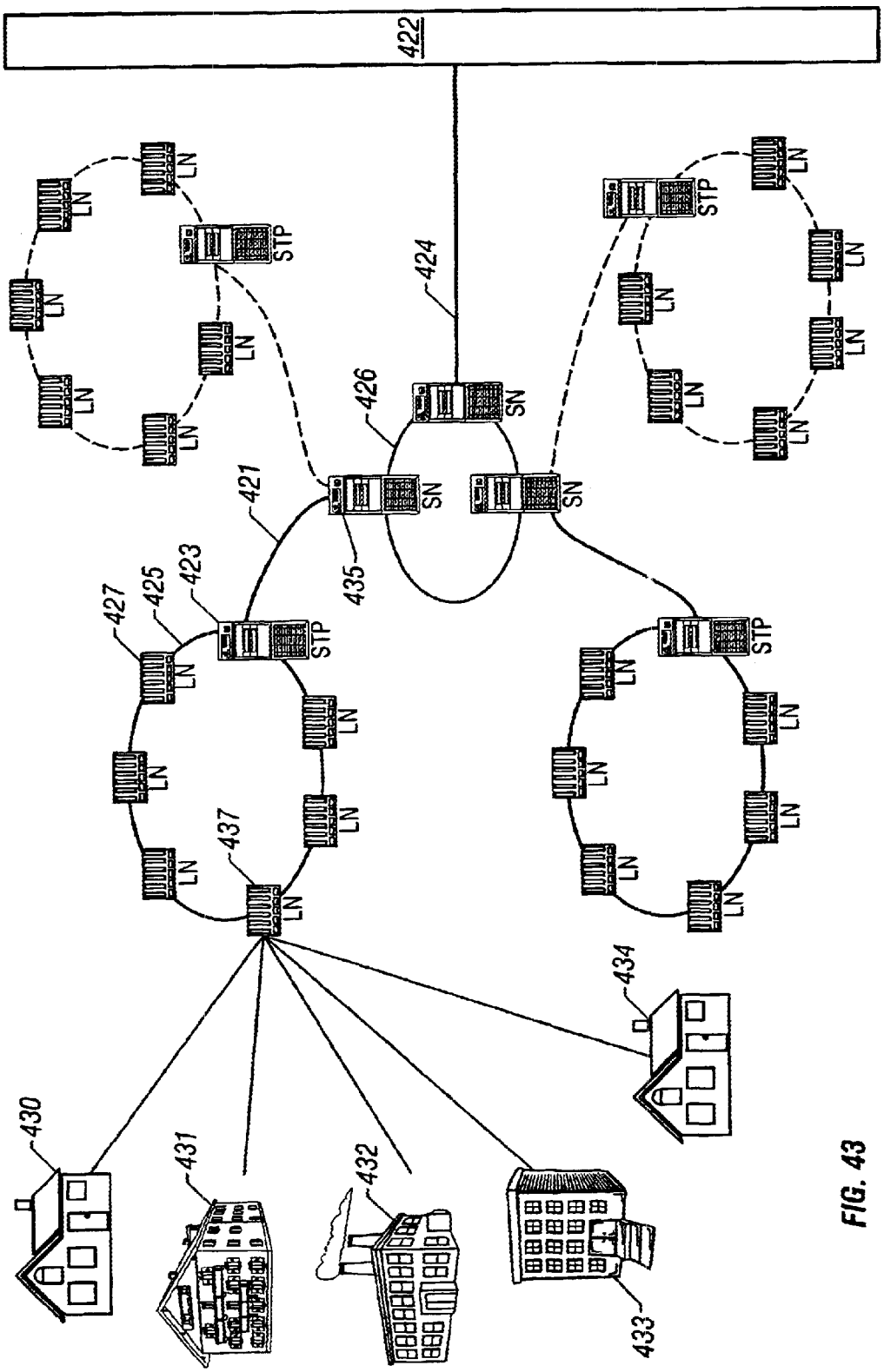
FIG. 43 shows an alternative embodiment of the present invention in which a super ring is employed to informationally tie two or more rings, each of the two or more rings having a form similar to the ring of FIG. 2.

The invention also encompasses use of multiple levels of rings. Referring to FIG. 43, another super ring embodiment is shown. A global backbone 422, such as that produced by QWEST, connects to a super ring 426 via a fiber 424. Alternatively, super ring 426 may directly connect to global backbone 422, although certain benefits inhere to a more modular system. The fiber 424, which is generally an optical fiber, enters the super ring via a super ring global transfer point 428 ("SRGTP"). SRGTP 428 acts in many ways analogously to the STPs noted and described in detail above. For example, SRGTP 428 may act to send two duplicate SONET frames around each direction of the super ring 426. In the case of an SRGTP servicing rings that have a large body of voice call traffic, as well as in an STP servicing a large number of LNs for the same purpose, the SRGTP or STP may be provided its own area code from the telco. Each SRGTP, as well as the SBGTP and the SBTP described below, may be of a form similar to a Cisco router or other similar device that performs similar functions.

Each SONET frame launched around super ring 426 employs addressing which allow the same to be detected and directed accordingly by a series of super nodes 435 ("SN"). Each SN 435 employs photoreceptors or photodetectors that read the SONET header and determine whether the information contained in that SONET payload is appropriate to be sent to their respective rings. These photoreceptors or photodetectors may not require splicing into the fiber: rather, each may be clamped onto the fiber and each SN 435 may then read each launched SONET frame in turn, determining, without degrading or attenuating the optical signal, whether the SONET frame should be redirected to the ring attached to SN 435.

The super node may route signals such as messages, data, and requested video channels in a number of ways. For example, the super node may route the signals to multiple branches and to the LNs within those multiple branches.

Once a SONET frame has been determined to be appropriate for sending to a specific ring, the same is launched from the SN over an optical fiber to the ring. In FIG. 43, SN 435 may send a SONET frame over a fiber 421 to an STP 423. The character and function of STP 423 may be the same as that described above. STP 423 may in turn launch duplicate SONET frames around each direction of a ring 425.

Like most regional rings, ring 425 employs a number of Local Nodes ("LN") 427 which include FIDs and NIDs to further route the SONET frame to a specified UID. Each FID in the ring or branch is independently addressable. In this figure, LN 437 is shown attached to a number of buildings, each of which employs at least one UID. So-called "home switches" may further be employed within each building or group of buildings. In particular, FIG. 43 shows LN 437 connected to homes 430 and 434, businesses 431 and 433, and factory 432. The SONET frame read and launched by SN 435 is then re-launched by STP 423 in the form of duplicate SONET frames. STP 423 may, if desired, perform analysis on the SONET header as a double-check to ensure that the SONET frame is appropriate to ring 425. If it is not, the frame can be redirected to SN 435 with an appropriate error message. Assuming the frame is addressed to an address on the ring 425, such as home 430, LN 437 reads the SONET frame header and redirects the frame along the hybrid cable which is seen in FIG. 43 as running between LN 437 and home 430. If the frame were directed instead to home 434, LN 435 would have directed the same along the hybrid cable running to that home. In each case, the hybrid cable transmission properties allow vastly greater transmission rates and accuracy in this "last mile" regime.

Figure 44:
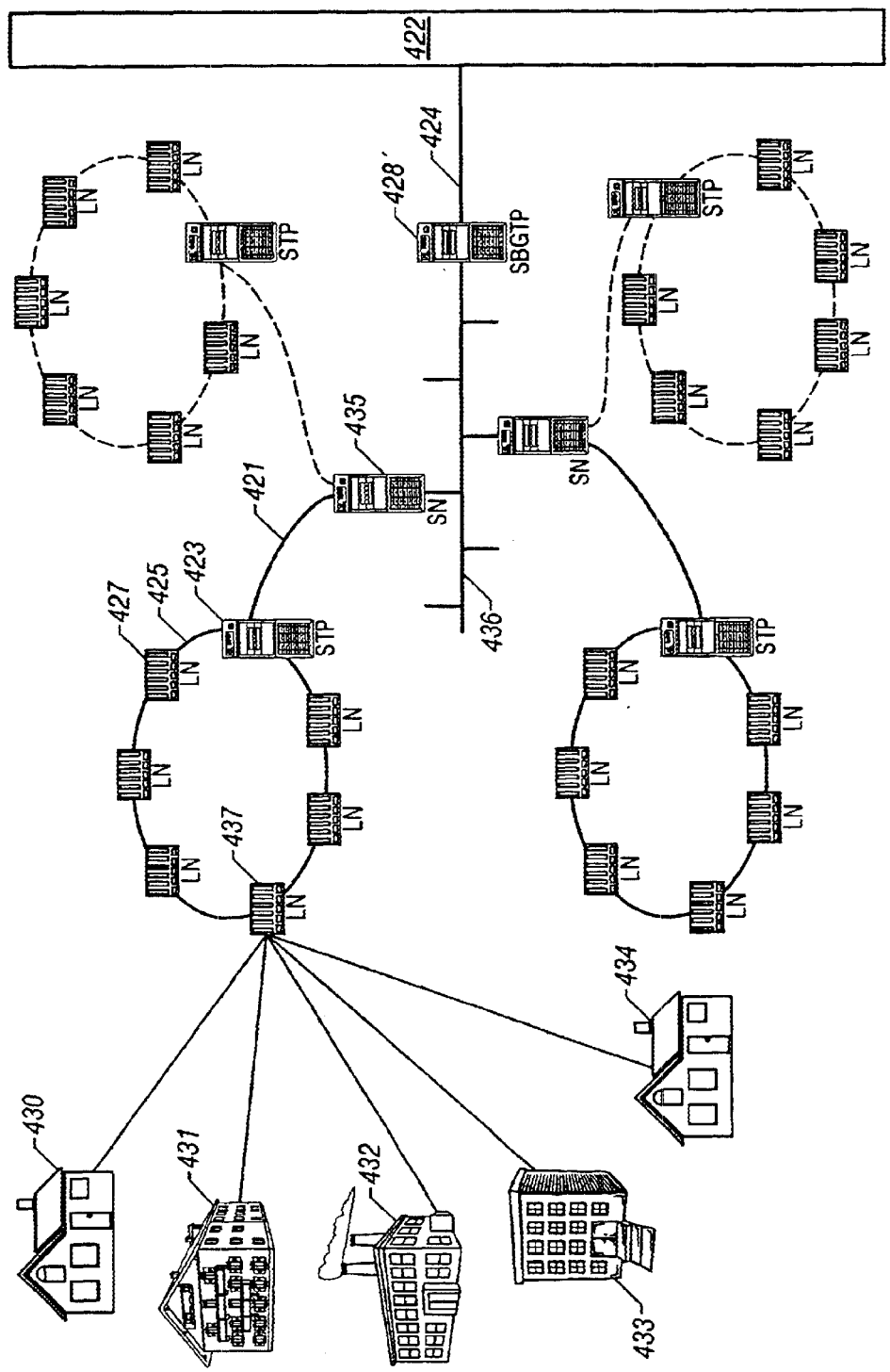
FIG. 44 shows an alternative embodiment of the present invention in which a super branch is employed to informationally tie two or more rings, each of the two or more rings having a form similar to the ring of FIG. 2.

FIG. 44 shows an alternative embodiment in which super ring 426 is replaced by a super branch 436. The super branch 436 embodiment generally does not enjoy the benefits of duplicate messaging afforded by super ring 426, as the fiber is not in a ring structure. However, it may be preferable for other reasons in certain architectures. In particular, super branch 436 may extend from a super branch global transfer point ("SBGTP") 428'. SBGTP 428' is in most ways and functions analogous to the SRGTP 428 of FIG. 43, except that the same does not send out duplicate messages. As is shown, SBGTP 428' sends out single SONET frames along super branch 436 that may then be read by SNs such as SN 435. The SNs determine from the SONET header and subsequent addressing whether the read frame is destined for one of the rings they respectively service. If so, the SN takes the SONET frame and launches the same towards the ring intended. The remainder of the operation is similar to that described above in connection with FIG. 43.

Figure 45:
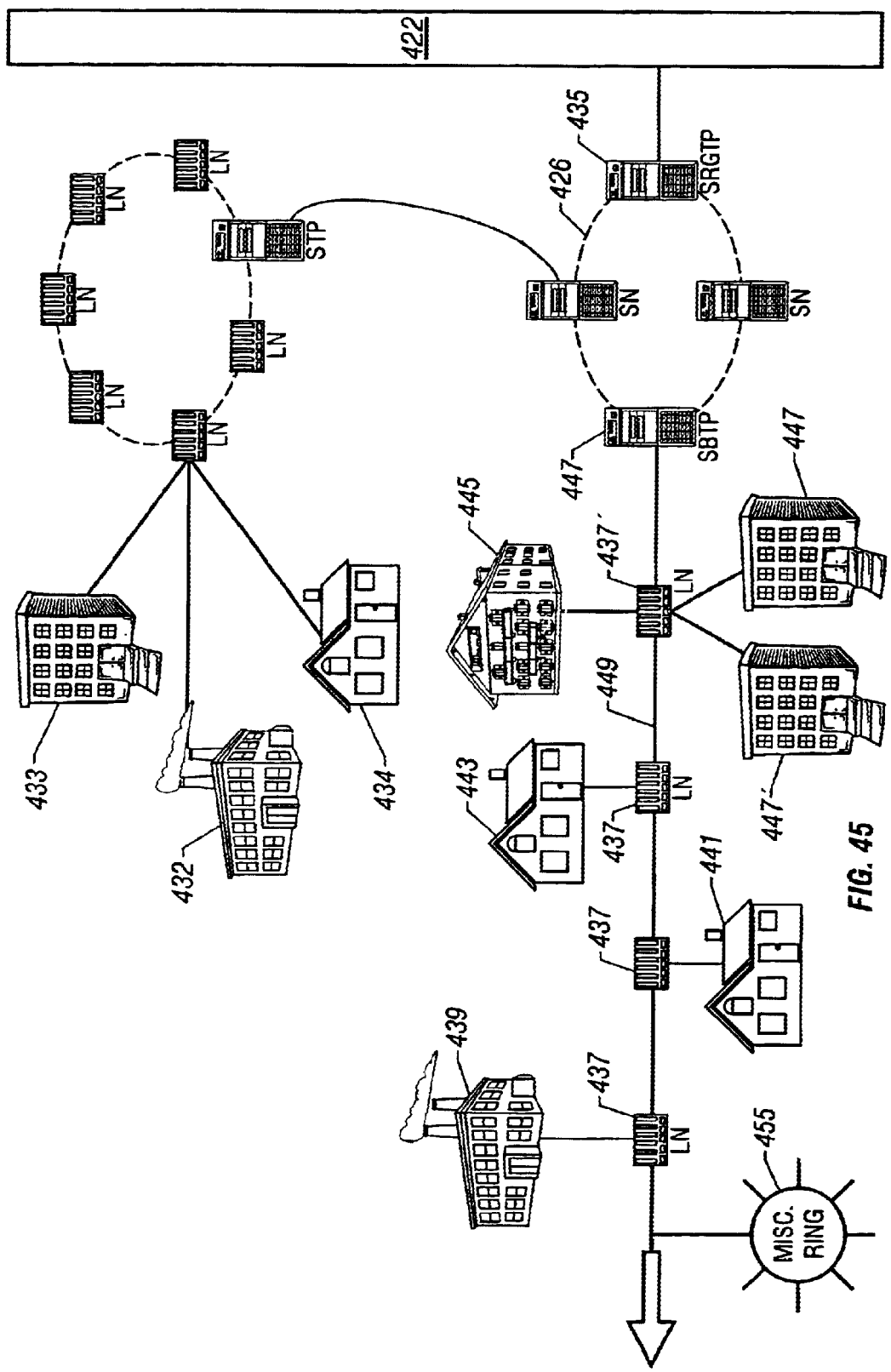
FIG. 45 shows an alternative embodiment of the present invention in which a super branch is employed to informationally tie a number of Local Nodes to a super ring. The super ring per se may have a form similar to that shown in FIG. 43.

In another embodiment, shown in FIG. 45, a super branch 449 formed of optical fiber is directly connected to a super ring 426 via a super branch transfer point ("SBTP") 451. In this embodiment, however, the super branch 449 is connected to more than just super rings. Rather, the super branch 449 has located thereon a number of local nodes 437, herein termed "super branch nodes", although their form and structure may be very similar or the same as the local nodes of prior embodiments of course, a super ring 425 with accompanying architecture may conveniently also service, and may employ bandwidth capable of servicing, a super ring 425 as shown in FIG. 45. Of course, a number of super branches may be employed per super ring if desired. In such cases, the super ring may be merely 30' to 50' across in order to provide sufficient room for numerous super branch hardware.

It is currently expected, although not by way of limitation, that up to or more than tens of thousands of users may be serviced from a single super branch. Of course, for optical super branches, regenerators would not be required even over very long distances. The capability of the system depends on the number of users. For example, a system may expect each home to require a data transmission rate of 50 Mb/s. This would mean that 1 Gb/s could service 200 homes, and 40 Gb/s could service 800 homes. As a so-called "real-world" example, the city of Fremont, Calif. has connected 6000 homes using prior art cabling, and has found that all the homes can be sufficiently fed from a central office with a 300 Gb/s capacity.

Referring back to the super branch 449 of FIG. 45, however, each local node 437 connected to super branch 449 may be similar to local nodes of previous embodiments. For example, each local node 437 may receive data, such as frames of SONET/SDH formatted data, and may forward the data to a UID it services or may pass the data through to downstream local nodes which may or may not forward the data to a serviced UID. Of course, the decision of whether to pass or whether to forward depends on the addressing of the data (the UID addresses on each SONET/SDH frame) as well as the UIDs addressed assigned to the local node 437.

For example, referring to the office buildings 447 and 447' connected to local node 437', each may include a regional ring of the type discussed above. Each office building may be connected via fiber optics, or via a hybrid cable of the type disclosed above, to the local node 437'. Within each office building may reside an STP which may then forward the SONET/SDH frames to additional nodes or to UIDs. The same may be true of building 445, houses 443 or 441, or industrial plant 439. In addition, a miscellaneous ring 455 may be disposed off super branch 449. The miscellaneous ring 455 may service a number of additional local nodes as desired. The connection of miscellaneous ring 455 to super branch 449 may be via a local node (not shown) or e.g., via splicing. Thus, if a SONET/SDH frame is passed through super branch node 437' and has addressing appropriate to, e.g., building 447, the same is forwarded on to the same. A fiber or hybrid cable may be provided to forward the information. If the addressing is not appropriate to any of the UIDs within building 447 (or any of the other devices connected to super branch node 437'), then the information is simply passed to the next super branch node down the branch, here branch 437. Conveniently, the information may be so passed anyway, to avoid the extra step of termination the optical signal at super branch node 437'.

It is important to note that while the discussion of the embodiment of the invention has tended to describe the use of the embodiment with single frames of SONET/SDH data, virtually any format of data may be used. Furthermore, streams of frames may advantageously be employed. Such an embodiment is particularly useful in what may be a particularly useful application, high definition digital television. In particular, at the current data rates envisioned by the embodiment, and certainly not by way of limitation, it is expected that up to or more than 1000 channels of HDTV may be sent down branch 449. Each super branch node would receive information from its associated UIDs as to what information the UIDs are requesting from it. In the HDTV case, a UID may be requesting a particular channel of HDTV data. The same may then be delivered to the UID. By branching off the global backbone, the need for large video servers or other such storage devices may be essentially eliminated and the goal of video channel addressability may be conveniently met. In such as system, for example, the super ring may physically be about 30' across. Each branch may accommodate 1 to 10,000 users without the need for regenerators.

Signal Considerations and Performance Requirements

Several major performance requirements are important for a network local drop cable system according to an embodiment of the present invention. Optical path transmission losses will be very small for even the longest of such local drops. Little else can affect the optical signals, short of physical damage from weather, water or the ever-present squirrels that seem to favor cables for gnawing. However, in the electrical cable mode—for wideband use—the most significant performance limitations depend primarily on how well a cable system performs with respect to these three major signal-corrupting factors:

1) Cable system transmission loss and delay time properties, particularly at the highest frequencies (HFTL).
2) Electromagnetic Interference Rejection of the cable system s shielding of the signal paths (EMIR).
3) Cross talk between the sending and the receiving paths (XTLK).

In prior art engineering efforts, the main thrust with electrical communication cable systems was devoted to obtaining low transmission losses over as wide a bandwidth as possible. The need for very low transmission loss arose from the analog modality that dominated those past information transmission methods. As the analog signals were repeatedly amplified after losing power in each few miles leg of their journey, the signal to noise ratio degraded. The longer the runs and the more equipment traversed, the greater the possibility for cross talk and interference noises entering the signals. With the development of modern information theory, the advantages of digital signal transmission became clear. This new understanding, along with the digital error correcting coding which became possible, revolutionized communication system design ideas. As a result, the employed hardware techniques changed radically and rapidly. For example, in 1997 virtually all communication channels employed digital techniques, at least in the inter-office and long haul portions of their paths. In the analog days, the main concerns were signal to noise deterioration and the increase in other noises (distortion and cross-talk) with the distance the signals traveled. Modern digital systems essentially do not deteriorate in that manner even when challenged by the distance of circling the world. Once in the digital domain, the rules for the cable system transmission requirements definition change radically.

Signal transmission loss and high frequency roll-off (HFTL) are not judged by themselves but rather in relation to two other factors:

1) the amount of internal noise energy in the system and,
2) the ratio of the signal energy to the other two corrupting energies, EMIR and XTLK.

It is relatively easy to correct even substantial loss or high frequency roll-off and delay dispersion, which is reasonably stable or changes only slowly over time. A portion of these problems can be overcome by adaptive equalization of the system response. As such, even large bandwidth can be sent over even a fairly a lossey cable system. Adaptive equalizers or other matched filter signal correctors are a part of most modern signal terminal equipment such as the ubiquitous personal computer modems that enable telephone communication of data. Since virtually all the information to be communicated in any new system will be of a digital form, reliable processing of the signal information reduces to the equipment's ability to reasonably differentiate between a "one" and a "zero" by means of a signal detector or discriminator. Loss of signal level or high frequency response defects are further overcome provided the signal is only moderately corrupted by noise, jitter, interference, and/or cross-talk. The binary digital signal can be completely regenerated with such a signal detector thus restoring peak signal power well above the noise and cross-talk at the position in the path at which this is done. Thus signal to noise ratio (S/N) becomes a first and a most important part of any new "last mile" cable system specification. This S/N behavior is dominantly a result of the cable system's abilities to reject interference (EMIR) and to minimize cross-talk (XTLK) between the sending and receiving links within the cable system. The novel quad configuration of this disclosure addresses the needs in these factors allowing substantial run lengths before such regenerator action is required. Modern integrated circuit technology allows such devices to be made small enough and cost low enough that they can be incorporated into the cable in a small pod hardly bigger than the cable diameter. The disclosed system employs such techniques to provide substantial margin in performance over the varied noisy environment confronting today's networks.

Signal Power

A practical amount of signal power is not likely to be a serious barrier as the following demonstrates. To estimate the amount of signal power required in the electrical or analog aspect of the signaling system for good communication function, the first factor to be considered is the minimum internal noise that a system may have. The internal noise power in excess of the irreducible thermal noise at the receiver input terminals sets the lower limit on any system's noise level. This measure can be expressed in a form independent of the system's working bandwidth by an "Equivalent Input Noise Temperature Figure". As a good way to quantify this parameter, one first measures the system noise energy output when fed at the input from a known hot temperature source resistor, then in a second measurement connects that input to a known much colder temperature (electrically equivalent) resistor. Comparing the resulting ratio of the two output power levels to the known ratio of the noise power in the hot and cold resistors sources allows the contribution made by the system internal noise to be properly accounted for. The thermal noise power in each of the two test resistors is in direct proportion to their absolute temperatures, thermal noise power being 4 kT, where k is Boltzmann's constant and T is the absolute temperature in Kelvin. The difference between the known source hot/cold ratio power ratio and that measured at the system output is an excellent, accurate measure of how much noise the system adds to the signal input. When viewed this way, a typical wideband electrical system will have a "noise floor" which is well under a value that is 10 dB more than that of a room temperature source resistor.

In real world working systems, local drop cable system design should only allow the level of corrupting energy from EMIR and XTLK to add relatively little to the system noise floor. For example, a very good cable system performance in EMIR and XTLK may hold such signal corruption to a value not over 10 dB more than the proposed system noise floor of +10 dB. The required power for the signals can then be calculated by defining the working bandwidth and the minimum system S/N:

1) A desired S/N may be, e.g., 50 dB which would provide a very low bit error rate for even the most demanding uses.

2) The bandwidth may be 1 Gigahertz.

The required power may then be computed as follows: The total noise power is the sum of the Noise.Figure, EMIR feedthrough and XTLK. The exemplary value assumed was 20 dB over thermal noise. Ambient thermal noise (4 kT) is approximately $1.65 \times 1^{-20}$ Watt per Hertz bandwidth, which is increased 100 times by the +20 dB noise assumption and further increased by the system bandwidth so that total system equivalent input noise power becomes $1.65 \times 10^{-20} \times 10^{2 \times 10^9} = 1.65 \times 10^{-9}$ watts. For a 50 dB S/N, signal power must be raised above this value by 50 dB ($10^5$ times=1.65 $10^{-4}$ watts of signal power). Thus needed signal power is only a very moderate 0.165 milliwatts (−7.8 dBm).

Even assuming the EMIR and the XTLK to have a much larger level of, say, +30 dB (instead of just +10 dB) over the practical noise floor described, the system would still need only a small level of signal power, just +12 dBm or about 16 milliwatts. This larger, but still very modest power level, would require barely a 1.3 volt signal across the nominal electrical transmission impedance of the embodiment's cable example (about 100 ohms). Such numbers represent a lower power per unit of bandwidth than the kinds of signal energy levels employed in older analog voice frequency drop circuits, which as a class have much poorer system power efficacy. Older analog systems often used a standard of operation of −8 dBm signal power (about 0.16 milliwatt) in a 10-kilohertz bandwidth. If such a low power efficacy were used for the above example's 1 Gigahertz bandwidth, then signal power needs would leap to +42 dBm or about 16 watts (a power density of 16 nanowatts per Hertz bandwidth). Even the noisier digital system example (+30 dB interference) operates with a thousand times more effective use of signal power (only 16 picowatts per Hertz). These cable system examples did not account for any losses in the cable system or for any high frequency response roll off. Some such losses and roll off will occur and can be easily compensated for by boosting both level and frequency response at the signal transmitter and correcting the balance of deficits with a similar boost in the response of the receiving system. If, as is generally the case, most of the flat loss and high frequency roll-off also operate on the corrupting EMIR and XTLK, then those factors will not so much affect the S/N. This approach has worked reasonably well in practical systems. In the foregoing example, a very conservative 50 dB S/N was used and did not consider the extremely important role that error-correcting coding would play in producing an adequately low level of signal corruption. Error correcting coding typical of SONET or SDH systems used by the majority of the world's digital communication systems would not require nearly so good a S/N, 30 dB being sufficient for trivial errors in most any application. Adding to this repertoire of enhancements the use of digital signal regeneration, performance can be designed for a very high level indeed with only modest use of regenerators. In any good system design, noise immunity will be the major limitation. In these examples, there is much room to adjust to any real system demands. The larger issue for the "last mile" cable system is the EMIR and the XTLK effects which good design must effectively address. It is from those kinds of signal corruption that existing telephone outside plants ("copper wire pair" cable) develop their fatal limitations, resulting in the obsolescence mentioned above. Such older cable systems cannot provide the multitude of users with sufficiently wideband signals because of excessive problems from XTLK and EMIR.

Energy Losses and HFTL

If the insulation material used in a cable design is selected from the better modern plastic materials for the frequency range below 1 GHz, the HFTL of small diameter cables is primarily controlled by the cable conductor losses, which at high frequencies are dominantly the result of "Skin-Effect" in the conductors.

Skin effect has long been known in the art. The apparent resistance seen by alternating current flowing on (or in) a conductor rises substantially above a conductor's DC resistance. The describing equations show that for frequencies above a value inversely related to the diameter of such a conductor, the effect becomes significant. It appears to cause current to flow more and more only within a shallow depth at the conductor surface as the frequency employed increases. For conductors of very large size such effects are apparent even at power frequencies (50 Hz). The earliest investigations, beginning in the 19th century, arose because of the unexpectedly high losses found in large AC power transmission cable systems. In smaller conductors, skin effects become quite significant in the megahertz range. In normal conductor material (e.g., copper), the majority of the current flows in only a thin layer ("skin") of less than a few thousandths of an inch. This approximated thickness is proportional to the reciprocal of the square root of the current's frequency, thus decreasing in relative skin depth to one-tenth for an increase of one hundred in the frequency used. The "skin depth" is considered to be that depth at which the current has become 1/e (about 37%) of the total current value. For non-magnetic copper conductor material (relative permeability=1), a commonly used engineering formula for calculating skin depth is:

$d=2.6*(f)^{-0.5}$ where d is in 1/1000 inch (mils) and f is the frequency in megahertz (MHz).

| F | d |
|---|---|
| @1 MHz | 2.6 mils; |
| @10 MHz, | 0.822 mil; |
| @100 MHz | 0.26 mil; |
| @1 GHz | 0.082 mil |

Skin effect has been analyzed in various ways but prior art analyses share an important fundamental flaw. They lack a causal basis, failing when considering an AC current rapidly initiating from a zero current condition. A different approach, on which some aspects of this embodiment may rely, begins by considering the skin effect as arising from a process of propagation of electromagnetic energy into the highly conductive medium of the conductor. An initial current must propagate into the conductor in order to be conducted.

It is therefore necessary to consider the skin effect as a process arising from need of wave propagation rather than quasi steady state concepts which become difficult to rationalize for high frequency phenomena and especially signal propagation in cables. (One skin effect survey reference is: H. B. G. Casimir and J. Ubbink, a three part paper in The Philips Technical Review, 1967, Vol. 28, Nos. 9, 10 and 12.)

In an electrical communication cable system, the energy flows through the space in the cable as well, only working with conductors at the cable's spatial boundaries. Viewed this way, the conductors operate much more like mirrors than as conductors of the energy. This perspective will be more fully described as the cable system construction of the embodiment of the invention is detailed below. Of necessity, for mechanical reasons, the space within the cable, must be filled with some insulating substance. That substance also must not have a dissipative resistance or disturbing effect to the flow of electromagnetic energy or it will produce losses of energy or spreading of the energy in time. Such insulating materials (e.g., dielectrics) can have high frequency losses and many materials do. For example, microwave ovens rely on such losses to heat and cook. Modern plastic materials are available which do not show significant loss in the range of interest here, (below 1 GHz). The kind of thermoplastics available permit economical fabrication methods and have sufficiently low dielectric losses as to allow the loss picture to remain largely the result of the resistive losses in the conductive elements of the path.

In efforts to minimize the skin effect resistance, a technique of redistribution of the current into many small conductors has been used. By employing a large total surface area, it is possible to maintain a practical level of losses when conducting high frequency current. Efforts to accomplish this are exemplified by the development of "Litz" wire and other similar attempts at cabling together many small strands insulated from each other to form a composite conductor wire or cable. Though not at first fully appreciated during the development of such cables, proximity of one strand to another causes the AC magnetic field of each wire to induce an "eddy current" in the adjacent wires thereby diverting current in each wire from the proximate adjacent regions of the strands. This "Proximity Effect" greatly increases the apparent AC resistance such that, at a high enough frequency, advantages of Litz construction are ultimately reversed, becoming poorer than a solid conductor of comparable overall diameter. In other words, a given "Litz" construction may show improvement over some span of frequency but at a frequency just a few times the center of its improvement range, standard Litz cable will become worse than a single solid wire of the same conductor DC resistance. Annular (tubular) conductors made of separate insulated wires minimize loss of conducting material at high frequencies but the adjacent conductors composing it still show some proximity effect. To further combat such proximity problems, transposition of the wires has been used so that the wires follow a reentrant or woven pattern breaking up the proximity of one to another. Such schemes have some value over a limited frequency range. Something better is required for a wide wavelength range. Proximity of one conductor to another becomes a limiting problem as the frequency reaches the tens or hundreds of megahertz range.

Providing Low XTLK—in a Single Cable

Two separate cables might be employed to reduce XTLK between the sending and receiving paths if each path's shielding could be sufficient to avoid interaction. This then places the XTLK burden back on the shielding. Shielding can never be perfect and practical limitations still require rather heavy and stiff structure if high shielding attenuation is the objective. With two cables, this need must be confronted with each one of a pair. Overall cost and weight then increase dramatically and mechanical flexibility decreases. The present embodiment of the invention avoids the problem by its approach of putting both electrical paths within the same cable system (inside the same shield). This new approach unifies provision of cable system shielding function (EMIR) and XTLK by perfecting the symmetry of the novel quad configuration of the embodiment of the invention and by the novel role of the surrounding "shield-like" structure. The role of the shield is then to keep to a satisfactory level the ingress of EMIR, the disclosed system benefiting from the exceptional rejection of the ingressing energy due to the balance with which the true orthogonality of the two paths in the quad configuration is developed. The novel jacketing of the cable provides uniformity of the penetrating fields.

S/N and Regeneration for Digital Signals

The above has demonstrated that the S/N, XTLK and EMIR can be managed particularly well by the novel cable features of this disclosure as explained in detail below. For digital signals, yet another parameter known in the art enhances system performance. With digital signals it becomes possible to regenerate the signal at some distance down the transmission cable where corrupting influences have not become significantly disturbing to the data reliability. This is particularly advantageous with simple binary or nonreturn to zero (NRZ) data. As the discussions regarding signal power have shown, for only modest amounts of power the S/N can be quite substantial. Binary or NRZ tolerate modest amounts of noise, producing trivial data errors. One can therefore place a signal regenerator so that its threshold accurately reads the center of the so-called signal "eye". By avoiding long runs of zeros or ones, the line codes used by SDH/SONET systems, such as B3ZS, readily allow a clock signal to be recovered within such a detector system, which further enhances the reliability of the digital signal detection. Placing such a regenerator system at a point some distance down the length of a cable completely regenerates the weakened signal restoring a large signal to noise ratio. Having such a "fresh start," with much more energy than the attenuated signal at that point, raising the signal's level well above both system noise and the cross-talk (XTLK). Such a regeneration scheme may be employed because, for S/N greater than only 20 to 30 dB, error rates can become negligible in practical systems. This ability may be used in both directions of transmission effectively nullifying a large portion of any signal deterioration at cable lengths where the corruption is manageably small, since the moderate amount of power required for the "clean" new regenerated signal is readily available.

Designers may choose the point at which to make this restoration. Integrated circuits are known to the art and are available in performance suitable for the signal speeds considered. Such devices contain differential mode threshold triggering detectors (having some useful hysteresis) and clocked positioning of the decision threshold to synchronize it with the so-called "center of the eye". A dual regenerator system serving each of the two paths may be fabricated in a very small package even considering the need to protect it from static and electrical discharges. Such a package can be incorporated into the Last Mile cable in a small pod hardly larger that the cable itself. The conductors in the cable allowing this regeneration operation to be carried out repetitively even in a lengthy cable run can easily convey the DC power required for such regenerator system modules. The use of the cable's electrical conductors to convey system power for other system needs such as keeping the UID operational is considered a part of the function of the last mile cable system design. This approach allows the application of this novel cable to be extended to lengths easily able to service typical last mile requirements and to provide a system that functions without reliance on any other source of power which may not be as reliable as that supplied by the network. This reliability requirement is viewed as essential for the high level of continuous use which the system affords to network users.

Structure

The embodiment of the invention provides the "last mile" connecting cable system equipping users of networked communication systems with two-way independent electrical paths of equivalent wideband performance as well as providing optical fiber for present and future needs. The quad configuration was chosen because, fundamentally, the two electrical paths can be completely non-interacting. What this demands is simply very good symmetry. Symmetry is the attribute that plays a very important role in both the orthogonality of the two paths (rejection of XTLK) and in each of the path s ability to reject electromagnetic interference.

Figure 16:
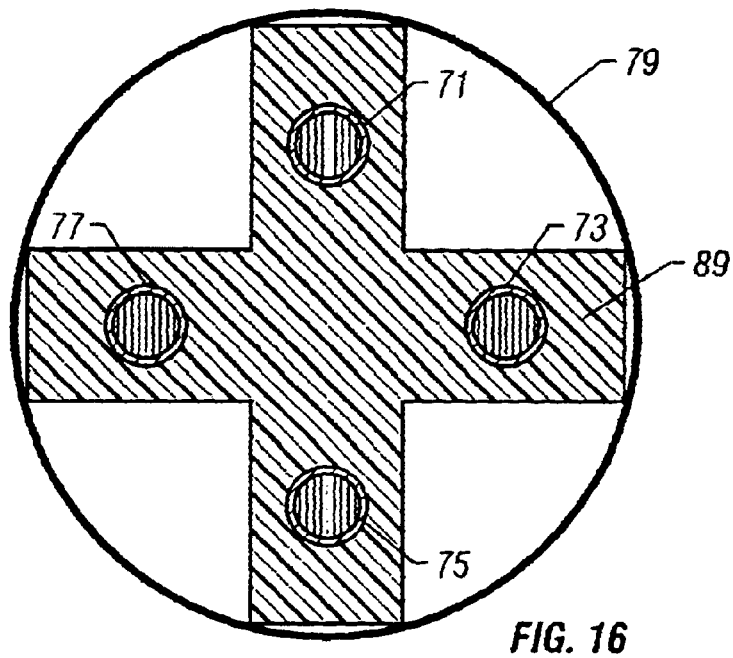
FIG. 16 is a diagrammatic view showing a quad annular conductor center support which maintains precision in conductor location within a cable and in relation to the outer shield.
Figure 17:
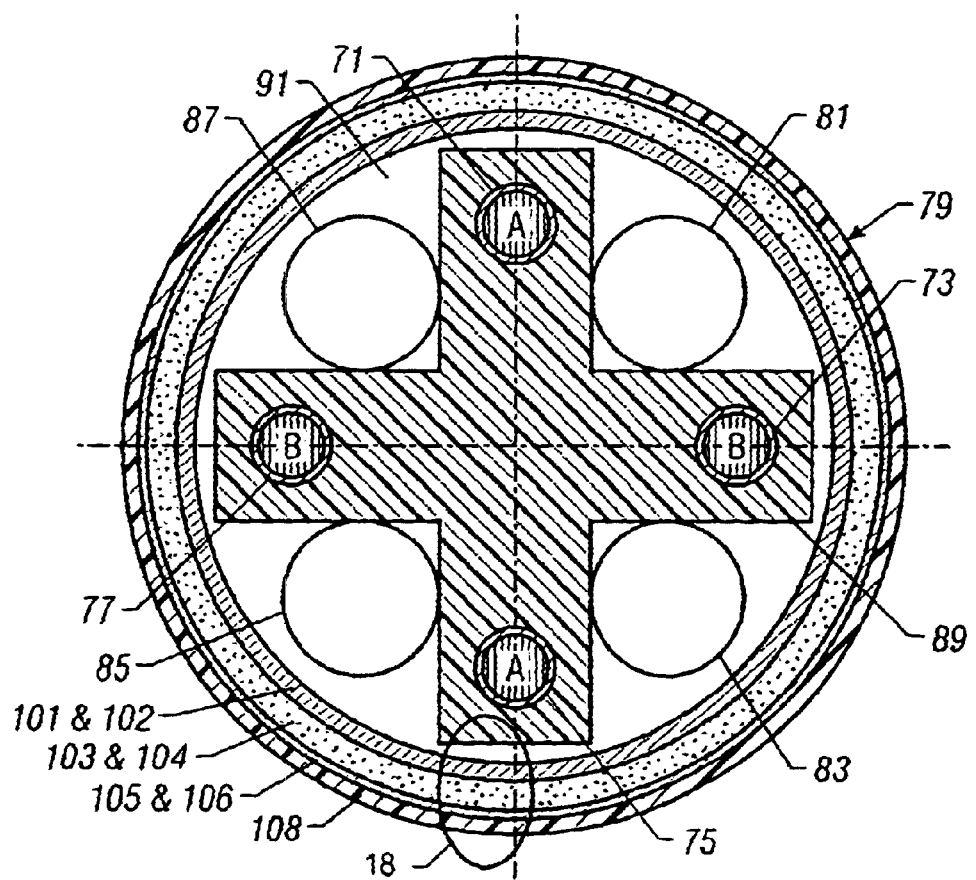
FIG. 17 is a diagrammatic view of one form of a composite cable including fiber optic members.

FIGS. 16 and 17 show in cross-section a general form which such a four-conductor novel quad arrangement might take. In FIG. 16, substantially exact electrical positions should be achieved for each of four conductors 71, 73, 75, 77 and, if a surrounding "shield" conductor 79 is centered and uniform in its electromagnetic properties around the circumference (over the frequencies of interest), then the two pairs will be precisely at a null of induction of one into the other. Since it is the electromagnetic fields of each of the pairs that are of interest, the degree of balance or symmetry achieved can be assessed by measuring the capacitance from each conductor to the shield and to each of the other conductors. The degree of match is a measure of the inductive as well as the capacitive balance or symmetry of such an array. Cross talk is then vanishingly small and each of the two pairs can be operated substantially independent of the other. This aspect is what attracts our attention for the two-way two-path broadband system. The method by which this symmetry is achieved includes a specially molded positioner as disclosed below.

FIG. 17, in more detail, shows a cross-sectional view of a quad annular hybrid cable. The four conductors 71, 73, 75, and 77 are shown as in FIG. 16. Surrounding shield conductor 79 is also shown, symmetric with the four conductors. FIG. 17 shows buffer channels 81, 83, 85, and 87 which may support one or more optical fibers. A positioner or annular conductor support insulator 89 provides the structure through which conductors 71, 73, 75, and 77 pass. The construction of the positioner 89 is described below.

A filler gel 91 may be employed surrounding each buffer channel 81. The types of filler gels that may be appropriate include superabsorbent compounds such as petroleum-based gels. Such compounds serve at least two purposes. One is to keep the glass fibers contained therein from being corroded by air. Another purpose is to provide lubrication for pulling wires through the cable.

Other advantages accrue with the addition of a twist to the quad internal conductor structure, such that the lengthwise lines of the center insulating and positioning structure and the conductors form a helix down the running length of the cable, say, of one to two turns per foot of cable length. Such a configuration has the useful property that when properly fed from a balanced source and terminated in a balanced receiver, any fields penetrating uniformly to the interior conductors will cause no net current to flow in either pair. The use of twisted pairs is known. However, one advantage to the embodiment of the invention's helical configuration is that the embodiment of the invention's EMIR is enhanced to the same degree that its XTLK is minimized. Thus, in the cable system of the embodiment of the invention, reducing XTLK also lowers unwanted noise ingress of the electromagnetic pollution ubiquitous in modern environments. The "shield's" function in the embodiment of the invention's configuration is not only to attenuate the interference energy but also to symmetrize the electromagnetic transmission of the ingressing fields by distributing that leaked energy symmetrically to the well-balanced interior quad structure.

The quad's balance heavily rejects the energy that does get through. The term "shield" as used herein refers to the behavior of the surrounding structure, not to the common usage which implies simply an energy barrier. Such barriers are always imperfect and some energy always permeates them. This approach of symmetrizing the shield to enhance EMIR is a novel method to defeat the presently growing levels of EMI which are difficult to manage otherwise. The degree of such rejection made possible by the precision structure of the present embodiment of the invention has not been achieved by the prior art known to the inventors which pursued substantial interference rejection even after making extensive use of rather heavy shields in their cable designs.

Inner Symmetrizer Design

The embodiment of the invention uses an inner symmetrizer that surrounds the quad cable. Of course, one skilled in the art recognizes that the quad cable per se is not required. The structures disclosed as surrounding the cables may be employed for dual quad cables, coaxial cables, etc.

Figure 18:
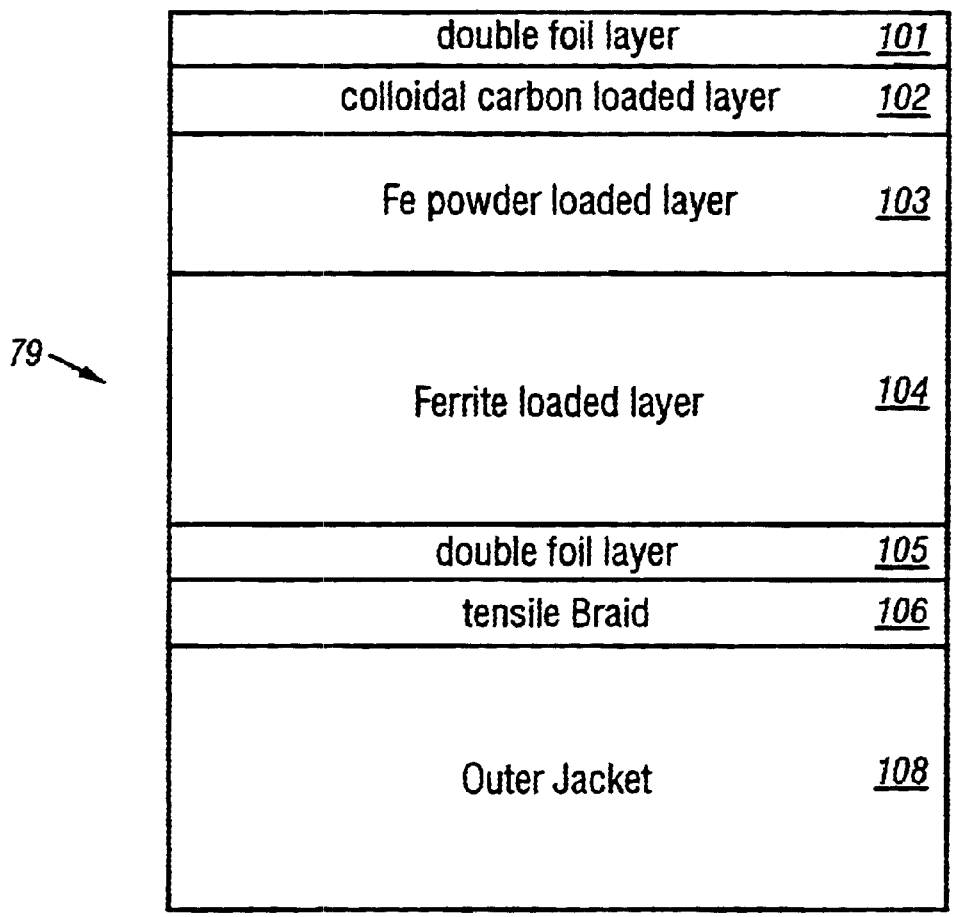
FIG. 18 is a schematic cross-section of a section of the cable wall as located in FIG. 17.

The inner symmetrizer's structure is shown in cross section in FIG. 18 in one embodiment for a local drop cable system and may be utilized similarly in all the other example drawings. The design of FIG. 18 creates a high degree of symmetry in the attenuated electromagnetic fields that manage to penetrate to the interior of the cable, thereby developing substantially increased rejection over what would previously be accomplished by a brute force shield and without symmetry of the conductors.

EXAMPLE ONE

FIG. 18 shows a schematic cross section of an inner symmetrizer seen through a section of the cable wall as located in the dotted section shown in FIG. 17. The layers are described starting from the layer closest to the conductors 71, 73, 75, and 77. The function of each of these layers is described following this short reference list. Of course, the following list is merely exemplary. In fact, it is highly specific and variations of these materials may be employed without departing from the spirit and scope of the embodiment of the invention.

| Layer No. | | Thickness (in mils) |
|---|---|---|
| 101 | Two layers of aluminum foil on a plastic carrier, each laid down foil side first, locking the 1 mil aluminum foil together in a half-turn wrap. | 4 |
| 102 | Colloidal carbon in a pliant urethane binder, carbon loaded to 85% by volume in a thorough shear mixing plasticizer then extruded in a uniform film over layer 101. | 8 |
| 103 | Pure iron powder in a pliant urethane binder, loaded and thoroughly mixed as in layer 101 to a volume percentage of about 90% (iron powder from OMG America, Research Triangle Park, NC). | 16 |
| 104 | Ni—Zn ferrite powder (98% of particles under 5-micron particle size) in a pliant urethane binder, mixed as above and loaded to 90% by vol. | 25 |
| 105 | Two layers of locking 1 mil Al foil as in layer 101. | 4 |
| 106 | Stainless Steel tensile braid. | 16 |
| 107 | *(Optional for some constructions) Corrugated Stainless Steel vapor barrier 2.5 mil thick, corrugated with 30 mil deep ridges on 45 mil centers. Wrapped and continuously seam welded closed. Wrapped on top of a 10 mil under layer of soft urethane extrusion over the tensile braid to fill and grip the ridges. | 35* |
| 108 | Outer protective extruded jacket. A pliant urethane tough material preferably colored to minimize cable temperature during sunlight exposure. Bonded to the stainless steel braid in the absence of layer 107. | 32 |

The composite jacket may add about 0.210 inches to the diameter of the basic quad OD (without the optional outer corrugated vapor barrier). This yields an overall diameter of about ⅝ inch for a quad employing a 0.042" finished diameter tubular annular quad conductor which does not require the vapor barrier to protect the optical fibers which the conductors may contain.

The constitutive layers are further described below.

The aluminum foil material 101 may be backed by a suitable plastic carrier which may be Mylar or some other durable material known in the art, suitable for the temperature range and preferably substantially non-hygroscopic. The paired foil wraps should be wound in opposite directions, with each wrap fully contacting metal to metal for about one half turn and folded once on itself. Each of the two different paired layers (101 & 105) may require somewhat different spiraling of the wrap to realize suitable flexing properties. Layers 101 and 105 may, of course, be replaced with alternative forms of conducting materials.

The colloidal carbon or secondary artificial carbon powder material 102 is available from Asbury Graphite Mills, Asbury, N.J., in a particle size under 325 mesh or finer which is sufficiently small to allow complete mixing of the materials with the chosen binder prior to processing it as a covering for the cable. The surface DC resistivity of the mix in the solidified binder should be under 500 ohms per square. Other materials which may be used for this layer include materials with similar conductive properties.

An appropriate carbonyl iron powder material 103 is available from OMG America, Research Triangle Park, N.C. The purest and finest particle size currently offered is K291A and is suitable for this use. In all cases, uniform and thorough mixing with the binder is essential. The pliant urethane materials are available from a variety of sources, for example, a wide variety being offered by the B.F Goodrich Company. Other materials that may be used for this layer include materials with similar magnetic properties.

The high frequency Ni—Zn ferrite material 104 is produced by crushing and then ball milling the material in several steps to produce an average particle such that 98% by weight of the resulting particles classify as under 5 microns in size. Suitable materials may have complex permeability suitable for the 100 MHz to 1000 MHz frequency range. Milled Philips Ferroxcube fabricated type 4 materials may be satisfactory for the purpose. It is important to consider the anisotropy in high frequency material permittivity that results from the strong magnetizing field in the range of 0.25 to 0.60 Tesla. Other materials that may be used for this purpose include materials with similar magnetic properties, e.g., remanence, permittivity, and permeability.

The stainless steel braid 106 may be selected from those materials in the strand thickness of 4 to 6 mils that display high tensile strength and little creep for the tension levels typical in outdoor suspended cable use. Other materials that may be used for this purpose include materials with high tensile strength.

The outer jacket 108 may be of a tough polyurethane material extruded at a typical thickness of 32 to 40 mils. Other materials that may be used for this purpose include materials with similar strength properties.

The layers of FIG. 18 distribute the penetrating fields within the cable so that they produce a balanced effect on the signal paths. Layer 101 of this non-limiting example of the technique is present for several reasons. First, it acts as a field mirror for the internal fields of the quad signal pairs. Layer 101 also operates on the external penetrating fields by presenting a conductive field short circuit to the penetrating fields, from layer 102, so that the surface current becomes more equally distributed as the same exits layer 102. Layer 102 has a relatively high resistance compared to the aluminum metal surface of layer 101 which creates a large spreading effect on the field coming from the relatively lossey and resistive material of layer 102. EM wave velocity is relatively high in the material of layer 102 and is made to a thickness that allows significant field redistribution. Layer 102 adjoins a layer region 103 above it which has relatively high permeability (5 to 50 within the frequency range of interest) and a medium conductivity which has a rather low EM wave velocity. The junction with layer 102 creates a further spreading effect. The layer above, layer 104, is chosen to have relatively high permeability in the high frequency region (50–500 MHz) where its EM velocity will be fairly low. As a consequence, layer 104 is somewhat thicker than layer 103. Layer 104 has a significant EM velocity difference at the boundary with layer 103 and the field spreading is thus enhanced. Layer 105 is a thin high conductivity layer that produces the typical field current short as a "shield" but its primary value is in the magnetic coupling to the sub layers for the benefits described, as it will only have a small shielding effect against the external fields. The tensile layer 106 is for strength while at the same time providing some electrical current capture in the braid. Layer 107 (not shown in FIG. 18 but described in the foregoing table) may also be used instead. The vapor barrier properties of the stainless steel also provide a shielding effect and some tensile advantages. The outer jacket 108 is for weathering protection and other environmental and handling protection.

Each of the foregoing layers may be varied or another layering combination utilized. The principles of the varying of the EM properties in abrupt junctions with differing EM propagation accomplishes a significant symmetrizing effect which is a desired feature. Attenuation, per se, is not a main object of the constructions described.

To evaluate possible constructions one can construct a relatively perfected helical quad line of the type described above and, using it as test device, compare the contributions to the balanced signal transmission through the cable with and without a possible symmetrizing covering of the type described.

The differences reflect the relative advantages of the "collimating" or symmetrizing properties.

Outer Impedance-Matching Housing

A second form of outer covering develops some properties rather different from the classical shielding means for the purpose of reducing the effective antenna-like gathering of electromagnetic energy which any conductor line set in a typical outdoor environment will exhibit. Since it is impossible to make a physically realizable "shield" that is not penetrable by electromagnetic fields, the inventors have found another way to achieve reduction in vulnerability to such electromagnetic interference. The symmetry and balance features of the subject cable system design have been discussed. The second approach allows a different factor to be utilized.

Space itself has a characteristic impedance which characterizes electromagnetic field propagation. The resistive component of this radiation impedance is about 377 ohms, a value derived from the ratio of the permittivity of space to the permeability of space (or the inductance and capacitance of space). If the surface of a cable were made to exhibit a resistance to a propagating electromagnetic field which had the same value as that of the same space when unoccupied, then the cable would produce an antenna effect of much smaller area and thereby absorb much less energy than an unmatched good conductor of the same extent as such a cable. The cable's action as an antenna would be substantially less, gathering only due to the energy flowing through little more than its optically apparent projected area. It would, in fact, almost appear to be invisible to a radiating electromagnetic field. Whatever the inner layers of the jacket system may be designed to do, if this effect is present, the shielding effect of other such inner layers will be much enhanced.

Figure 19:
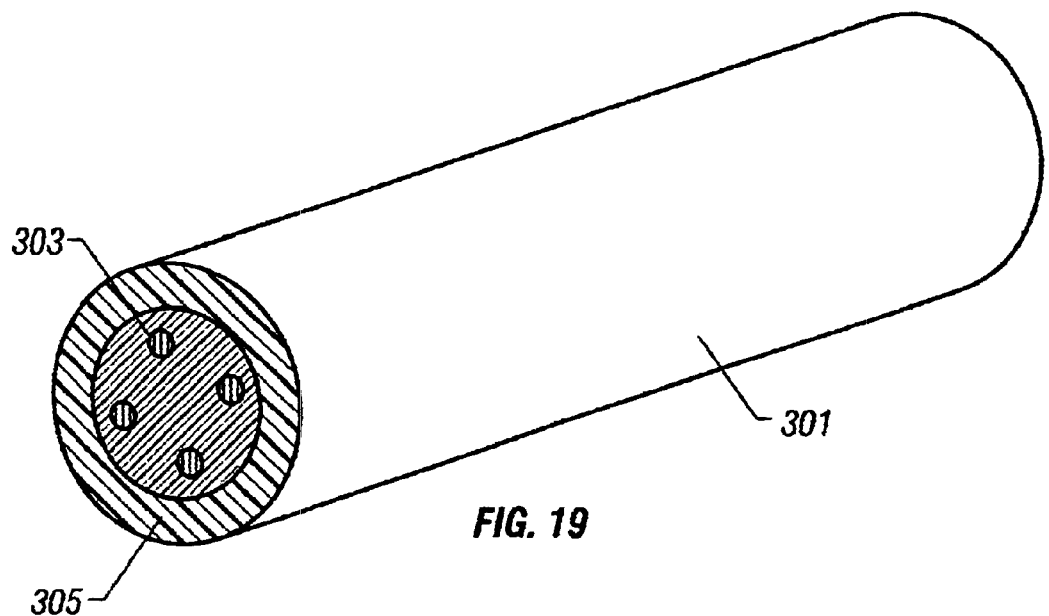
FIG. 19 is a perspective section of a cable according to the present invention employing an outer impedance-matching housing.

This design for a surface or exterior apparent resistance matching the radiation of space is realized using an outer impedance-matching housing according to the embodiment of the invention and is shown in FIG. 19. Referring to FIG. 19, a cable 301 is shown with a quad conductor configuration 303. An outer impedance-matching housing 305 is incorporated surrounding quad conductor 303. This outer housing has an apparent radiation resistance matching the radiation characteristics of space and may be realized for a reasonably wide range of frequencies using dissipative loadings in a polyurethane jacket material. Loading with a mixture of artificial graphite carbon particles such as Asbury Graphite Mills (cited above) A99 material (or finer size grades) and metallic powders such as OMG Americas (cited above) AN325 (or finger grades) of ASTM NO2200 class atomized pure nickel powder can provide the requisite radiation dissipative properties.

In choosing materials and combinations for the effects desired in the dissipative resistive match to space of the surface properties of the outer impedance-matching housing, two aspects should be considered. First, there is a method by which one may evaluate material and construction performance in minimizing the impact of a radiating electromagnetic field encountering the material. This is one way one may choose appropriate materials. Using an anechoic room designed for RF fields in the frequency range of interest, one may launch relatively plane wave RF fields at a non-reflecting wall. A directional RF receiver can then be configured to observe the amount of reflected energy returning from such a wall. A pulsed emission and detection can be used to minimize stray returned energy. By placing a metallic conductive object of the same profile as the cable to be evaluated on the same wall, its reflection can be recorded. This test part is removed and the cable with the material covering to be evaluated is placed as was the test piece. The measurement is then repeated. The values so obtained give a relative measure of the degree to which the test material approximates a good match to space. Using such a method or another, one may try other forms of carbon or similar materials which may be employed. For instance, some of the natural or mined flake graphite and/or in combination with other conductive particles or fibers of various metals, for example, with or without very small stainless steel particles or fibers may be well appropriate. A range of materials exist which may be effective in this manner, in particular, materials which closely approach a match to the properties of space so as to minimize the "pickup" of radiating EM fields for the range of frequencies of interest.

One well known test method for assessing the ability of a cable to not transfer energy from external fields into its signal path is the established "surface transfer impedance" measurement defined in US military specification MIL-C-85485A item 4.7 et al. However, this test does not accomplish its objective (of defining the ingress effects) when confronted by the balanced quad configuration. The test is not even completely adequate in its primary domain of coaxial systems. The concept, if properly applied to the structures of the present embodiment of the invention, would likely show extraordinarily low values of energy transfer as a result of the contribution made by the balance rejection which is well beyond the energy attenuation of the shield itself. For reference to test problems of this MIL specification, and other test problems and issues of cable design and measurement, see the following two references:

*Introduction to Electromagnetic Compatibility* by Clayton R. Paul (1992, John Wiley & Sons, Inc., New York) chapter 10, pages 491–692; *Cable Shielding for Electromagnetic Compatibility* by Anatoly Tsaliovich, (1995, by Van Nostrand Reinhold), in particular chapter 3.

The inner shield layers surrounding the quad configuration serve yet another purpose in acting as an electromagnetic mirror to confine the internal fields of the quad conductors, thus preventing the loss of signal energy. As a further benefit, the conductor structure also reduces signal energy loss by virtue of its more confined propagation. Referring back to FIG. 18, the conductive layer 101 proximate to the outer surface of the quad's dielectric positioner 89 is designed to minimize such loss. This surface is best proportioned so that the space between it and the quad conductors is substantial in relation to the spacing of the conductor pairs, aiding in the preservation of the precision symmetry and minimizing the influence of the shield ("mirror"). This would be a diameter perhaps as much or more than double the space between a conductor pair. (See Bell System Technical Journal vol. 15, no. 2, pp 248–283, by Estel I. Green, F. A. Leibe and H. E. Curtis).

Figure 20:
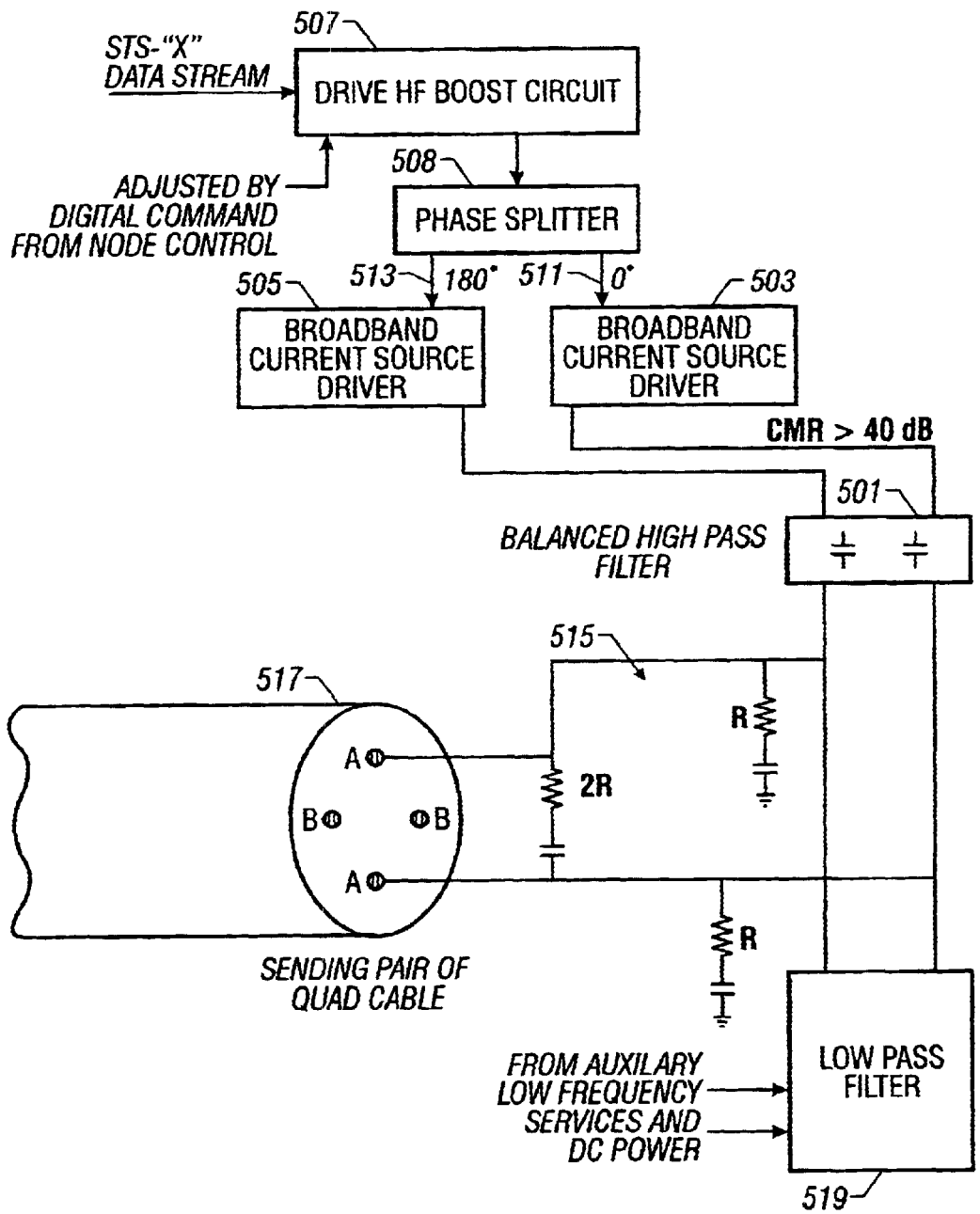
FIG. 20 shows a schematic form of a possible drive and terminating means to achieve a balanced operating condition for a quad cable.
Figure 21:
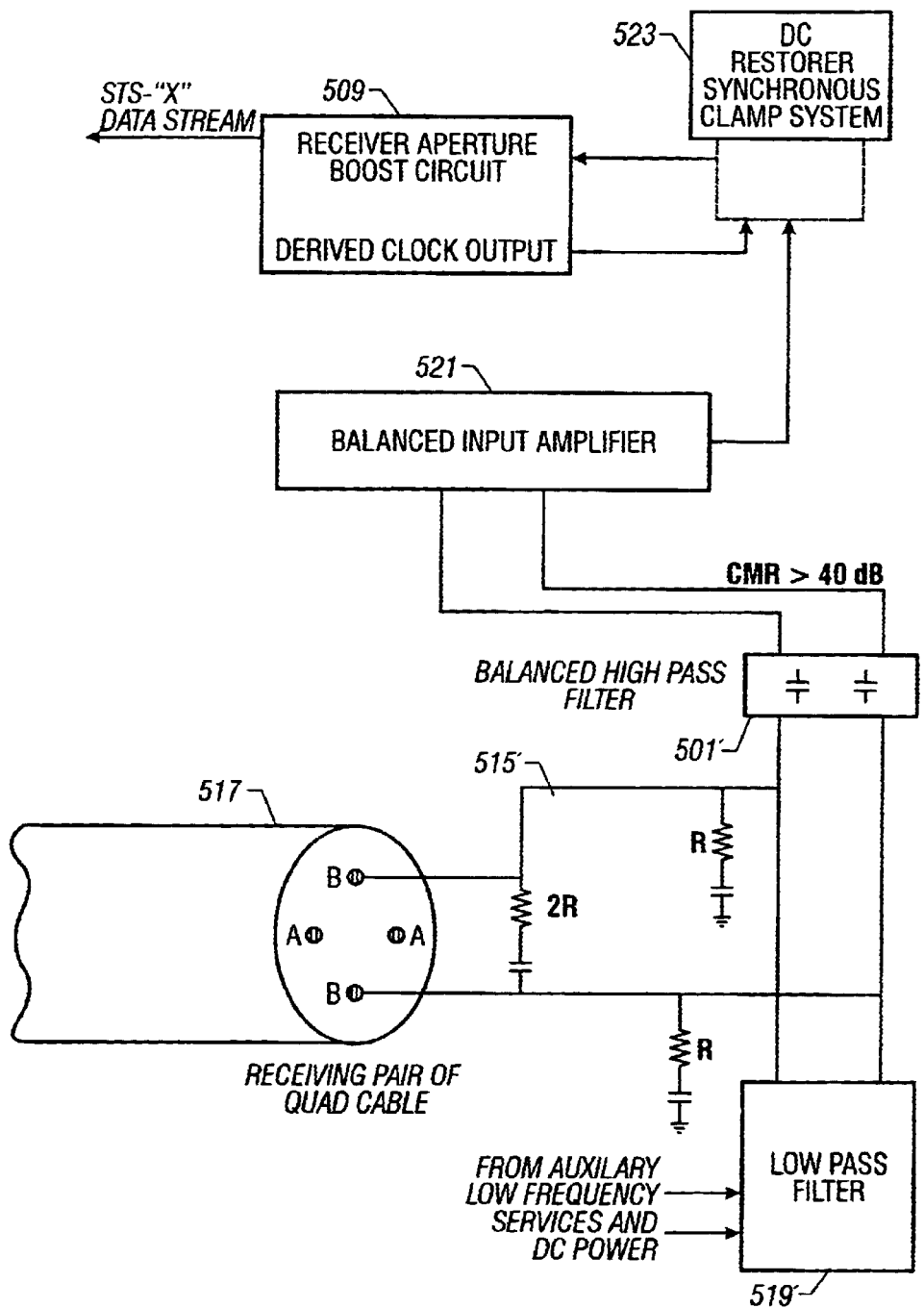
FIG. 21 shows a schematic form of an alternative embodiment of a possible drive and terminating means to achieve a balanced operating condition for a quad cable.

To preserve the inherent balance of the quad, the source and terminating devices are also important. Any significant disturbance of the intrinsic balance of the cable at these ends produces increases in the entry of unwanted energy and additionally adds internal cross-talk between pairs. Some examples of novel balanced-to-unbalanced couplers ("baluns") and cable driving circuits baluns are shown in FIGS. 20 and 21 and form an important part of the regenerators, the NIDs and UIDs as shown in the systems diagrams of FIGS. 1–8. They are further discussed in the section on Driving and Terminating for Good Balance.

Figure 22:
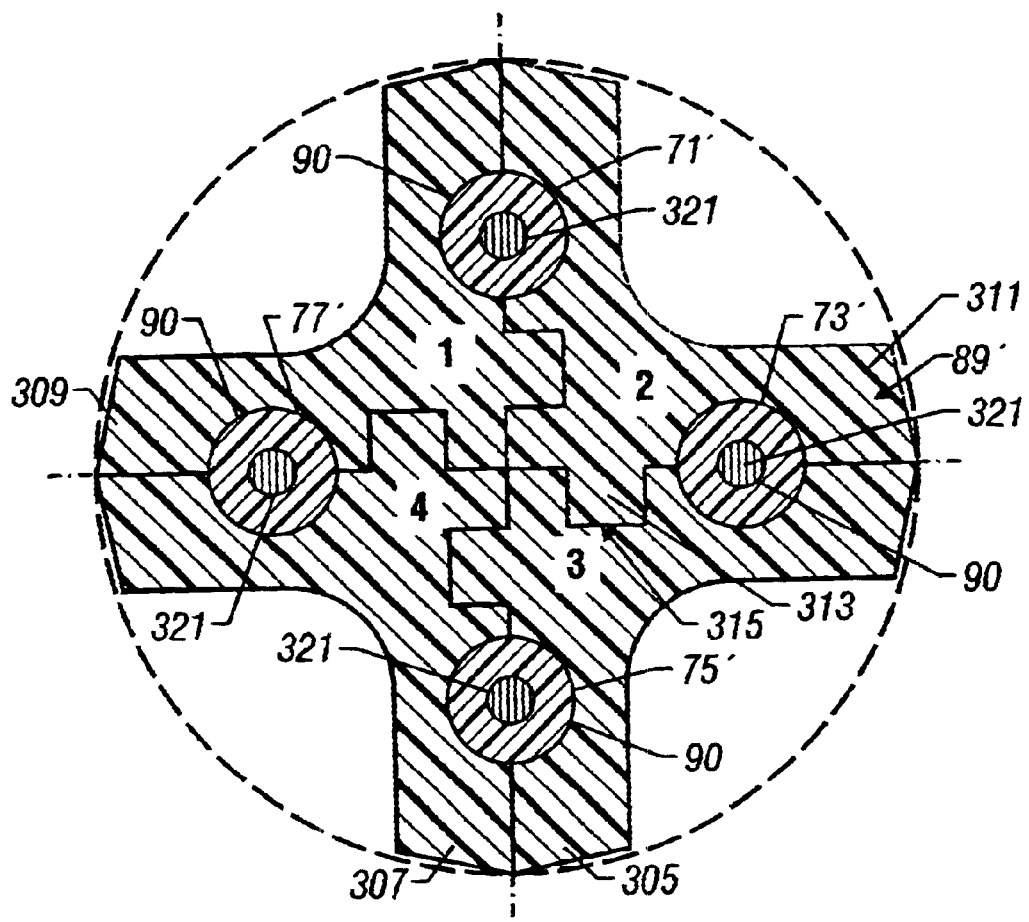
FIG. 22 is a diagrammatic cross-sectional view of one form of the novel interlocking positioner.

Another of the embodiment of the invention's contributions to the achievement of precision in the electromagnetic structural geometry arises from the conductor positioner structure as shown in FIG. 22. Efforts to extrude a quad with the four conductors in place has been shown to suffer significant variability even when extreme effort is exerted to control the process. Canadian Patent No. 788,603, issued Jun. 25, 1968 to Eyraud and Delorme of Compagnie General d'Electricite, Paris, France, endeavored to create good symmetry by mechanically milling four helical grooves into a continuous cylindrical "stem" including a thermoplastic dielectric (presumably extruded), reinforced centrally by a glass fiber cord, and subsequently placing conductors in the four milled grooves. This patent shows spiraling of the grooves to provide the desired helical rotation of the quad orientation. Such an assembly was then to be covered with a suitable additional insulating dielectric, shielded, and externally sheathed. The plastic "stem" material and its processing, probably by extrusion to a form suitable for machining, was not discussed.

It has been well known in the art that considerable stresses are usually present in material formed in such a manner. Machining releases these stresses resulting in significant relaxation strain. This affects the precision of the resulting machined "stem" both initially and increasingly over time by both release through aging in the field and from daily temperature cycling experienced by outdoor cable systems. The Eyraud patent's approach, apart from any limitations of its method of creating the "stem," simply precedes a different group of precision problems coming from the placement of its wired "stem" into some surrounding dielectric and shield since any errors in doing so will also translate into imbalance in the resulting system. The patent did not disclose the manner of accomplishing this last phase of fabrication.

The present embodiment of the invention avoids such problems by providing a precision insulating and positioning structure, as show in FIG. 22, which locks the conductor array 71, 73, 75, and 77 into a precise position within an electromagnetically enclosed final form. In one form, the positioner 89 is fabricated as four linked longitudinal sections using an especially high stability extrusion process disclosed below under Extrusion Methods. This process ensures that the as-fabricated shapes of the four parts remain identical and stable not only during manufacture but subsequently during extended use and during aging in the field. The inventive method releases stresses normally associated with the pressure and temperature gradients present in standard extrusion methods (even when using mixing as with screw plasticizing means). The lifetime performance of the present embodiment of the invention's cable system may be, whether indoors or outdoors, even greater than one hundred years. Selected modern materials, along with the fabrication methods of the embodiment of the invention, make this desirable objective economically attainable.

Figure 23:
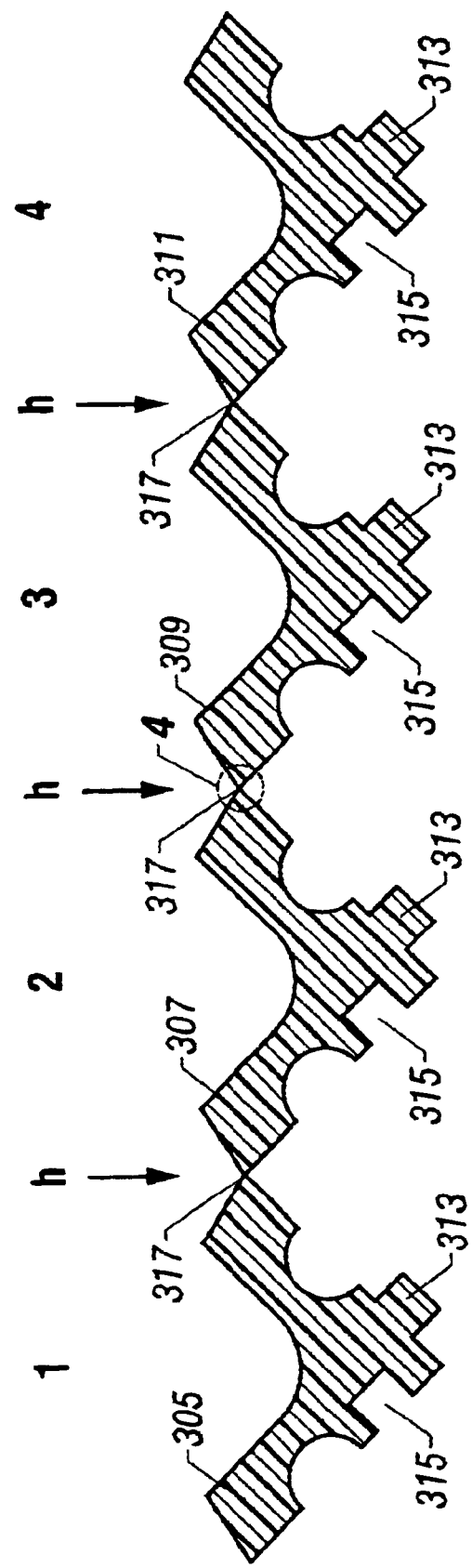
FIG. 23 is a view of the form of the unlocked extrusion of FIG. 22.

In several preferred forms, these novel insulating and positioning parts interlock around precise annular signal conductors also of a special form further disclosed below. Some examples of the general form of these four positioner parts is further illustrated in FIGS. 22–27. These figures illustrate how a typical interlocking set of projections and recesses may be configured to capture and hold the relative locations of the elements of a positioner structure for the four quad conductors. Referring to FIG. 22, positioner 89 is shown in four separate sections. These sections are numbered 305, 307, 309, and 311. Each of the sections is generally L-shaped and includes a male member 313 which fits in slot 315. These elements are further shown in FIG. 23. FIG. 23 further shows a number of hinge points 317 which allow the sections to be conveniently extruded. Once the extrusion is formed as in FIG. 23, each section can be rotated with respect to its adjoining sections in order to form the complete positioner 89'.

Figure 24:
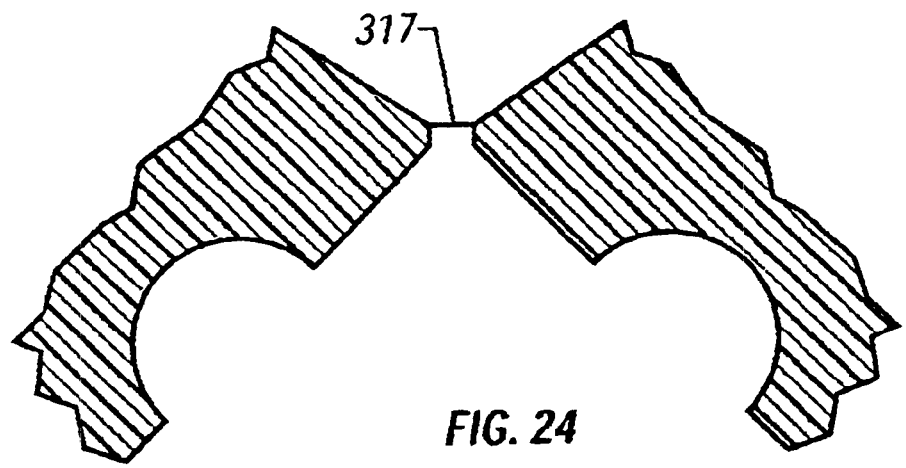
FIG. 24.is a schematic further detail of the positioner.

FIG. 24 shows a more detailed view of the molded-in hinge 317. As may be seen, in a four-section extrusion, typically three junctions or hinges 317b would be appropriate.

Figure 25:
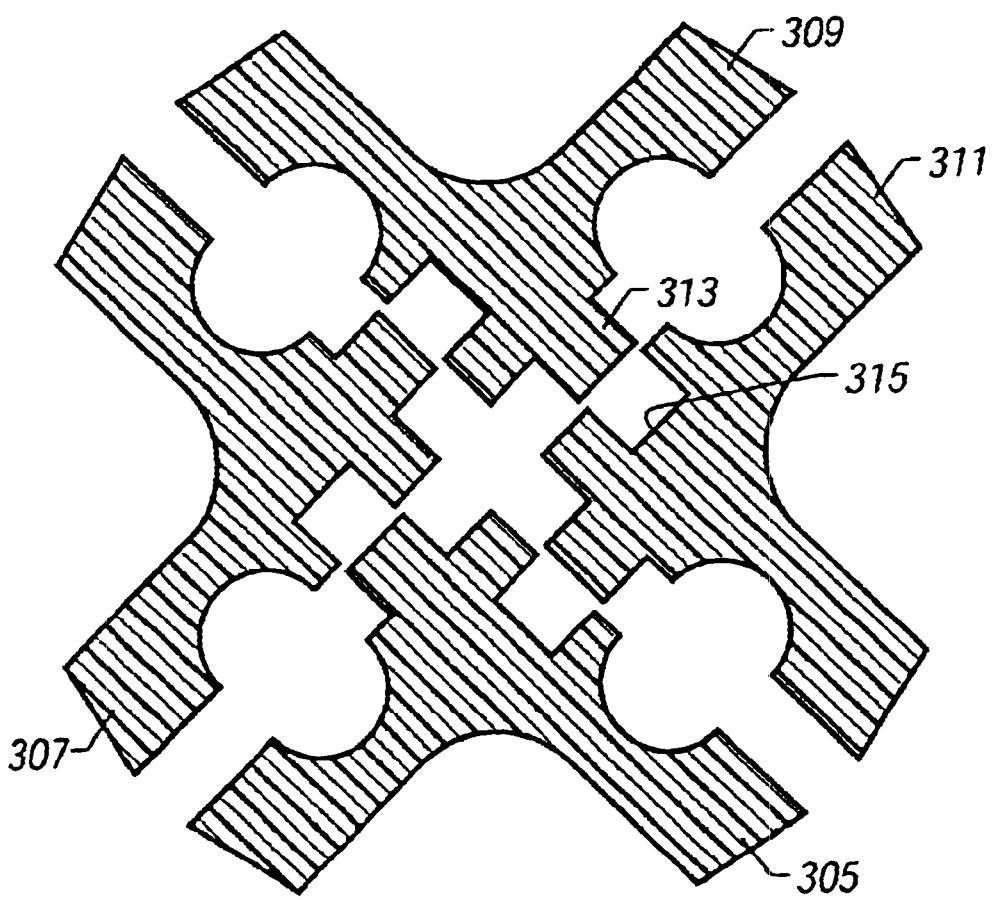
FIG. 25 is a schematic exploded view of one embodiment of the positioner, illustrating separated interlocking elements.

The sections may be rotated in order to form the complete positioner 89' or may be separated at the hinge points prior to such formation. FIG. 25 shows the embodiment where they are separated. FIG. 25 also shows the male member 313 of each positioner in a position to enter the slot 315.

Figure 26:
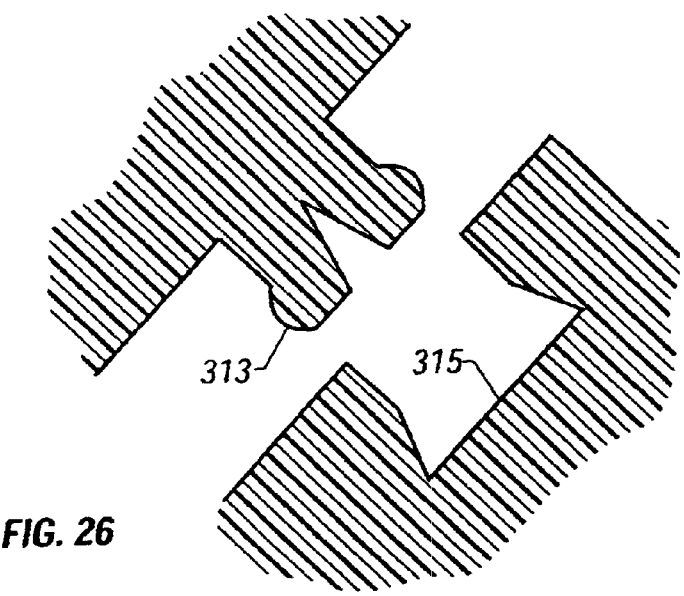
FIG. 26 is a diagrammatic enlarged cross-section of a form of snap-locking portions of a positioner which may be employed with the present invention.

This situation is shown in more detail in FIG. 26. In particular, FIG. 26 shows an example of a possible snap locking configuration. An annular ring around male member 313 fits in a corresponding section of slot 315 to more securely hold the sections of the positioner 89' together.

Figure 27:
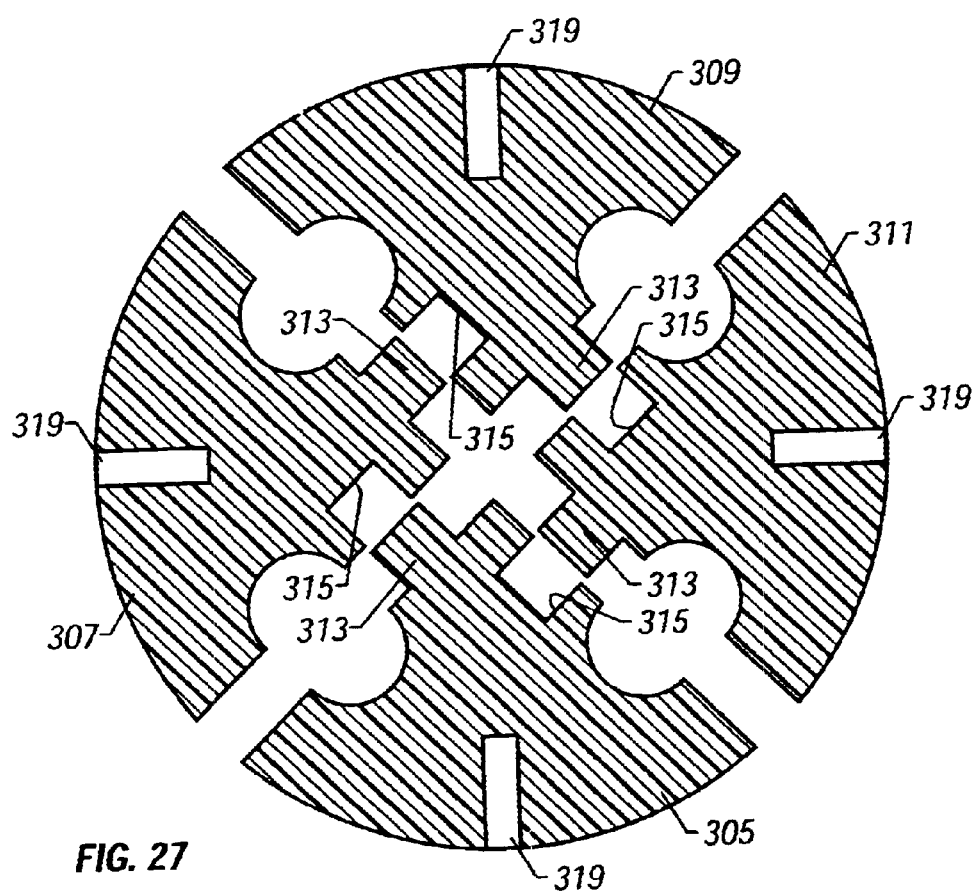
FIG. 27 is a schematic cross-section of a full circular form of the four section extruded positioner.

The perimeter may be of any convenient shape as in FIG. 27, where it is circular. FIG. 27 also shows optional perimeter slots 319 for holding fibers or other conductors. In an alternative form of this structure, the slots 319 may not be present, the perimeter being just some circularly symmetric surface. Any fibers or conductors other than the four quad conductors may, in this example of structure, be entirely within the interiors of the four quad conductors.

Returning to FIG. 17, there is shown sufficient space to install fiber optical lines in the interstices or buffer channels 81, 83, 85, and 87 of the positioner. Further, the positioner shape 89' may be formed to accommodate whatever cable shape is desired. The positioning and the dielectric properties of these four regions must, however, preserve the quad's internal electrical symmetry. The four regions must be uniform in their electrical behavior even though that aspect may have nothing to do with their function as optical fiber holders.

The inventors have further found yet another way to include optical fiber in the new quad structure. As indicated in FIG. 22, the cores 90 of the four annular conductors 71', 73', 75', and 77' may be used to contain fibers 321 in each one or any combination without disturbing the electrical balance. For example, one to sixteen or more fibers may be provided inside each of the four annular conductors allowing electrical performance to be independent of the fiber's dielectric properties. This advantage is considerable since the desired helical twist of the quad array (a non-limiting example uses approximately two turns to the foot) will also provide significant margin for elastic relief of the fiber, freeing it from thermal expansion, movement or mechanical strain from cable movements. The helix suggested in the example requires about 110% length of conductor and fiber within the cable relative to its overall exterior cable length.

Figure 28:
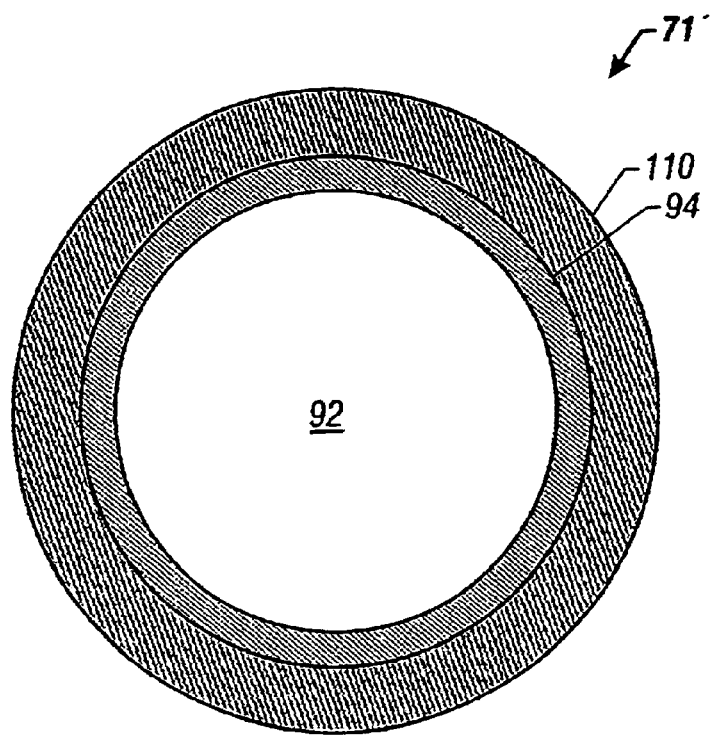
FIG. 28 shows a cross-section of a form of the novel annular conductor, showing the novel wave guiding wires and the center core available for optical fibers.

FIG. 28 shows in cross section one possible type of annular conductor of the embodiment of the invention, here exemplified as 71', the center region 92 of which allows fibers to be installed during manufacture or even to be blown into place later after a cable is installed. One way in which fibers may be installed after the cable is laid includes the technique of fiber blowing. In this technique, a mushroom-shaped device is attached to the end of the fiber, and the tip of the fiber is placed within a cable. A high-pressure air source engages the mushroom-shaped device, pulling the fiber through the cable. Other techniques, as are known in the art, may also be employed. FIG. 28 shows a cross section of one example of such an annular conductor of the innovative design. The center annular support sheath 94 need only be of such thickness as will adequately support the woven braided special electrical conductor 110. The surface of the interior fiber conduit 94 may be of a low friction material such as one of the fluoropolymers. This allows a wide range of possible choices for accommodating the optical fibers. The structure of each of the, e.g., 36 individual wires which may be employed in this example derives from a new approach to minimizing the skin effect and the proximity losses found in braided multi wire conductor configurations. Discussion of the skin effect was introduced above in the section entitled Energy Losses and HFTL. In considering the behavior of electromagnetic waves propagating into a conductive medium, the group velocity of the actual physical energy moving into the material becomes remarkably small considering that it is an electric field effect. That velocity is but a very tiny fraction of the velocity of light propagating in free space. For example, for the conditions describing the skin effect data for copper given above, this group velocity is 47 meters/sec. at 1 MHz and rises to only 470 meters/sec at 100 MHz. The space and shape of the annular conductor may be selected to suit the requirements of the fibers without compromising the qualities of the annular conductor.

Over time, optical fibers may be susceptible to damage by corrosion from water vapor. Superabsorbent compounds may be used to fill the space about the plastic coated optical fibers within the center region 92 carrying them. These materials absorb and immobilize what little water enters the otherwise well enclosed relatively water resistant cable structure. The outer sheath 94 of such a cable must also be relatively impermeable to water.

Figure 29:
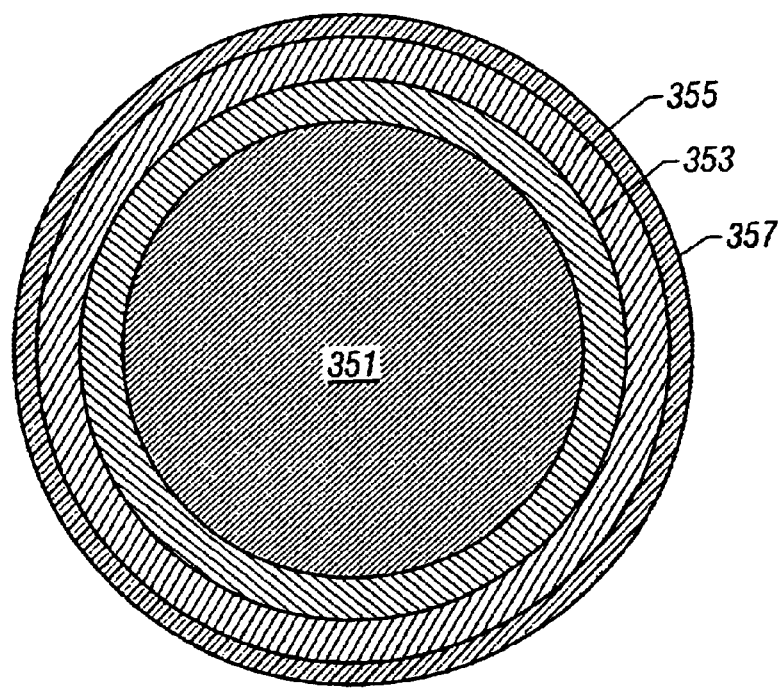
FIG. 29 shows a cross section of one wire within the annular conductor of FIG. 28.

FIG. 29 shows an annular conductor utilizing an embodiment of the invention's structure for improving the performance of the 36 strands (shown as ends in the figure) of 39 size magnetic material wire, 50% conduction coated with copper as described below in relation to FIG. 23. Each wire of the 36 strands, as shown in FIG. 29, has a first conductive layer of copper material 353 coating a steel tensile core 351. This is followed next with a high frequency magnetic material matrix 355 having a high degree of permittivity anisotropy as described below and further coated with a fluoropolymer insulation 357. To form the annular conductor, these wires are woven in a 2×18 weave braid filling the surrounding portion of the 0.042 inch OD hollow sheath which is suitable for containing optical fibers or other conductors. The braid is a tight weave to closely hold the design outer diameter to the value needed to maintain the nominal design impedance value.

Figure 30:
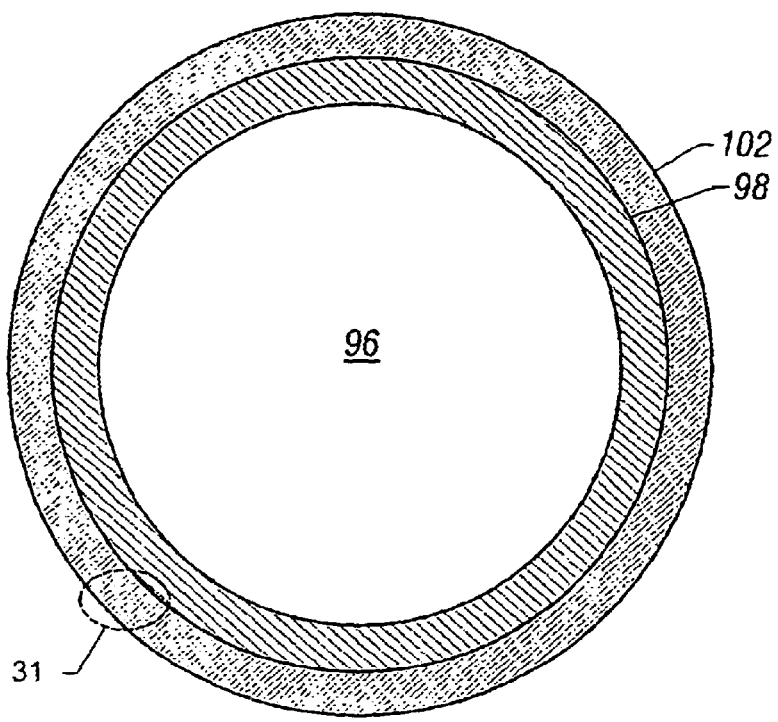
FIG. 30 shows a form of a unitary tubular annular conductor ("UTAC") having a surface wave guiding function and with a center core available for containing optical fibers and protectant.
Figure 31:
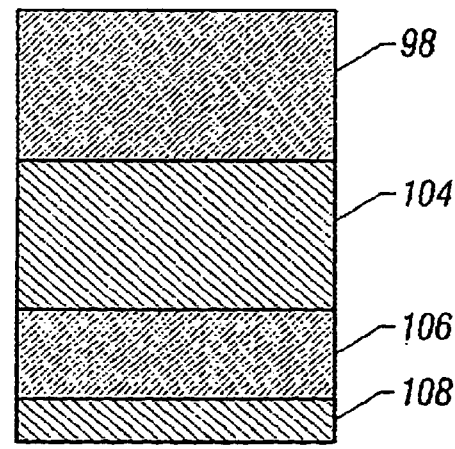
FIG. 31 shows a schematic cross-section of the unitary tubular annular conductor of FIG. 30.

Yet another form of annular conductor, shown in FIG. 30, is inherently water vapor proof by virtue of a solid metallic tube 102 giving even better protection for its enclosed optical fibers. In FIG. 30, a center region 96 for fibers is shown. The wall surrounding this region should be thick enough to support flexing and the magnetic field strengths encountered. Surrounding this region is layer 98, formed of a tubular magnetic material, this layer providing an annular support sheath for optical fibers. Finally, a coating 102 is placed on layer 98. Coating 102 may have three layers as shown in FIG. 31. The first coating 104 is formed of a conductive layer. In this example, first coating 104 may be copper about 28 microns thick. A second layer 106 is provided of a magnetic matrix, having anisotropic and. In this example, second layer 106 is about 10–20 microns thick. A third layer 108 may be formed of a dielectric coating, in this example being 4–8 microns thick. A schematic description of these layers is shown in FIG. 31.

Annular Conductors

The annular conductors of this disclosure have elements and structure complementing the several functions that these four conductors perform in the embodiment of the invention. The annular conductors may be chosen according to specific criteria. Appropriate annular conductors may perform at least some of these six functions:

1. Carry the two signal paths with acceptable high frequency dispersion.
2. Carry power to in-line regenerators, to UID peripherals and to related devices, and optionally to permit the flow of POTS signals.
3. Maintain precision and balance in the wideband characteristic propagation impedance of each pair.
4. Keep signal losses to a manageable level, particularly at high frequencies.
5. Act as a protective conduit for the optical fibers needed for present and future applications.
6. Provide additional strength and stability for the quad assembly to help preserve the geometry for low XTLK and high EMIR.

Figure 32:
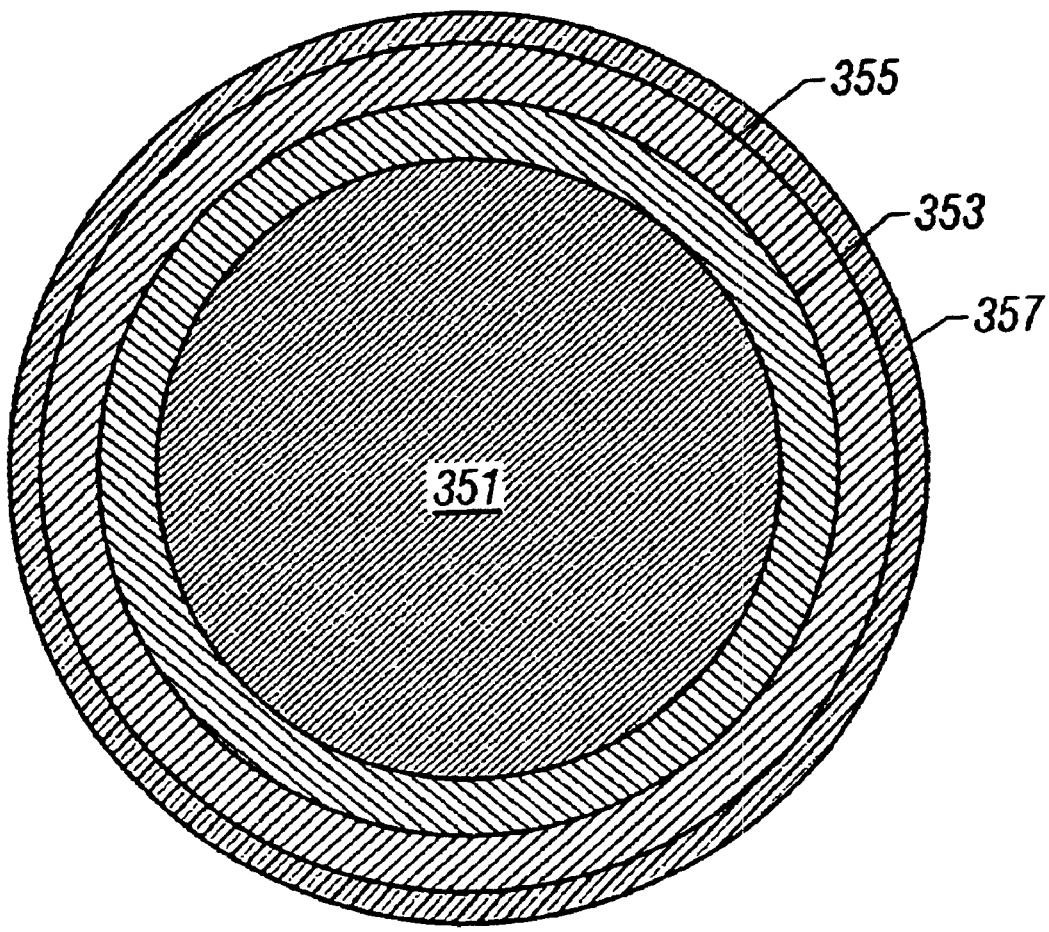
FIG. 32 shows a schematic form of the cross-section of an individual conductor within the annular conductor assembly shown in FIG. 29.

FIG. 32 shows a cross-section of such a kind of individual wire as discussed above with respect to FIG. 29. Its design differs from the prior art in a number of significant ways that may utilize the less well known properties of wave propagation effects in and on conductive media. These aspects of the embodiment of the invention have the object of improving performance of the signal carrying elements and aiding in the rejection of unwanted external electromagnetic energy by altering both:

a) the skin effect properties of the individual conductors; and
b) substantially modifying the proximity effect interactions of one conductor on an adjacent conductor.

A modification of the propagation of the electromagnetic signal energy into the conductor structure is accomplished in an asymmetric fashion which encourages propagation along the conductor length and improves penetration into the conductive elements.

These conductors have at least some of the following main features:

1. They employ a ferromagnetic material core wire 351 of fairly high strength which has been selected from among materials that also have significant magnetic remanence when axially magnetized.
2. A high conductivity metallic coating 353 is applied to the surface of such a wire core. In the illustrated case of FIG. 32, the DC resistance selected for the copper coated finished wire is 50% of the conductance of an equal (coated) diameter made entirely of copper. With copper used as the conductive material, just a thin layer of copper on the ferromagnetic material is required.
3. This conductor layer is further covered with a thin coating of a high frequency magnetic material 355, having moderate permeability which also displays the following other properties. This coating material 355 is selected from among materials and methods of forming so that when in place on the clad wire, both its permeability ($\mu_r$) and permittivity ($\epsilon_r$) are substantially alterable by the strength and by the direction of a practical value of a biasing magnetic field. When the wire is magnetized, a spatial anisotropy results in values of both $\mu_r$ and $\epsilon_r$. For a given application and for the frequency range of interest, the magnetic material is further selected to have a desired appropriate variation of permeability with frequency over that range and a desired limited amount of energy dissipative losses.
4. The magnetic coating 355 may be a mixture of very fine particulate material (e.g., even nano-phase) with a matrix binder which is selected to allow the permittivity and permeability to be substantially permanently oriented and aligned by a magnetic field during manufacture of the composite wire such that there is thereby produced a substantial and desired spatial anisotropy in both these parameters (and). This provides magnetic permeability in the circumferential region about the conductor that is substantially different from the axial direction and, likewise, a related anisotropy in the circumferential and axial permittivities. This may be accomplished by having the mixture of magnetic materials and a binder in a quasi-fluid or semisolid form which is solidified during the manufacturing process while still under the influence of an applied magnetic field of adequate proportions.

The magnetic material may be one of the class of high frequency ferrites such as one of the Philips Ferroxcube type 4 nickel zinc materials, crushed after being fired and then finely milled, to a particle size giving 98% by weight and being less than 5 microns.

It has further been found desirable that the biasing magnetic field be applied so that the field polarity is reversed in a manner that will cause the anisotropy to be present continuously down the length of the wire, but with the remanent magnetization of the ferromagnetic material wire core and the related polarization of the magnetic molecules being reversed spatially periodically down the length of the wire. The spatial periodicity is chosen in relation to the demagnetizing effects in the ferromagnetic material wire core and also in relation to the wavelength of the highest frequency spectrum to be transmitted in the cable system and the propagation properties desired for that spectrum.

The structure and functioning of this anisotropic system differs fundamentally from prior systems. Numerous examples exist in which magnetic materials have been used to simply load the signal conductive lines as in past efforts to increase inductance of the line, thereby raising its propagation impedance, and thereby to reduce signal loss and to correct frequency response drop off. A few U.S. patent examples of this are: U.S. Pat. No. 1,586,887 to Elmen, "Inductively Loading Signaling Conductors"; U.S. Pat. No. 1,672,979 to Fondiller "Loaded Conductor"; U.S. Pat. No. 2,669,603 to Prache "Transmission Line With Magnetic Loading"; U.S. Pat. No. 2,787,656 to Raisbeck; U.S. Pat. No. 4,079,192 to Josse "Conductor For Reducing Leakage At High Frequencies" and in a different class of effects are: U.S. Pat. No. 3,668,574 to Barlow "Hybrid Mode Electric Transmission Line Using Accentuated Asymmetrical Dual Surface Waves"; U.S. Pat. No. 4,017,344 to Lorber et al., "Magnetically Enhanced Coaxial Cable With Improved Time Delay Characteristics"; U.S. Pat. No. 5,574,260 to Broomall et al. "Composite Conductor Having Improved High Frequency Signal Transmission Characteristics". Elmen and Prache are examples of inductive loading equivalent to lumped inductor effects in the line. Prache was one of the first to develop the analysis of the magnetic materials dielectric effects on the impedance of the loaded cable. Raisbeck '656, issued Apr. 2, 1957, completed such analysis by incorporating all losses including the dielectric losses neglected by Prache. Raisbeck's analysis was further expounded in his Bell System Technical Journal article in the March 1958 issue (pp. 361–74). The emphasis of such workers was to minimize the transmission losses for a given size (mainly in coaxial types of lines). They did not attempt to directly alter effects such as skin or proximity.

Fondiller '979, issued Jun. 12, 1928, describes coating a wire with a magnetic material in an extrusion method which he also magnetizes by sending a "strong DC current" down the wire. The coating material described was iron powder in a binder. The patent explains that the DC current magnetizing was performed to raise the coating's permeability and thereby increase the inductance per unit length following the established approach of lowering losses by raising a transmission line's impedance level. No asymmetry properties or other magnetic or dielectric effects were disclosed.

Josse discusses coating the wire with a magnetic material mainly to reduce losses from eddy currents in adjacent wires, applying this principle to Litz wire applications. He also applies the process to superconductive cables and to very high current power line frequency applications, the focus there seemingly being eddy current effects.

The latter group of three patents (Barlow, Lorber et al., and Broomall et al.) is different. All describe experimental results that are not readily explained by classical transmission line and conductor theory. They all cite experimental data showing non-classical behavior. Only Barlow develops a theory of surface wave properties affecting the wave propagation. Lorber observes an anomalously low time delay in his structure but proposes a rise in the effective inductance, in series with the cables' shunt capacitance, to explain it. In other portions of his disclosure, a "wave guide" effect is suggested as contributing to the observed behavior. Lorber also cites the Kehler & Coren 1970 paper (See Kehler, et al., Susceptibility & Ripple Studies in Cylindrical Films, J. of Appl. Phys., vol. 41, no. 3, (Mar. 1, 1970) pp. 1346, 1347) which shows evidence of a non-classical propagation effect at 110 MHz in a short section of a thin magnetically coated wire employed as a center conductor in a coaxial structure.

Broomall et al. develop their explanations of anomalous propagation effects purely in terms of the skin effect behavior. Their structures differ from Lorber in that a magnetic substrate is employed for their basic structure, although they also give suggestions of three layer structures which place the magnetic material in the middle layer. The example they give shows only moderate improvement in loss and delay behavior and no suggestion is made of there being a propagation dominated process. It is not clear from their teaching how to optimize their method for other materials and dimensions.

Barlow thus remains the only one of these examples to propose a direct effect on the wave propagation process. As earlier discussed, the skin effect may more effectively be treated as a propagation effect within the highly conductive and/or permeable media of the sorts of means employed by these patents. Barlow acknowledges the lack of an analytic mathematical treatment in his description. He relates a family of experiments which he finds to be demonstrations of a novel mode of propagation which he calls non-TEM modes. He employs a dielectric layer to develop the novel modes and gives a wide range of thicknesses to be deployed covering the frequency range of 1 MHz to 10 GHz. His journal papers and the curve given in the patent show a substantial alteration in attenuation as a function of the added thin dielectric layer.

It is likely that all three of these patents are best understood in terms of energy-trapping behavior altering the energy propagation.

None of this cited prior art addresses the propagation effects that the embodiment of the invention addresses nor do they teach the development and influence of joint anisotropies in permittivity and permeability. The ferrite type materials discussed above are but one example of possible materials that have microstructural properties such that, under the influence of a magnetic field of moderate value (less than one Tesla), their electromagnetic properties (dielectric and magnetic) are substantially altered with respect to the intensity and direction of the magnetic field. Other crystalline, semicrystalline or even somewhat amorphous substances may display internal ordering properties that develop comparable anisotropies. The embodiment of the invention in part uses such effects to achieve the enhancement of the propagation properties resulting from the unusual spatial distribution of these properties.

The composite wire may be further coated with an insulating outer layer 357. The insulated construction then completes the separation of the component composite wires into a woven or spirally wrapped annular conductor configured on a support core as shown in FIG. 28.

An Alternative Embodiment of the Annular Conductor

FIG. 30 illustrates yet another non-limiting embodiment of an annular conductor that may be used for the quad cable. Referring first to FIG. 31, this hollow core annular conductor may be formed as a single tube of magnetic material 98, coated with a conductive (metallic) layer 104, followed by a thin magnetic matrix layer 106, and overcoated with a very thin insulating layer 108. This structure resembles the layer structure of the individual wires described above. For many applications, this unitary tubular magnetic core form is advantageous. For example, it allows each of the four annular conductors to enclose optical fibers in a vapor proof barrier tube without requiring that the entire cable be thoroughly vapor proofed. Such a tube also affords the opportunity to increase the diameter of the central void space available for the optical fibers and superabsorbent protective filling. The remanence in the magnetizable tube, the scaling of the conductive layer, and the anisotropic properties of the matrix layer may be adjusted to provide effective low loss and uniform propagation behavior resulting in substantially the same or potentially better performance than the woven wire form described above. This simplifies the cable construction and reduces costs, yielding a lighter and somewhat smaller cable. This cable example's tensile strength member would likely be a corrosion resistant high strength braid incorporated into the cable just below the outer jacket covering. The outer covering layers should employ the EMI symmetrizer and the outer impedance-matching housing layer having the resistive spatial impedance design, both as described above.

These annular conductors have at least the following unique and novel properties, and they differ in many fundamental ways from the prior art known to the inventors.

Magnetically "loaded" structures and systems of the prior art have generally focused on simply raising the impedance level of a transmission line propagating electromagnetic energy in relation to the lossey behavior of the conductor systems used to launch and convey the energy. In this strategy, the magnitude of the resistance of such conductor losses becomes a smaller part of the impedance of the transmission system, thus reducing the portion of energy lost to that cause. These efforts do not materially affect propagation properties, nor do they reduce the skin effect. resistance which dominates the conductor AC resistance—especially at high frequency. These approaches have a disadvantage in that they reduce available bandwidth as the price paid for such reduction of losses. A few exceptions have dealt with eddy currents and proximity effects as discussed above. Most of that art has been in power transmission applications with narrowband or fixed frequency strategies that are not applicable to, nor suitable for, the transmission of wideband signal energy. (See U.S. Pat. Nos.: 3,160,702, Lapsley; and U.S. Pat. No. 3,594,492, Bader.)

The present embodiment of the invention, on the other hand, modifies the skin effect in the conductor and alters the manner of propagation of energy along the transmission line path. Such an approach need not raise the impedance of the structure to accomplish improvement and bandwidth is not compromised.

Prudent choice of the configuration of conductors requires that other objectives be served along with keeping transmission energy losses appropriate for the needs of any given application. Such balancing of choices is exemplified by the advanced quad structure's system objectives that heavily weight signal-to-noise ratio, thus emphasizing high performance in XTLK and EMIR behavior. These features together enable the network performance necessary to fulfill the last mile cable system needs.

Soliton Propagation

Under some conditions, the propagation within the subject cable displays very low energy dispersion properties of a type related to the soliton propagation properties that were first noticed in the mid-nineteenth century (1834 by J. S. Russell) as a remarkable kind of far traveling water wave created by a towed barge on a canal in Scotland. Others, after Russell, explored the phenomena mathematically with Korteweg & deVries developing an important basic describing equation (1895). Fermi and others explored the mathematics of such wave systems in 1955 but the major next step came when Zabusky & Kruskal carried the analysis deeper, coining the term "Soliton" to describe the coherent group-like properties of these wave phenomena. Most of the mathematical and practical work on the subject has come about in the 30+ years since then. Soliton propagation has been applied to fiber optic systems with desirable improvements obtained in their optical modality. Fiber optics in use today employ soliton techniques.

The novel anisotropic nature of the electromagnetic propagating conditions according to the embodiment of the invention allows the use of spatial propagation non-linearities (i.e., relatively abrupt and also spatially periodically varying and ) for launching and receiving energy in soliton like mode, having very low dispersion and hence very good high speed waveform fidelity. Soliton propagation presents advantages of lower energy loss, longer runs, and larger effective signal bandwidth because of the character of the soliton's group velocity to carry signal energy over a considerable distance while preserving both its energy and its form in space and time.

The signal source and load coupling means for accomplishing his may be somewhat more complex and costly but can likely be justified when needed. The inventors have not found any prior art that employed such methods for soliton propagation of electromagnetic waves in the sub-optical wavelength range for substantially an all-electrical energy transmission mode. The three patents cited above (Barlow, Lorber, and Broomall) all suggest non-classical propagation but do not explain nor teach a method to achieve an optimum such as this. This embodiment of the embodiment of the invention, contemplating such anisotropy arrangements as described, will facilitate low loss modes of signal transmission in addition to displaying low dispersion of the higher speed elements of digital signals. Other anisotropic wave propagation effects, described in the foregoing section on the special annular conductor structure, may be varied by the choice of magnetic field, observing the optimum for any given signals.

Positioner Fabrication Examples

It is desirable for the precision in symmetry needed for quad cable that the positioner maintain substantially invariant electromagnetic functionality, despite changes induced by expected (or typical) variations of its ambient conditions. Typical thermoplastic extruded shapes contain significant internal stresses which result in shape and dimensional changes that occur after forming, and especially during aging when used for outdoor service. To substantially overcome such problems, the inventors have developed techniques to reduce the production of such stresses during the forming process.

Vibration of the thermoplastic melt, the mold walls, and the extruder can be employed to improve flow rate and to improve the quality of the finished product. Vibrational frequencies ranging between 0.7 and 20,000 Hz have been used in the prior art to accomplish a variety of goals in the production of a variety of thermoplastic products.

Figure 34:
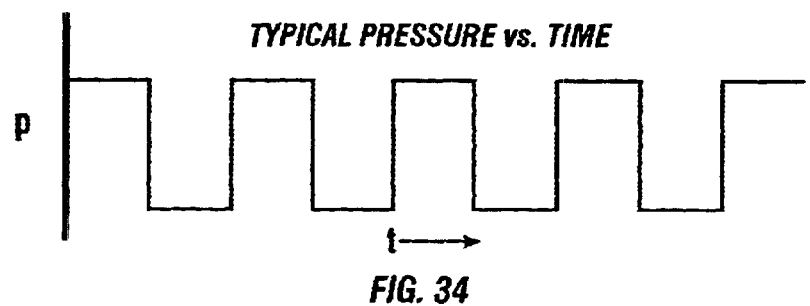
FIG. 34 shows a pressure versus time profile which may be followed in the extruder of FIG. 33 to form the positioner.
Figure 37:
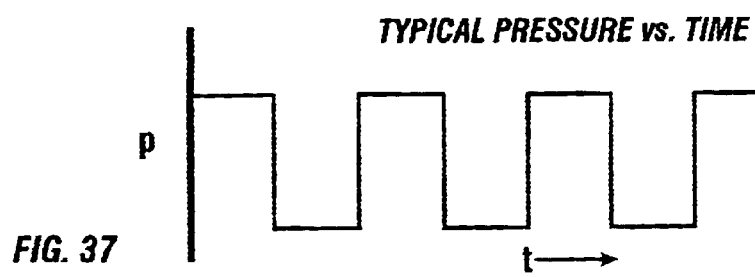
FIG. 37 shows a pressure versus time profile which may be used in the device of FIG. 36 to form the positioner according to an embodiment of the present invention.

The inventors introduce a novel technique in processing thermoplastic materials. The inventors have found that abrupt pressure reduction and return to pressure, repeated frequently during the extrusion process, results in a substantially smoother flow and substantially lower internal stresses in the resulting extrudate form. This high-low-high pressure cycling shown in FIGS. 34 and 37 is rapid enough to be adiabatic.

The cycling is, in effect, a kind of anti-forging process by which the induced expansion waves encourage the snagged and interlocked chains of polymers to release and unsnag. One key feature of the embodiment of the invention is the relaxation of pressure, during the final forming, to substantially atmospheric pressure, and the maintenance of such low pressure during cooling from just above the glass transition temperature to the essentially solidified state. Because of small material and process variability on a moment by moment basis all segments of the positioner may be formed in a simultaneous process using a common flow of molding material.

For thermoplastic materials whose glass transition temperatures are low enough to provide sufficient plasticity at melt temperatures below 600° F. a procedure such as that shown in Example A, below, is preferred. For other thermoplastic materials, like polytetrafluoroethylene (PFTE), which does not actually fully melt but rather requires a sintering process, the embodiment of Example B may be more appropriate. These examples are noted are described below and illustrated in FIGS. 33–38.

Example A

An important factor in this process is the rapid and frequent pulsating release of pressure during the melt forming and extruding process. These thermoplastic polymers have a molecular form of both varied molecular weight and varied polymer chain length which encourages the interlocking of the chains which leads to non-Newtonian flow properties producing the locked-in stresses from typical continuous high pressure forming methods.

Figure 33:
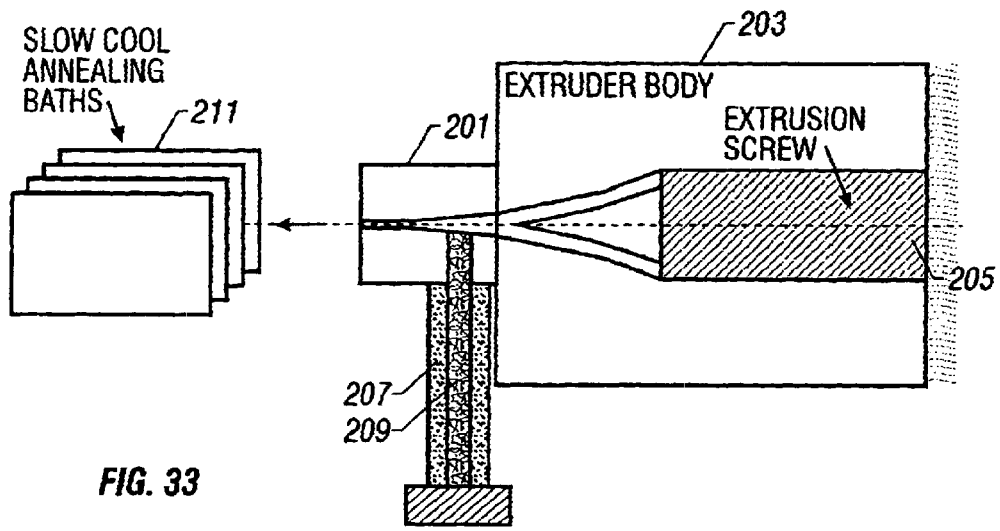
FIG. 33 is a schematic cross-sectional view of an extruder die head and body which may be used to form a positioner according to an embodiment of the present invention.

FIG. 33 shows an extrusion die head 201 connected to an extruder body 203. An extrusion screw 205 is located within extruder body 203. One or more hydraulic piston assemblies 207 are used, with pistons 209, to adjust the volume change and thus the pressure. The amount of volume change required for the pressure to drop substantially may be small. Thus, the small hydraulic pistons, surrounding the final mix chamber just before the extrusion shape die, need move only a very short stroke, which is sufficient to allow the rapid pressure change to be produced with much less inertia than might occur from efforts to move the screw plasticizer or main pressure piston. The inventors have found that the extrusion die should have a small taper along the bore in order to avoid turbulent mixing in the approach to the final form aperture.

For this process, appropriate pressures may range from about 0 psi to about 2000 psi, and this pressure may cycle about every 1 to 10 milliseconds. The cycling pressure may act on the hot extrudate while it cools to, e.g., the glass transition temperature of from −50° C. to +50° C.

Figure 35:
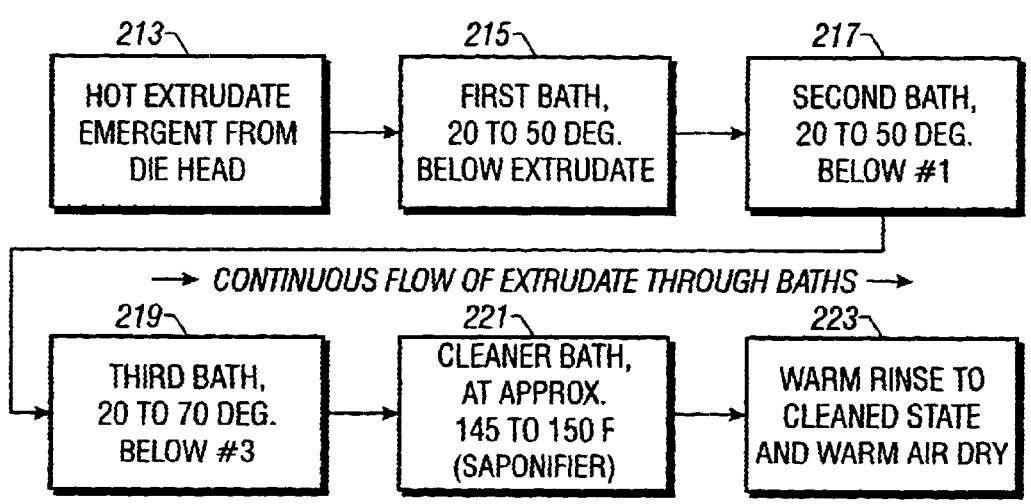
FIG. 35 shows a schematic arrangement of extrudate treatment baths which may be used immediately following the extrusion step.

The pulsating extrusion stage is followed by a controlled slow cool annealing in baths 211 whose purpose is to prevent significant cooling gradients from developing in the extrudate which would induce stresses. Such a cooling annealing flow diagram is shown in FIG. 35. FIG. 35 indicates a schematic arrangement of extrudate (at about 100° C.–300° C.) treatment baths immediately following extrusion. In step 213, the hot extrudate emerges from the die head. In step 215, the hot extrudate is exposed to the first bath which is held at a temperature of about 20–500 below the extrudate temperature. In the next step, step 217, the hot extrudate, somewhat cooled, is exposed to the second bath, which is held at a temperature of about 20–50° below that of step 215. In the next step, 219, the extrudate is exposed to the third bath, which is held at a temperature of between 20–70° below that of step 217. Finally, in step 221, the extrudate is exposed to a cleaner bath, held at approximately 145–150° F. Following the cleaner bath, a warm rinse (step 223) is provided to clean the extrudate, which is then warm air-dried. The duration of each step is set to provide temperature equilibrium through the extrudate prior to entering the next stage of the anneal. The time for each step will vary with the cross-sectional shape and size of the extrudate.

In examining the production results of this method of pulsating release of pressure, extruded lengths of fully cooled and aged samples have been immersed in a uniformly heated bath to determine if any deformations could be observed. When extruded materials, produced with and without the process outlined in Example A, are compared, the difference becomes quite apparent in the substantial deformation of the parts not processed by such techniques. The processed parts show little or no shape or dimensional changes. The improvements observed are believed to result from the interlocked and stressed molecular chains which uncoil and relax during the brief low pressure portions of the pulse. The final forming phase of the extrusion may be performed during a low-pressure condition under which the flow properties are substantially enhanced. The solidification phase should be at as low a pressure as will provide contact with the die form, typically near 1 bar.

The pulsed relief process enhances the fluidity of the extrudate. The taper used depends on the shape and the size of the cross section being produced. Tapers from 2 to 15 degrees may include the optimum range for most relatively small shapes and for materials like polyethylene, polypropylene, high molecular weight polyethylene, and some copolymer mixes. One important parameter that the taper controls is the proportion of sectional volume reduction which produces a pressure increase to expel the extrusion along with an adiabatic temperature rise. The amount of taper needed will vary with the melt properties (viscosity and non-Newtonian behavior). The choice of angle can be directly related to the sectional volume and, in the ideal case, will vary with the sectional thickness in complex shapes. For many melt behaviors, the effective volume reduction may be in the range of about 1 to 7 percent.

The initial exit of the extrudate has a very short air cool section before entering the first anneal bath. Choice of the temperature of this first bath is selected by experiment to just stabilize the particular material with minimal stress with respect to properties such as its shape, section thickness and the volumetric exit velocity. This can be anywhere from 20° F. to 100° F. below the extrudate exit temperature, taking into account that there is always some adiabatic cooling from the pressure drop upon exiting the die form. Three stages of successive bath temperature drops may be sufficient to stress-relieve and stabilize most forms. The length of extrudate that engages each bath, and thus the time it spends therein, are determined by the stability of the temperature of the extrudate as it emerges from the bath. After the final anneal bath, a cleaner bath removes any residues of the anneal bath materials. For the higher temperature thermoplastic materials, the initial bath (or baths) may be one of the low acid purified mineral oils suited to the operating temperatures. The cleaner bath removes such residues and any other significant surface contaminants.

EXAMPLE B

Figure 36:
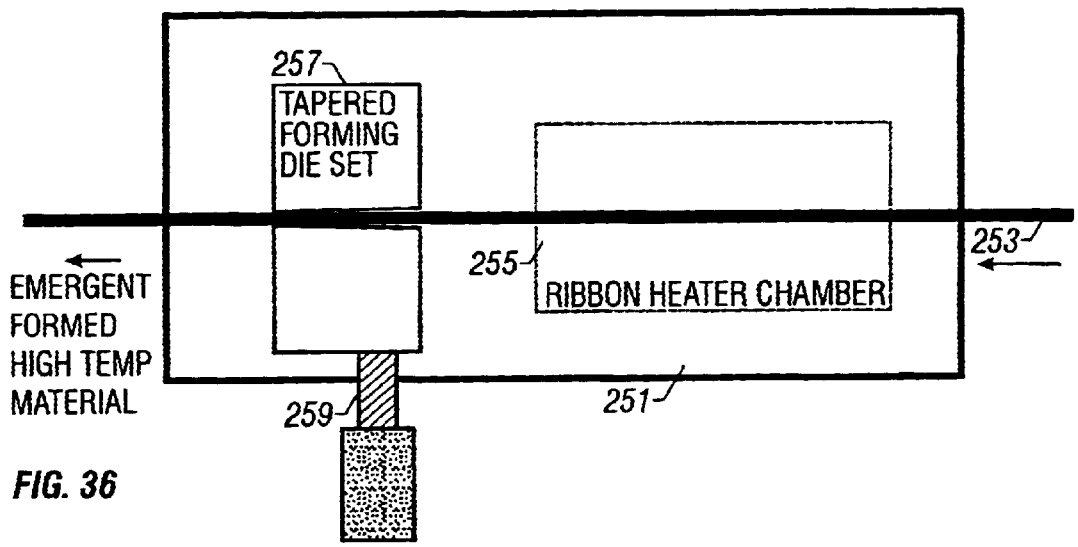
FIG. 36 shows a schematic diagram of an alternative die which may be used to form the positioner of the present invention.
Figure 38:
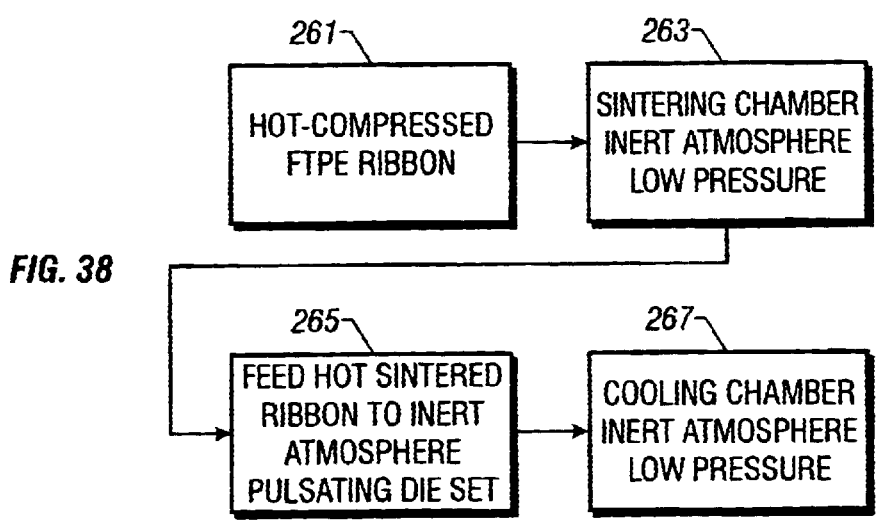
FIG. 38 shows a flow chart of the process which may be used to form the positioner according to an embodiment of the present invention.

The fluoropolymers, which are highly desirable for their low dielectric constant and very low loss properties in the 10 MHz to 1 GHz range, have rather more difficult forming properties. These materials do not really melt like the thermoplastics discussed in Example A. The fluoropolymer material, which starts in particulate form, is processed in a manner that is somewhat akin to powder metallurgy. It is pressed into a shape, possibly with a binder, as a green form and is then sintered into a final solid form and shape. During the pressure forming of such green shapes, similar pulsed pressure releases have a beneficial effect on the uniformity and results from the post-forming sintering process. FIGS. 36–38 describe a method applied to such materials and shapes. After fully sintering and curing PTFE, for example, post-forming of the heated material in an inert atmosphere and in a pressure-pulsed forming die producing rapid high-low-high volume alterations of 1 to 3 percent, enhances the stability and accuracy of the final form. This sequence of pressure varying process steps constitutes Example B for such materials.

Referring to FIG. 36, an inert atmospheric chamber 251 is shown in which a continuous feed of sintered material in ribbon form 253 is entering. A ribbon heather chamber 255 is shown within inert atmospheric chamber 251 to heat ribbon 253. A tapered forming die set 257 accepts ribbon 253. A pulsating pressure piston 259 applies an annealing pressure wave to the heated sintered ribbon 253, thereby reducing internal stress and improving the form stability. The pulsating pressure piston 259 may employ pulsations having a time pattern similar to that shown in FIG. 37. The percent compression is set by die stops.

These steps are shown in the flow chart of FIG. 38. In particular, step 261 shows the hot compressed FTPE ribbon prior to introduction into inert atmospheric chamber 251. Step 263 shows the entrance of the ribbon into a sintering chamber at low pressure. Step 265 shows the feed of the hot sintered ribbon into the insert atmospheric pulsating die set as shown in FIG. 36. Step 267 is the final step where the hot ribbon is sent to a cooling chamber at low pressure.

Helical Twist

The final forming step for an embodiment of the present quad cable invention involves imparting an appropriate twist to the positioner. The desired helical twist is produced in a process which assembles only the center positioner without conductors and then in a heated phase imparts, by way of a forming die system which is held at a temperature below the glass transition temperature ($T_g$), the desired helical twist to the assembly. The cooled assembly is subsequently partially opened during a next stage in which the conductors are installed in their notches. Next, the assembly is pressed closed as it enters the following stage whereby the internal shield (or mirror) materials are assembled to the cable perform. This assembly is then ready for the final covering with the shield section, tensile member and outer jacket.

Following the extrusion process, the positioner may be ready to install. Appropriate thermoplastic materials for the positioner may be such that the resistivity of the positioner material is between about $10^5$ to $10^{18}$ ohm-sec, its dielectric constant is between about 1.05 to 4.0, and its low dielectric losses have a tangent of loss less than 0.1 over the target frequency range, generally up to or greater than a GHz.

Other material properties are that the positioner material should have aging and weathering properties such that, for a temperature range of −50° C. to +50° C. and a humidity range of 0 to 100%, less than 1% variation of electromagnetic functionality should result. The flexural modulii of acceptable plastic materials for the positioner span a range of about a minimum of $0.07 \times 10^9$ Pascals ($0.01 \times 10^6$ psi, typical of soft polyethylene and probably PTFE) to a maximum of $6.89 \times 10^9$ Pascals ($1.00 \times 10^6$ psi, typical of PAEK). These types of materials are variously moldable or need to be "sintered" so they span the range of types. A glass filled polypropylene may also be a candidate material. Various mixtures of these materials may also be used.

Driving and Terminating for Good Balance

There are three frequency domains of particular interest for the network operation contemplated by this disclosure: 1) the DC or low frequency range for power or for very low frequency signaling as with the POTS ringing voltage at around 20 Hz; 2) the low frequency or voice frequency range from about 375 Hz to about 3400 Hz; 3) the broadband high frequency range for digital data reaching to around 1 GHz.

The driver means and the terminating means contemplated can separate these three ranges effectively so as to isolate any interaction between them. The type of digital data format which seems most desirable in light of existing world standards is the SONET or SDH format which are the accepted current standards by which most worldwide fiber optic communications operate. A basic frame or time boxcar of this time division multiplexing scheme was set to 125 micro-seconds in duration, i.e., one group every ⅛₀₀₀ of a second. The structure of the time slots of either of these two formats is shown in FIG. 39. The organization of each frame is represented by 810 time slots or "pigeon holes" which are shown arranged in a matrix 283 of 9 rows by 90 columns. Each slot 281 contains one eight-bit word or byte. The bytes flow row by row in sequence starting at 1 and ending at 810 for each 125 s frame. There are then 6480 bits per frame which at 8000 times per second gives the basic bit rate of 51.84 Megabits per second. This is only the basic or minimum bit rate or the STS-1 format when in electrical form. When used to produce an optical signal for, say, a fiber optic path, this format is then called an OC-1 (optical carrier). The SONET and SDH standards include the use of an 8 bit coding scheme, known as B3ZS, which operates to prevent extended runs of ones or zeros by modifying the digital word in a fashion which allows the decoding or recovery of the true source data. This scheme was developed to prevent significant low frequency energy from shifting the base line of the signal which would in turn disturb the accurate recovery of the digital signal. Thus, this format avoids substantial low frequency components in the 51.84 MHz signal.

The basic STS-1 frame is used as the framework for further time division by placing up to 192 times the data in this fundamental format. That is, each 125 microsecond frame subdivides each of the 810 cells into as many as 192 words, each just 8 bits long. This multiplies the bit rate as well by up to 192 times, resulting in a current maximum 9.9456 GHz bit data rate. Current standards commonly use multiples of 3, 12, 24, 48, 96, and 192 times the base rate in the working communication systems used throughout the world. The electrical signal mode contemplated for some of the types of last mile cable systems disclosed herein is typically either STS-3 (155.52 MHz) or STS-12 (622.08 MHz). In these cases, there need be only very limited low frequency response in that portion of the balanced drive or terminating means employed by the present embodiment of the invention.

Most signal processing circuit topologies, especially those using integrated circuit techniques, are single-ended or unbalanced designs. Means must be employed to couple into and out of the balanced quad design to such unbalanced single ended circuits while preserving the EMIR and XTLK performance of the cable. Balun devices having properties resembling transformers have previously been used for this purpose. C. L. Ruthroff published a classic paper relating to this subject in the August 1959 issue of Proceedings of IRE, pp. 1337–42. Such designs have limited common mode rejection (CMR) and some relevant bandwidth limitations. Quasi- transmission line devices using multi-apertured ferrite cores have also been used to make baluns but these have difficulty achieving CMR better than 25 to 30 dB over a wide bandwidth. Two example are U.S. Pat. Nos: 5,220,297, to Crowhurst, "Transmission Line Transformer Device"; and U.S. Pat. No. 5,379,006, to McCorkle, "Wideband (DC To GHz) Balun".

FIGS. 20 and 21 detail driver and terminating devices which may be employed in the present embodiment of the invention. In the novel driver and balanced receiver system, terminating impedances are controlled essentially by the "delta" configured resistors. In both cases! these small film resistor arrays isolate the DC and low frequency components on the lines by means of the high pass filters 501 and 501' shown and the physically small capacitors integrated into each delta resistor array.

The balanced driver, shown in FIG. 20, includes push-pull signal current sources 503 and 505, which drive the cable, plus source and terminating resistor arrays thereby minimizing impedance changes in transitions or in either "one" or "zero" states. In particular, FIG. 20 shows an STS-formatted data stream entering a drive high frequency boost circuit 507. The high frequency boost circuit 507 compensates for losses. The high frequency boost circuit 507 is adjusted with the receiver aperture boost circuit 509 (FIG. 21) to meet BER specifications. The output of the high frequency boost circuit is sent to a phase splitter 508. The output of the phase splitter 508 is two signals 180° out of phase. The first signal shown by line 511 enters one broadband current source driver 503. The other signal, shown by line 513, enters the broadband current source driver 505. A balanced high pass filter 501 receives both signals. These pass through the resistor array 515 into the quad cable 517. Also shown in FIG. 20 is a low pass filter 519 which accepts inputs from auxiliary low frequency services, as well as DC power sources. These low frequency signals are sent into cable 517 as well, to provide, for example, lines 55 and 57 of FIG. 2.

The receiving end of the balanced line, shown in FIG. 21, terminates in the passive resistor array 515' coupled to the push-pull cascode long-tailed input amplifier. This stage couples the signal to the system or to a digital clocked comparator with very good CMR over the full bandwidth. FIG. 21 shows in more detail the balanced cable receiver system. The receiving end of cable 517 is received in a passive resistor array 515'. The low frequency components of the signal pass through low pass filter 519' to auxiliary low frequency services and provide DC power. The high frequency components pass through the high pass filter 501'. The high frequency components pass to a balanced input amplifier 521. The balanced input amplifier 521 may have a differential cascode long-tailed pair architecture. The CMR of the balanced input amplifier may be greater than 40 dB across the bandwidth. The output of the balanced input amplifier may be passed through a DC restorer synchronous clamp system 523. The output of the clamp system is sent to a receiver aperture boost circuit 509. The receiver aperture boost circuit 509 may be used to trim the so-called "eye pattern" to meet BER specifications. The output of the receiver aperture boost circuit 509 is the data stream.

Such driver and receiver stages have demonstrated performance of better than 50 dB CMR. In a fully integrated design, this level of performance should be closely approached at relatively low cost. The types of input and output stages discussed herein are easily incorporated into the regenerator modules for use in the cable system as previously disclosed above.

Also shown in the figures as described above are transient voltage clamping devices to avoid high voltage pulses from a variety of possible sources. (e.g., electrostatic discharges, nearby lightning or EMP, or connection or service transients).

It is additionally noted that the balance of the system may preferably be maintained as long as possible, e.g., until a line card or unbalanced outside circuitry is reached that requires the transition to an unbalanced line.

Use of This Quad for "Firewire" Applications

Recently a new serial data buss standard for use with computer peripherals has begun to achieve widespread use. This new standard is the IEEE 1394 or its near equivalent in the international IEC 1883. The appellation "FIREWIRE" has been widely used to name this new buss wire and system. The physical interconnecting cable of these systems uses two twisted pairs and two power supply wires inside overall shields. FIREWIRE was originally intended for relatively short lengths to interconnect a variety of accessories to a personal computer. These standards have grown in range and in operating data rates so the original 100 Megabit/sec limit now ranges to 400 Mb/s and it is proposed to reach still further to as high as 1200 Mb/s. Such cables, as modified by the embodiment of the invention, may be quite suitable to connect many current and future types of appliances, information devices and accessories throughout a home or office.

The form of the cable of the present embodiment of the invention readily lends itself to that objective. The cable may be easily modified to include within it two power leads. A reduced size version can certainly be designed for interior environments. The unique advantages of this form of cable can be exploited for such uses and at substantial savings for this more limited application.

Interestingly, the root buss cycle arbitration selected by the standard uses the same interval as the SDH and SONET protocols—125 microseconds. In view of the active always-connected user interface of the disclosed global communication system, and the high data rate objectives of FIREWIRE, these systems would seem to match well, with data functions easily interfaced for the local environment. Such FIREWIRE forms of the novel cable structure and such applications are fully contemplated by this disclosure.

EXAMPLE OF A MANUFACTURING PROCESS

This example utilizes a positioner of the form of FIG. 27 but in which the radial locator spaces for fibers are omitted. The material selected for this example is PTFE. The diameter of the assembled core is 0.420 inches. It is formed by the "green" extrusion, sintering and final forging operation as described above. It is preassembled and then formed in an inert atmosphere heated tunnel to give a helical twist of 1.8 turns per foot. The Unitary Tubular Annular conductors ("UTAC") are spaced 0.200 inches apart on centers and the orthogonal quad array is centered in the 0.420-inch diameter of the core support.

The UTAC's are fabricated of 0.0384 inch OD tubing, soft annealed and formed from one of the high nickel iron alloys (18–30% Ni) which are axially magnetizable to greater than 0.6 Tesla. The ID of the tube is approximately 0.026 inches. This tube is fabricated as a continuous length of formed, rolled and fused material yielding a "seamless" construction with a smooth inner surface. It is plated with copper and electropolished to a smooth bright finish and to a thickness of 28 microns. This surface is then coated by extruding the magnetic matrix of urethane enamel containing the Ni—Zn ferrite powder as described above to a finished additional thickness of 11–14 microns after solidification in the axial magnetizing field. This may be performed as a continuous operation after the plated tubing is formed. The solidified assembly is then coated with a soft urethane enamel material to a thickness of 4 to 6 microns in a multistage dipping and drying process similar to that used to coat the insulation on magnet wire. It is convenient to color code this layer to identify each of the four UTAC's in a finished cable. This completes the forming of the Unitary Tubular Annular conductor which at this stage should be stored on reels with a minimum diameter of four feet.

The next process step for the conductors is to draw into the selected tube or tubes the required number of optical fibers using appropriate lengths selected for the run lengths of the intended finished cable (from, say, 4000 ft to the shortest lengths to be used, typically 400 ft). The optical fibers are single mode, plastic coated and color coded for identification. A fine steel wire leader draws them into the tube, in a generally straight path, along with the superabsorbent compound which also then acts as a lubricant for the fiber drawing operation. Depending on the application, fibers may be inserted in only one or a few of the UTAC'S. A minimum suggested fiber content is one per UTAC in each of the two electrical signal pairs.

Four of the appropriately selected lengths of tubes are next assembled in a continuous parting and reassembly of the PTFE positioner. At this point, the preselected core cable lengths are ready for the shield assembly following the schedule outlined above under Shield Design. The outer covering layers should employ the EMI "symmetricizing" first shield layer (symmetrizer) and the second (outermost) shield layer having the resistive spatial impedance design described above (outer impedance-matching housing). These shielding steps complete the assembly of the finished cable. The finished cable should be stored on reels of four-foot minimum diameter.

Subsequent to the cable manufacture, the termination of the ends are performed in a different environment wherein the cable ends are cut back to an appropriate length to allow the optical fibers to be tailored to an appropriate service length of fiber, buffered by some supporting plastic buffer tube. The fibers may be left in this state for future use or terminated in selected connectors. At the same time, the tubular annular conductors are electrically connected by a shrink sleeve splice to provide the very short electrical connections to the source driver and receiver terminating devices.

This cable example may be used in the Node system at, e.g., STS-3 or 155 Megabit/sec, or for data at 622 Megabits/sec (STS-12).

Figure 40:
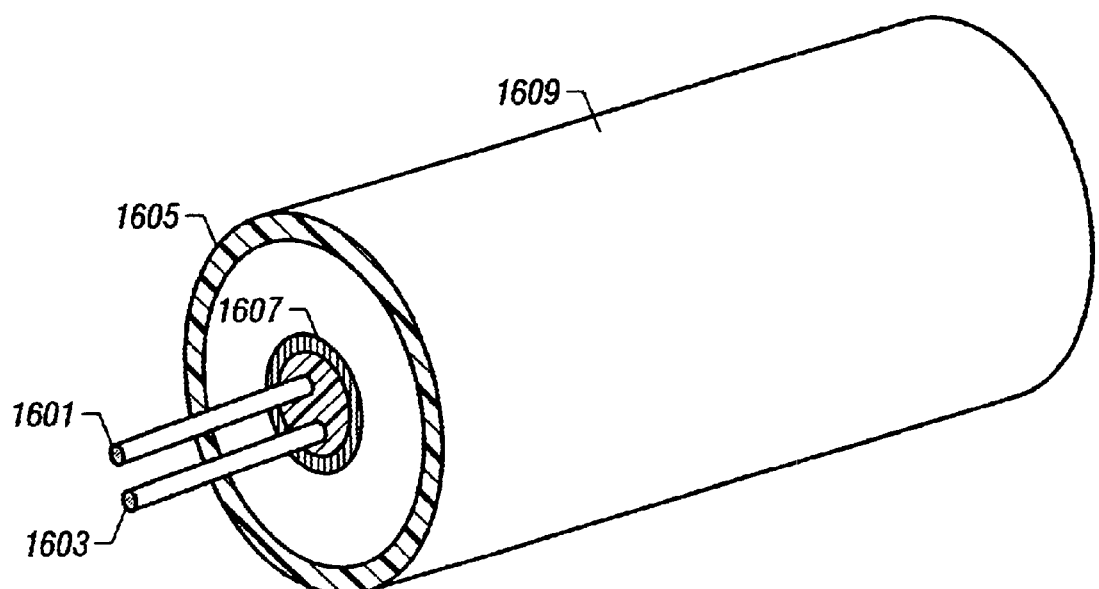
FIG. 40 shows a twin axial cable employing an embodiment of the present invention.
Figure 41:
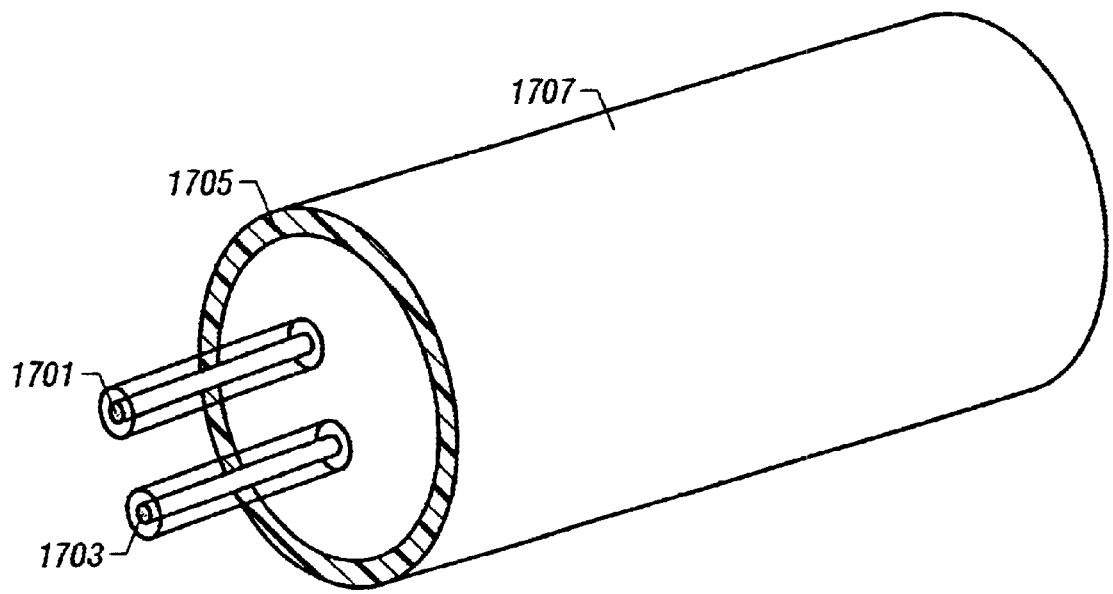
FIG. 41 shows a dual coaxial cable employing an embodiment of the present invention.

A number of embodiments of the present invention have been described. Nevertheless, it will be understood that various modifications may be made without departing from the spirit and scope of the invention. For example, the symmetry and outer impedance-matching housing may advantageously be employed in coaxial cables. It may further be employed in twin-axial cables (FIG. 40) in which two coaxial cables 1601 and 1603 are located within a single jacket 1609. Dual concentric annular conductors 1605 and 1607 are provided in this embodiment. Similarly, referring to FIG. 41, some cable formats, such as Super VHS or Y/C, employ two coaxial cables where the returns are not coaxial. These may similarly benefit from an outer housing 1707 which is impedance-matching. Of course, any of the cables may further benefit from a symmetrizing layer as well.

It should further be noted that each cable, e.g., 1701 and 1703, may also be a quad cable, for example. Triaxial cables are also contemplated by the invention.

The various devices described above may provide features other than those noted. For example, virus-checking of incoming files in the SONET or other format may be employed without serious degradation in speed. Automatic virus definition updates may be easily employed by simply making the same available on the global backbone. Virus checking steps may be especially useful at nodes, at the STP, and at the user's UID.

Accordingly, other embodiments are within the scope of the following claims.

What is claimed is:

1. A communications system, comprising:
a fiber optic cable for connection to a global fiber backbone;
a super ring coupled to the fiber optic cable at a super ring global transfer point, the super ring having a plurality of optical fibers contained therein;
at least one super branch coupled to the super ring at a super branch transfer point, the super branch having a plurality of optical fibers contained therein and including
a plurality of nodes, each node including:
at least one fiber interface device; and
at least one node interface device;
whereby a plurality of user interface devices may be coupled to the node, each user interface device connected to a respective node interface device by a cable;
wherein each local node interface device further comprises:
a low frequency circuit for communicating low frequency signals, power, or DC signals;
a high frequency circuit for communicating data; and
a circuit for receiving a digital television signal broadcast by a satellite or an antenna;
and further comprising:
a cable connected to the Local Node interface device;
and wherein each user interface device for connecting the cable to a plurality of data devices, further comprises:
a low frequency circuit for communicating low frequency signals, power, or DC signals;
a high frequency circuit for communicating data; and
a plurality of interfaces for communicating signals to and from a plurality of input devices, such that at least one of the interfaces drives a port for a digital television.

2. The system of claim 1, wherein the user interface device further comprises an open industry standard port for a user interface device control, wherein a level of control may be input to the user interface device via the open industry standard port.

3. The system of claim 1, wherein the local node interface device, the cable, and the user interface device operate in the optical domain.

4. The system of claim 1, wherein the local node interface device, the cable, and the user interface device operate in the electrical domain.

5. The system of claim 1, further comprising a digital television receiver coupled to the Local Node.

6. The system of claim 5, wherein the digital television receiver includes a circuit for receiving signals from a satellite.

7. The system of claim 5, wherein the digital television receiver includes a circuit for receiving signals from an antenna.

8. The system of claim 5, wherein the digital television receiver is coupled to the Local Node by a regional ring.

9. The system of claim 1, further comprising a circuit for converting the digital television data from a first format to a second format.

10. The system of claim 9, wherein the first format includes MPEG-2.

11. The system of claim 9, wherein the first format includes HDTV.

12. The system of claim 9, wherein the second format includes SONET/SDH.

13. The system of claim 1, further comprising a multipurpose tuner coupled to the circuit for converting the digital television data, the multipurpose tuner to convert digital television data of different formats for output to a television.

* * * * *